United States Patent
Holt et al.

(10) Patent No.: US 12,125,246 B2
(45) Date of Patent: Oct. 22, 2024

(54) CALIBRATION NETWORK SYSTEMS AND METHODS OF USING THE SAME

(71) Applicant: Labsphere, Inc., North Sutton, NH (US)

(72) Inventors: Jeffrey William Holt, Concord, NH (US); Mark Duquette, Andover, NH (US); Michael Wellington Dann, Enfield, NH (US); Erik A Skarin, Sunapee, NH (US); Paul David Mascia, Concord, NH (US); Christopher Newman Durrell, Bow, NH (US); Brandon James Russell, Nashua, NH (US); William Schuren Arnold, Enfield, NH (US); Daniel Francis Scharpf, New London, NH (US); Joseph William Jablonski, Bradford, NH (US); David Nicholas Conran, Swarthmore, NH (US)

(73) Assignee: Labsphere, Inc., North Sutton, NH (US)

( * ) Notice: Subject to any disclaimer, the term of this patent is extended or adjusted under 35 U.S.C. 154(b) by 329 days.

(21) Appl. No.: 17/333,131

(22) Filed: May 28, 2021

(65) Prior Publication Data
US 2021/0383573 A1    Dec. 9, 2021

Related U.S. Application Data

(60) Provisional application No. 63/033,922, filed on Jun. 3, 2020.

(51) Int. Cl.
G06T 7/00    (2017.01)
G06T 5/50    (2006.01)
(Continued)

(52) U.S. Cl.
CPC .............. G06T 7/97 (2017.01); G06T 5/50 (2013.01); G06T 5/73 (2024.01); G06T 7/70 (2017.01);
(Continued)

(58) Field of Classification Search
CPC .. G06T 7/97; G06T 5/003; G06T 5/50; G06T 7/70; G06T 2207/10028;
(Continued)

(56) References Cited

U.S. PATENT DOCUMENTS 5,835,267 A * 11/1998 Mason .................. G01J 1/0474
                                                      359/888
7,166,825 B1    1/2007 Smith et al.
(Continued)

FOREIGN PATENT DOCUMENTS

KR    1020160073845 A    6/2016
KR       101970098 B1    4/2019

OTHER PUBLICATIONS

International Search Report and Written Opinion dated Sep. 29, 2021 pertaining to International application No. PCT/US2021/035592 filed Jun. 3, 2021, 3 pages.

*Primary Examiner* — Michael Robert Cammarata
*Assistant Examiner* — Pardis Sohraby
(74) *Attorney, Agent, or Firm* — Dinsmore & Shohl LLP

(57) ABSTRACT

A system for calibrating a plurality of user sensors includes a calibration management system comprising a processor and a node services module and a plurality of calibration nodes disposed at a plurality of geographical locations. The processor is communicably coupled to the plurality of user sensors, the node services module, and the plurality of calibration nodes and operable to: provide calibration node information to a system associated with one of the plurality of user sensors and cause the calibration node to perform at (Continued)

least one calibration action after providing the calibration information, the calibration action may include performing an environmental measurement and/or providing a calibration reference signal to the user sensor. The processor is also operable to provide calibration results information containing results of the calibration action to the system associated with the one of the plurality of user sensors.

20 Claims, 19 Drawing Sheets

(51) Int. Cl.
  *G06T 5/73*     (2024.01)
  *G06T 7/70*     (2017.01)
(52) U.S. Cl.
  CPC ............... *G06T 2207/10028* (2013.01); *G06T 2207/10152* (2013.01)
(58) Field of Classification Search
  CPC ........... G06T 2207/10152; G01S 7/003; G01S 7/497; G01S 7/4091; F21V 7/0025; F21V 7/04; G02B 7/1821; F21S 11/002; F21S 11/00
  USPC ........................................................ 382/103
  See application file for complete search history.

(56) References Cited

U.S. PATENT DOCUMENTS

| | | | |
|---|---|---|---|
| 9,396,528 B2 | 7/2016 | Pacifici | |
| 9,449,244 B2* | 9/2016 | Ardouin | G06V 10/40 |
| 9,823,116 B2* | 11/2017 | Silny | G01J 1/4228 |
| 10,253,468 B1* | 4/2019 | Linville | E01F 9/559 |
| 11,393,127 B2* | 7/2022 | Parkison | G01S 17/89 |
| 11,435,456 B2* | 9/2022 | Abari | G01S 7/4972 |
| 11,500,100 B2* | 11/2022 | Godbaz | G01S 17/894 |
| 2005/0151965 A1* | 7/2005 | Bissett | G01J 3/2823 |
| | | | 356/73 |
| 2010/0032557 A1* | 2/2010 | Schiller | G01J 5/02 |
| | | | 250/252.1 |
| 2012/0292494 A1 | 11/2012 | Silny et al. | |
| 2017/0208493 A1* | 7/2017 | Masson | G08B 25/08 |
| 2018/0266887 A1* | 9/2018 | Frank | H04N 7/185 |
| 2019/0258899 A1* | 8/2019 | Coogan | G06V 20/188 |
| 2020/0084026 A1* | 3/2020 | Reading | H04L 9/3247 |
| 2021/0082148 A1* | 3/2021 | Parkison | G01S 7/40 |
| 2021/0215791 A1* | 7/2021 | Abari | G01S 7/403 |
| 2021/0316669 A1* | 10/2021 | Wang | G01S 7/4086 |
| 2023/0011625 A1* | 1/2023 | Babazaki | G06T 7/74 |

* cited by examiner

FIG. 5B

CALIBRATION NETWORK SYSTEMS AND METHODS OF USING THE SAME

CROSS-REFERENCE TO RELATED APPLICATIONS

This application claims benefit of priority under 35 U.S.C. § 119 of U.S. Provisional Application Ser. No. 63/033,922 filed on Jun. 3, 2020, the content of which is relied upon and incorporated herein by reference in its entirety.

BACKGROUND

Field

The present specification generally relates to calibration networks providing a plurality of calibration nodes that may be used to calibrate electro-optical sensors in a deployed operational state or to provide calibrated data to users.

Technical Background

Electro-optical sensors find use in a growing number of contexts. For example, electro-optical sensors may be found on satellites, aircrafts, ground-based vehicles, watercraft, on mobile devices, consumer electronic devices, and on stationary instrumentation. Such electro-optical sensors may include a plurality of detector elements (e.g., pixels) disposed in a focal plane to detect radiation from a scene of interest and generate a signal or image data representative of the scene of interest. The quality and usability of the data captured by such sensors is inherently limited by what is known about the sensors' optical radiometric and spatial performance as well as environmental data that may affect the signals or images generated via the sensors. Currently, electro-optical sensors are calibrated using a traceable extended source that uniformly illuminates multiple detector elements of the sensors.

Existing calibration methods are deficient for a number of reasons. First, they may fail to provide calibration sources that are representative of the current imaging conditions for a particular electro-optic sensor. As a result, the radiometric gain coefficients derived from such existing methods may result in an inaccurate calibration. Moreover, existing calibration methods fail to adequately calibrate sensors for imaging applications with relatively small targets (e.g., on the order of a field of view associated with a single detector element of the sensor). Such small targets may illuminate the detector elements with a spatial frequency that varies more than that used to calibrate the sensor, which may lead calibration errors. Moreover, the optics associated with a particular sensor may result in the resolving power of the sensor varying in a non-uniform manner as a function of direction, meaning that post-processing (e.g., re-sampling) methods fail to take such variability into account, which may result in post-processing errors. Existing methods may also fail to spatially characterize a sensor's performance (e.g. in terms of along and cross track directions on the detector) and thus fail to adequately define the sensor's point response function ("PRF").

Accordingly, a need exists for a calibration system that provides traceable calibration sources that accurately reflect environmental imaging conditions and that also provide accurate calibration for small targets for a wide variety of electro-optical sensors.

SUMMARY

According to an embodiment of the present disclosure, a system for calibrating a plurality of user sensors includes a calibration management system comprising a processor and a node services module and a plurality of calibration nodes disposed at a plurality of geographical locations. Each of the plurality of calibration nodes comprises one or more of: measurement instrumentation configured to measure at least one aspect of an environment at the geographic location of the respective calibration node; and signal instrumentation configured to provide a calibration reference signal to the plurality of user sensors. The processor is communicably coupled to the plurality of user sensors, the node services module, and the plurality of calibration nodes and operable to: provide calibration node information to a system associated with one of the plurality of user sensors, the calibration node information identifying a calibration node of the plurality of calibration nodes; cause the calibration node to perform at least one calibration action after providing the calibration information. The calibration action comprises at least one of: performing an environmental measurement using measurement instrumentation associated with the calibration node, and providing the calibration reference signal to the user sensor using signal instrumentation associated with the calibration node. The processor is also operable to provide calibration results information containing results of the calibration action to the system associated with the one of the plurality of user sensors.

According to another embodiment of the present disclosure, a system for calibrating a plurality of user sensors includes a calibration management system comprising a processor and a node services module; and a plurality of calibration nodes disposed at a plurality of geographical locations. The plurality of calibration nodes includes a signal node comprising a reflector configured to direct light from an illumination source to a user sensor of the plurality of user sensors to cause the user sensor to generate a calibration image; and a measurement node comprising a detector configured to measure a characteristic of an environment at a geographic location associated with the measurement node. The processor is communicably coupled to the node services module and the plurality of calibration nodes and operable to: receive the calibration image generated by the user sensor from the light directed thereto by the signal node; perform one or more radiometric corrections on the calibration image signal based on the characteristic of the environment measured at the geographic location by the measurement node; and store the calibration image and parameters associated with the one or more radiometric corrections in a database.

According to another embodiment of the present disclosure, a method of calibrating a user sensor, includes providing calibration node information to a system associated with a user sensor, the calibration node information identifying a calibration node of a plurality of calibration nodes that are communicably coupled to a calibration management system. Each of the plurality of calibration nodes comprises one or more of: measurement instrumentation configured to measure at least one aspect of an environment at the geographic location of the respective calibration node; and signal instrumentation configured to provide a calibration reference signal to the plurality of user sensors. The method also includes causing the calibration node to perform at least one calibration action after providing the calibration information, wherein the calibration action comprises at least one of: performing an environmental measurement using measurement instrumentation associated with the calibration node, and providing the calibration reference signal to the user sensor using signal instrumentation associated with the calibration node. The method also includes providing calibration results information containing results of the calibration action to the system associated with the one of the plurality of user sensors.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 5B depicts an example graphical user interface that may be presented to the user after scheduling the look requests during the method of FIG. 5A, according to one or more embodiments described herein;

DETAILED DESCRIPTION

Reference will now be made in detail to of embodiments of calibration systems for calibrating user sensors. The calibration systems may include a plurality of calibration nodes allowing regular in-situ calibration of a plurality of different types of sensor systems having a wide range of imaging capabilities and modalities. The plurality of calibration nodes may be activated on-demand to provide precisely tuned calibration signals particularly adapted to a user sensor being calibrated. Additionally, the plurality of calibration nodes may include calibrated measurement instrumentation that characterizes the calibration signals and operational environment of associated calibration nodes. The ability to acquire such fine-tuned calibration signals that are calibrated against baseline environmental conditions on-demand while in an operational environment aids in providing knowledge of the real-time operational states of various user sensors.

Benefits associated with the calibration network described herein may be further enhanced via interconnection of the plurality of calibration nodes to a calibration management system. The calibration management system may communicate with active components (e.g., reflector arrays, field spectral radiometers, illumination sources, and other calibration nodes described herein) of the plurality of calibration nodes to provide calibration reference signals to user sensors in accordance with a calibration schedule. The calibration schedule may be generated based on requests of users of sensor systems requiring calibration. The plurality of calibration nodes may provide data collected over the course of various calibrations (e.g., from radiometric sensors associated with at least a portion of the calibration nodes) to the calibration management system. In embodiments, the user sensors being calibrated may also communicate calibration images generated from the calibration reference signals provided by the calibration nodes to the calibration management system. As such, data collected at particular calibration times from both the calibration nodes and the user sensors being calibrated may be provided to the calibration management system to facilitate post-processing of the images collected by the user sensors and assembly of the data into a calibration data package providing a real-time, accurate characterization of optical performance and environmental conditions.

Figure 1A:
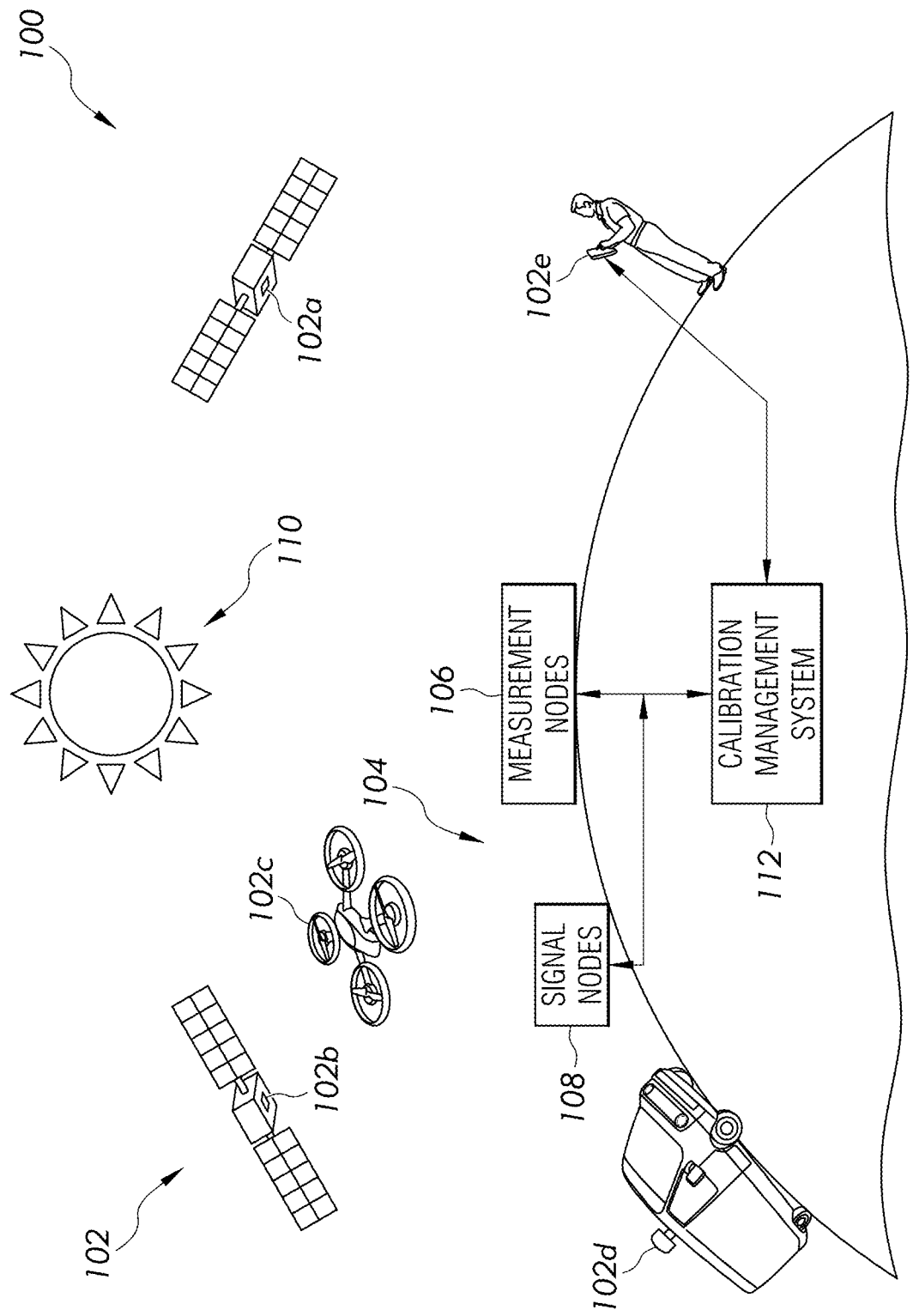
FIG. 1A schematically depicts a calibration system, according to one or more embodiments described herein.

FIG. 1A schematically depicts a calibration system 100 for calibrating a plurality of user sensors 102. The calibration system 100 is configured to provide calibration information that may be used to calibrate a plurality of user sensors 102 via a plurality of calibration nodes 104 disposed at a plurality of geographic locations. For example, in embodiments, the plurality of calibration nodes 104 may be distributed over the surface of the globe to provide real-time, on demand calibration to the plurality of user sensors 102. As described herein, the plurality of calibration nodes 104 may be configured to collect information and provide calibration reference signals that may be used to calibrate the plurality of user sensors 102. The plurality of calibration nodes 104 may have a variety of structures so as to provide information and/or calibration reference signals that may be used to calibrate a wide variety of user sensors. As depicted, for example, the plurality of user sensors 102 includes a first user sensor 102a, a second user sensor 102b, a third user sensor 102c, a fourth user sensor 102d, and a fifth user sensor 102e. The first and second user sensors 102a and 102b are depicted to be satellite-based sensors (e.g., disposed on different satellites having different orbital configurations). The third user sensor 102c is depicted to be disposed on an unmanned aerial vehicle or other aircraft. The fourth user sensor 102d is depicted to be disposed on a surface-based vehicle (e.g., an automobile, water craft, or other land or water-based vehicle). The fifth user sensor 102e is depicted to be incorporated into a mobile device or other user computing system (e.g., a camera, a cell phone, tablet, smartwatch, personal computer). As described herein, the information provided via the plurality of calibration nodes 104 may be used to calibrate and/or characterize the optical performance of each of the plurality of user sensors 102, despite the plurality of user sensors 102 have variability in optical performance and qualities.

The plurality of calibration nodes 104 are operable to perform calibration actions to provide information that may be used to correct images or signals generated via the plurality of user sensors 102. In embodiments, the plurality of calibration nodes 104 comprises a plurality of measurement nodes 106 and a plurality of signal nodes 108. The plurality of measurement nodes 106 may each include measurement instrumentation configured to measure at least one aspect of an environment at the geographic location of the respective calibration node. The measurement instrumentation may include a wide variety of sensors (e.g., spectrometers, imagers) configured to generate detection signals that are representative of at least one aspect of the environment (e.g., solar radiance or irradiance, atmospheric absorption, weather conditions, reflectance of the ground surface, etc.) at the plurality of measurement nodes 106. A number of examples of calibration nodes that may be used as one or more of the plurality of measurement nodes 106 will be described in greater detail herein.

The plurality of signal nodes 108 may include signal instrumentation configured to provide calibration reference signals to the plurality of user sensors 102. The signal instrumentation may take a variety of forms. For example, in embodiments, the plurality of signal nodes may include one or more reflectors for directing natural (e.g., from the sun 110) or artificial (e.g., originating from a radiation source on the plurality of user sensors 102, originating from an illumination source associated with the calibration system 100 or one of the plurality of calibration nodes 104) radiation to the plurality of user sensors 102. As described herein, such reflectors may have adjustable orientations to facilitate provision of calibration reference signals to a plurality of different user sensors 102. In embodiments, the plurality of signal nodes 108 may include calibration nodes with stationary reflectors that are not adjustable. In embodiments, the plurality of reflectors comprise diffuse (e.g., Lambertian or near-Lambertian) targets to facilitate directing light from the sun 110 in a plurality of different directions for capture via the plurality of user sensors 102. As described herein, the plurality of signal nodes 108 may be configured to provide calibration reference signals that are particularly tailored to a user sensor of the plurality of user sensors 102 to facilitate measuring optical performance characteristics (e.g., resolving power, dynamic range, linearity of response, optical distortions) thereof in real-time while in an operating environment. A number of examples of calibration nodes that may be used as one of or more of the plurality of signal nodes 108 will be described in greater detail herein.

Referring still to FIG. 1A, the calibration system 100 also includes a calibration management system 112. The plurality of calibration nodes 104 are communicably coupled to the calibration management system 112 via a suitable communications protocol (or combination of communications protocols) to enable the calibration management system 112 to perform a variety of functions described herein. The calibration management system 112 may also allow users to access the calibration system 100 via communication with a plurality of user systems associated with the plurality of user sensors 102. For example, users may access information stored or measured via the calibration system 100 to facilitate calibration of the plurality of user sensors 102. In embodiments, for example, the calibration management system 112 may provide calibration node information pertaining to the plurality of calibration nodes 104 (e.g., location, availability for a calibration, measurement or signal instrumentation associated therewith, etc.) and receive user requests to access information generated via the plurality of calibration nodes 104. Based on interactions with various users, the calibration management system 112 may schedule and cause the plurality of calibration nodes 104 to perform various calibration actions, such as performing a plurality of environmental measurements via the plurality of measurement nodes 106 and providing a plurality of calibration reference signals to one or more of the plurality of user sensors 102 via the plurality of signal nodes 108. Calibration results information containing results of the plurality of calibration actions may then be provided to the users. For example, in embodiments, the calibration management system 112 may receive calibration images generated via the plurality of user sensors 102. The calibration management system 112 may include sensor characterization logic described herein that may be used to characterize the plurality of user sensors 102 based on the calibration images and provide characterization results to the users. Results of environmental measurements and calculations may also be provided to the users. As such, the calibration management system 112 represents a centralized access point for a wide variety of information that may be used to calibrate and/or characterize the plurality of user sensors 102 while they are deployed in an operational environment.

It should be understood that the calibration management system 112 may take a variety of different forms depending on the implementation. For example, in embodiments, the calibration management system 112 is a cloud-based service accessible over a network. Various functionalities that are describe herein as being performed by the calibration management system 112 may be distributed across a wide variety of computing systems. Various components and functionalities of the calibration management system 112 are described in greater detail herein.

Figure 1B:
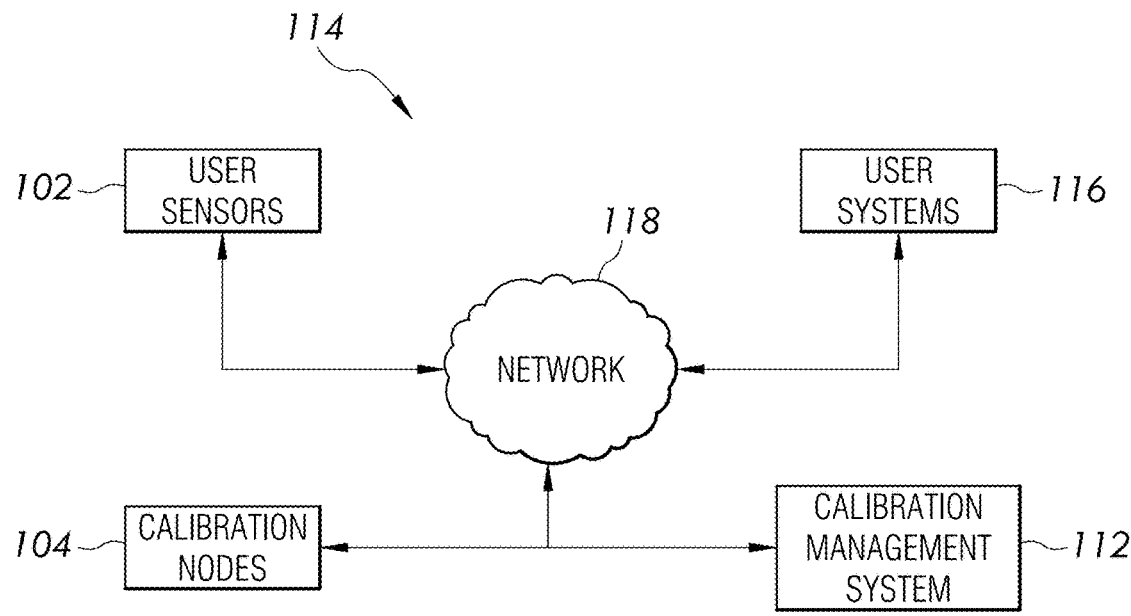
FIG. 1B depicts a block diagram of components of the calibration system of FIG. 1A, according to one or more embodiments described herein.

FIG. 1B depicts a block diagram of a calibration network 114 that facilitates various components of the calibration system 100 depicted in FIG. 1A communicating with one another, according to an example embodiment. As shown, in the calibration network 114, the plurality of user sensors 102, the plurality of calibration nodes 104, the calibration management system 112, and a plurality of user systems 116 are all communicably coupled to one another via a network 118. The network 118 may include any suitable combination of communication protocols. In embodiments, the network 118 comprises a wired and/or wireless computer networks such as, for example, wireless fidelity (Wi-Fi), WiMAX, Bluetooth, IrDA, Wireless USB, Z-Wave, ZigBee, the internet or the like. Local area networks, wide area networks, or other suitable forms for the network 118 may be used.

The plurality of user systems 116 may be associated with the plurality of user sensors 102 that the calibration system 100 is used to characterize and/or calibrate. For example, in embodiments, the plurality of user systems 116 are integrated with the plurality of user sensors 102 (e.g., as an integrated computing system used to process and store data captured thereby). The plurality of user systems 116 may be deployed on an apparatus (e.g., surface-based vehicle, aircraft, satellite) housing the plurality of user sensors 102. In embodiments, the plurality of user sensors 102 are disposed at different locations than the plurality of user sensors 102. For example, a user wishing to access data generated via one of the plurality of user sensors 102 may utilize one of the plurality of user systems 116 to communicate with that user sensor over the network 118. In such an example, the user may interact with the calibration management system 112 to cause the calibration management system 112 to perform one or more calibration actions to provide data associated with one or more of the plurality of user sensors 102. The plurality of user sensors 102 may also provide data (e.g., images of scenes of interest, calibration images of the plurality of calibration nodes 104) to the calibration management system 112 and/or the plurality of user systems 116 via the network 118. As such, the calibration management system 112 may facilitate the plurality of user systems 116 receiving both information that may be used to calibrate the plurality of user sensors 102, as well as calibration results (e.g. radiometric coefficients) that may be used to correct images of scenes of interest generated via the plurality of user sensors 102.

The calibration management system 112 may receive information regarding the plurality of user sensors 102 (e.g., regarding optical characteristics and trajectory paths) that may be used to configure the plurality of calibration nodes 104 to collect information that is particularly tailored to each of the user sensors 102, as well as the calibration images of the plurality of calibration nodes 104 generated by the plurality of user sensors 102. By receiving calibration images generated via the plurality of user sensors 102 as well as the environmental information collected via the plurality of calibration nodes 104, the calibration management system 112 is able to integrate data from a variety of sources to generate a calibration model of the globe in real time that may be used to provide accurate predictions of environmental characteristics that may be used to calibration the plurality of user sensors 102 with a high degree of accuracy.

Figure 2:
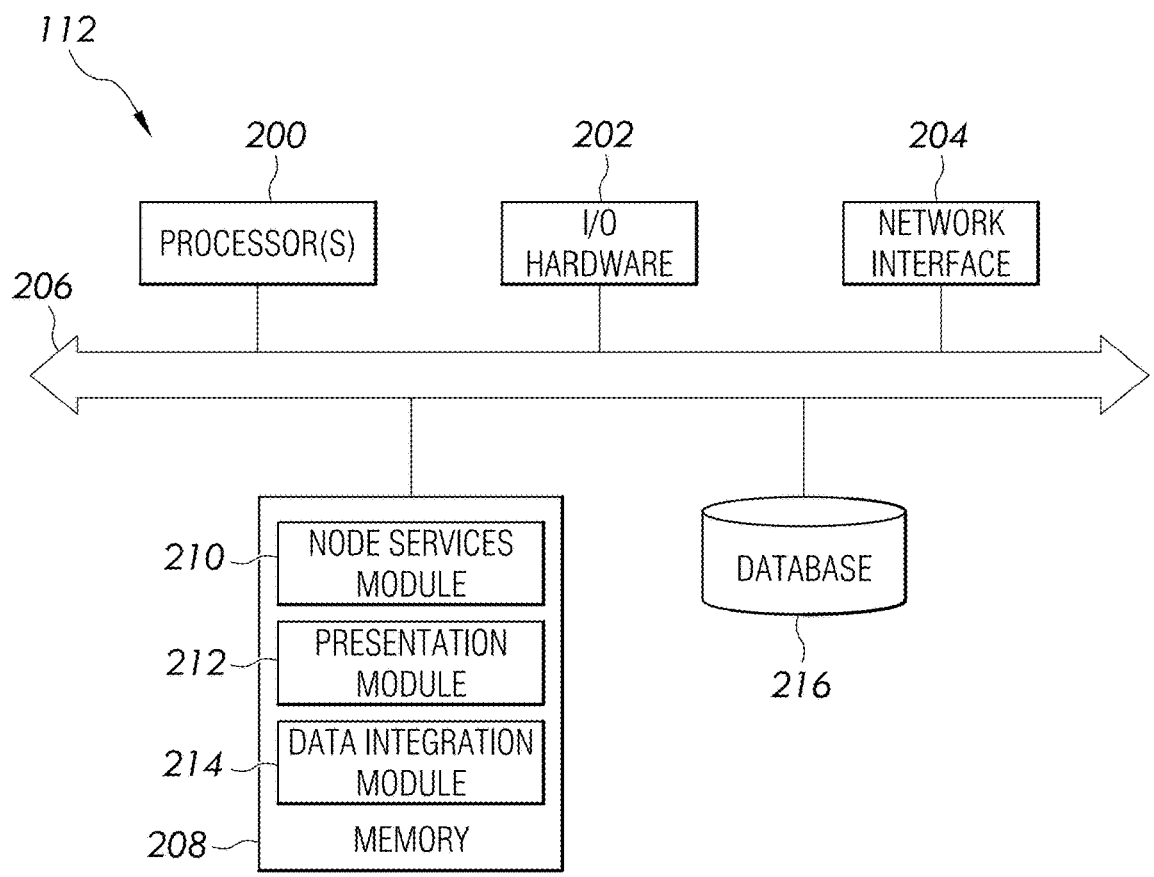
FIG. 2 schematically depicts a calibration management system of the calibration system depicted in FIGS. 1A-1B, according to one or more embodiments described herein.

FIG. 2 schematically depicts the calibration management system 112 of the calibration system 100 described herein with respect to FIGS. 1A and 1B, according to an example embodiment. In the depicted embodiment, the calibration management system 112 includes a processor 200, input/output ("I/O") hardware 202, a network interface 204, a communications bus 206, a memory 208, and a database 216. While the calibration management system 112 is depicted as a single system, it should be appreciated that any of the components described herein (e.g., modules of the memory 208) may be located on other systems within the calibration network 114 depicted in FIG. 1B. That is, the functions described herein as being performed via the calibration management systems may be performed by one or more of the plurality of user systems 116, the plurality of calibration nodes 104, and the plurality of user sensors 102. For example, in embodiments, portions of the memory 208 described herein as being located at the calibration management system 112 may actually be executed via one or more of the plurality of user systems 116 (e.g., as a front end application). In embodiments, the calibration management system 112 and plurality of user sensors 102 operate in accordance with an edge computing configuration, where the plurality of user sensors 102 schedule, execute, and use calibration information from the calibration management system 112 directly. For example, the plurality of user sensors 102 may include their own calibration models, point response models, and calibration coefficients that may be used to correct, calibrate, or upscale images captured thereby. Such models may be built via information provided via the calibration management system 100 in some embodiments. The present disclosure is not limited to any particular computational scheme for the calibration management system 112.

While the calibration management system 112 is shown to include a single processor 200, it should be appreciated that the calibration management system 112 may include any number of processors depending on the implementation. The processor 200 can include any suitable processing device, such as a microprocessor, microcontrol system, integrated circuit, logic device, and/or other suitable processing device. In embodiments, the processor 200 is a processing circuit (e.g., either a single processing circuit or a group processing circuit) that executes some or all of the machine-readable instructions from multiple modules of one or more non-transitory computer-readable mediums (e.g., the memory 208).

I/O hardware 202 may include at least one element to receive inputs from a user and/or provide results of the computations performed via the calibration management system 112 to a user. For example, in embodiments, the I/O hardware 202 may include a basic input/output system (BIOS) that interacts with hardware of the calibration management system 112, device drivers that interact with particular devices of the calibration management system 112, one or more operating systems, user applications, background services, background applications, and the like. The network interface 204 can include any suitable components for interfacing with one or more network(s), including for example, transmitters, receivers, ports, control systems, antennas, and/or other suitable components. The network interface 204 may include and/or be configured to communicate with any wired or wireless networking hardware, including an antenna, a modem, a LAN port, a wireless fidelity (Wi-Fi) card, a WiMAX card, a long term evolution (LTE) card, a ZigBee card, a Bluetooth chip, a USB card, mobile communications hardware (e.g., utilizing any of the Global System for Mobile (GSM), LoRa, or low-power wide-area network (LPWAN) protocols), and/or other hardware for communicating with other networks and/or devices. The database 216 may generally comprise a data storage component communicably coupled to the processor 200 via the communication bus 1208. As a non-limiting example, the database 216 may include one or more database servers that support NoSQL, MySQL, Oracle, SQL Server, NewSQL, and/or the like.

The memory 208 is communicatively coupled to the processor 200. As a non-limiting example, the memory 208 may comprise one or more non-transitory computer-readable medium that may be one of a shared memory circuit, dedicated memory circuit, or group memory circuit. Non-limiting examples of the memory include random access memory (including SRAM, DRAM, and/or other types of random access memory), read-only memory (ROM), flash memory, registers, compact discs (CD), digital versatile discs (DVD), and/or other types of storage components. Memory 208 may store instructions accessible to the processor 200 via an addressing scheme such that the processor 200 may access the memory 208 to execute the instructions in accordance with a program to perform any of the functions and operations described herein.

The memory 208 is shown to include a node services module 210, a presentation module 212, and a data integration module 214, though it should be understood that any number of modules and combinations thereof may perform any of the computational actions described herein. Each of the node services module 210, the presentation module 212, and the data integration module 214 may include sets of instructions that are accessed via the processor 200 in accordance with an addressing scheme to cause the processor 200 (and therefore the calibration management system 112) to perform any of the functions described herein attributed to the calibration management system 112.

The node services module 210 may include instructions that facilitate the calibration management system 112 communicating with the plurality of user sensors 102, the plurality of user systems 116, and the plurality of calibration nodes 104 to allow users to obtain calibration results information from the calibration management system 112 via the plurality of calibration nodes 104. In embodiments, for example, the node services module 210 comprises instructions that are executed by the processor 200 to cause the calibration management system 112 to provide calibration node information to a system associated with one of the plurality of user sensors 102. For example, in embodiments, a user, via one of the plurality of user systems 116, may access the database 216 and cause the calibration management system 112 to provide information pertaining to the plurality of calibration nodes 104. The user may view the capabilities of each of the plurality of calibration nodes 104 (e.g., in terms of whether each of the plurality of calibration nodes 104 is one of the plurality of measurement nodes 106, the plurality of signal nodes 108, or a combination thereof, in terms of the instrumentation at each of the plurality of calibration nodes 104, and the measurements or calibration reference signals that each of the plurality of calibration nodes 104 is capable of providing). The user may also view the locations of the plurality of calibration nodes 104 and the availability of the plurality of calibration nodes (e.g., describing when one of the plurality of signal nodes 108 is available to provide a calibration reference signal to one of the plurality of user sensors 102). In embodiments, the functionalities of the calibration management system 112 (e.g., those associated with the node services module) are available to the plurality of user systems 116 in an automated fashion via a machine interface or application programming interface (API).

It should be understood that embodiments are also envisioned where users receive information regarding the plurality of calibration nodes 104 by means other than the calibration management system 112. For example, in embodiments, the plurality of calibration nodes 104 comprise computing systems that transmit network signals (e.g., a beacon signal) or other recognizable signal that is received via the plurality of user sensors 102 or plurality of user systems 116. Upon receipt of such a signal, the plurality of user sensors 102 may recognize the calibration node from which the information is received (e.g., via a native or cloud-based application running on one of the plurality of user systems 116) and initiate network communications with the calibration management system 112 or the calibration node to receive further information. In embodiments, calibration node information may be provided directly on the plurality of calibration nodes 104 themselves. For example, one particular calibration nodes 104 may include a QR code or other form of decodable information that is recognized by one of the plurality of user sensors 102 to receive the information regarding the calibration node. In an example, the fourth user sensor 102d on a surface-based vehicle may drive by one of the plurality of calibration nodes 104 that is viewable from the ground including a QR code. One of the plurality of user systems 116 (e.g., on the fourth user sensor 102d) may process the information encoded in the QR code to recognize the calibration node and subsequently receive a calibration reference signal therefrom (e.g., in embodiments where the calibration node is one of the plurality of signals node 108) to capture a calibration image of the calibration node. The calibration image may be subsequently provided to the calibration management system 112 (e.g., via the network 118 depicted in FIG. 1B) for generation of radiometric constants that may be used to calibrate the fourth user sensor 102d. That is, via the calibration system 100 described herein with respect to FIGS. 1A-1B, the plurality of user sensors 102 may receive calibration reference signals and/or environmental information either in a pre-scheduled manner (e.g., based on communications between one of the plurality of user systems 116 and the calibration management system 112) or an unscheduled manner (e.g., based on one of the plurality of user sensors 102 receiving a calibration reference signal or receiving environmental information from one of the plurality of calibration nodes 104 when the user sensor recognizes on of the plurality of calibration nodes based on location or information received from one of the plurality of calibration nodes 104).

Referring still to FIG. 2, the node services module 210 may also cause the plurality of calibration nodes 104 (see FIG. 1A) to perform various calibration actions depending on requests of users or determining the presence of one of the plurality of user sensors 102. For example, the node services module 210 may include instructions that cause the processor 200 to transmit (e.g., via the network interface 204) instructions to the plurality of calibration nodes 104 that cause the plurality of calibration nodes 104 to perform environmental measurements using measurement instrumentation associated therewith. The instructions may cause the processor 200 to access readings taken by one of the plurality of measurement nodes 106, for example, to gain information regarding the environments of each of the plurality of measurement nodes 106. The node services module 210 may also include instructions that cause the processor 200 to transmit (e.g., via the network interface 204) instructions that cause the plurality of signal nodes 108 to provide calibration reference signals to the plurality of user sensors 102 to cause the plurality of user sensors 102 to generate calibration images. In embodiments, signal instrumentation associated with one or more of the plurality of signal nodes 108 may be adjusted (e.g., in orientation) to direct the calibration reference signals into the plurality of user sensors 102 that are generating the calibration images.

The node services module 210 may also contain radiometric calibration instruction sets that compute radiometric gain coefficients that are used to calibrate the plurality of user sensors 102 Radiative transfer codes (e.g., MODTRAN®) may be implemented or accessed via the node services module 210 (e.g., using local meteorological data received via the data integration module 214 and atmospheric transmission measurements taken via the plurality of measurement nodes 106 of FIG. 1A) to estimate the energy reaching the plurality of user sensors 102. Ratios of the estimated and actual energy received by the plurality of user sensors 102 (e.g., based on a calibration image of one of the plurality of signal nodes 108 generated thereby) may then be used to generate calibration correction coefficients for various spectral bands detected via the plurality of user sensors 102. The calibration correction coefficients may be provided to the plurality of user sensors 102 and/or plurality of user sensors 116 to correct images of scenes of interest taken by the plurality of user sensors 102.

The node services module 210 may also include instruction sets that facilitate characterization of the plurality of user sensors 102 for image quality. For example, as described herein with respect to FIG. 7, the plurality of signal nodes 108 may be used to generate a point response function ("PRF") image for the plurality of user sensors 102 by using signal instrumentation that is particularly tailored for each of the plurality of user sensors 102 (e.g., by providing calibration reference signals that are smaller than a field regard of a single pixel or detector element thereof). Such a PRF image may be used characterize the resolving powers of the plurality of user sensors 102. As such, via the node services module 210 the calibration management system 112 is able to provide both geometric and radiometric calibrations of a wide variety of user sensors 102 and provide users with instantaneous access to such results.

In embodiments, the node services module 210 may include further image processing logic to process additional images taken by the plurality of user sensors 102. For example, in embodiments, after a particular one of the plurality of user sensors 102 is calibrated via receiving a calibration reference signal in accordance with the methods described herein, an image may be evaluated using pixel classification techniques and object identification to count objects (e.g., cars) in the image to generate an actionable output. The plurality of calibration nodes 104 may be well defined in the calibration network 114 (see FIG. 1B) in terms of geometric location. Given that the calibration reference signals provided by at least some of the plurality of calibration nodes 104 appear as point sources to the user sensors 102, and providing that the sensor optics distribute that signal across a plurality of pixels in the sensor plane due to system point response function. The resulting pixels influenced by the signal can be evaluated to resolve the center of mass of that signal and this value may be designed to an exact location on the earth and used to pin image pixels for geolocation evaluation with sub-pixel accuracy.

In embodiments, the node services module 210 may also include harmonization logic for harmonizing images captured via the plurality of user sensors 102. For example, a satellite constellation may observe an area of earth at a specific time. The calibration management system 112 may harmonize these data with one another. The images may also be evaluated against a reference satellite (e.g., a user sensor with superior imaging capability) for further corrections.

Referring still to FIG. 2, the presentation module 212 may cause the processor 200 to provide information to the plurality of user systems 116 that may be displayed thereby to allow users to access information regarding the plurality of calibration nodes 104 and calibration results information captured thereby. The presentation module 212 may facilitate accessing a plurality of functions implemented in the memory 208 to allow the users to access various forms of information and cause the plurality of calibration nodes 104 to perform a variety of calibration actions. For example, in embodiments, via the presentation module 212 a user may be able to view availability of the plurality of signal nodes 108 to provide calibration reference signals to a position of interest (e.g., at any location on or above the surface of the globe) at a particular points in time. When viewing this information, the user may also be able to schedule "look requests" for a particular combination of one of the plurality of user sensors 102 and one of the plurality of calibration nodes 104. A look request may specify a time for a particular one of the plurality of signal nodes 108 to provide a calibration reference signal and also provide trajectory information (e.g., orbital information, flight information, navigation information, real-time location information) associated with a user sensor of the plurality of user sensors 102. At the time of the look request, the calibration management system 112 (e.g. via the node services module 210) may orient one of the plurality of signal nodes 108 to direct a calibration reference signal to an anticipated location of the scheduled user sensor to generate a calibration image. A user may schedule a plurality of such looks and view them on a look calendar. An example of such a look calendar is described herein with respect to FIG. 5B.

The presentation module 212 may facilitate user access to a wide variety of other functions implemented via the calibration management system 112. For example, via the presentation module 212, users may schedule evaluations of the optical performance of a user sensor (e.g., via performance of the method 700 described herein with respect to FIG. 7). Users may also develop customer contracts, develop workflows for particular ones of the plurality of calibration nodes, generate reports of previous calibration results, conduct transactions to pay for services, and perform data analysis processes. For example, the database 216 may store calibration images captured via each of the plurality of user sensors 102 (e.g., irrespective of whether they are associated with a particular user) and measurements taken via the plurality of measurement nodes 106. Such data may be combined for higher level analysis (e.g., generation of a calibration model, as described herein with respect to FIG. 17). Such a full library of images may be used to generate radiometric studies over time. Moreover, analysis of a plurality of calibration images captured by a particular one of the plurality of user sensors 102 over time may reveal information regarding performance degradation about that user sensor. Results of such analyses may be provided to users via the presentation module 212.

Referring still to FIG. 2, the data integration module 214 may facilitate the calibration management system 112 accessing a number of different third party data sources for providing information that are input to radiometric calibration processes. For example, the data integration module 214 may utilize a plurality of third party application programing interfaces ("APIs") that facilitate the calibration management system 112 receiving data streams from a plurality of third party sources. Such APIs may provide meteorological information for localities associated with the plurality of calibration nodes 104, satellite orbital information (e.g., for determining positioning of user sensors disposed on satellites), atmospheric transmission information, and third party vicarious calibration networks). Via the data integration module 214, the calibration management system 112 provides users a single access point for information that may be necessary to provide fully traceable calibrations for the plurality of user sensors 102.

FIGS. 3A-3G depicts aspects of a calibration node 300. In embodiments, the calibration node 300 may be an example of one of the plurality of calibration nodes 104 of the calibration system 100 described herein with respect to FIGS. 1A-1B. In embodiments, for example, the calibration system 100 comprises a plurality of calibration nodes similar in structure to the calibration node 300 disposed at various geometric locations. The calibration node 300 includes both measurement instrumentation (depicted as a field spectral radiometer 310) for measuring aspects of an environment of the calibration node 300 and signal instrumentation (depicted as a reflector array 306) for providing calibration reference signals to the plurality of user sensors 102 (e.g., shown as a user sensor 316 disposed on a satellite 314).

The calibration node 300 includes an illumination source 302, a reflector array 306, a control system 308, and a field spectral radiometer 310. The calibration node 300 is generally configured to direct light from an illumination source 302 to a user sensor 316 to facilitate calibration of the user sensor 316 while the user sensor 316 is in deployment. The illumination source 302 provides illumination light for generating samples for characterizing the user sensor 316. In the example shown, the illumination source 302 is sunlight, though other illumination sources are contemplated and within the scope of the present disclosure. In embodiments, the reflector array 306 and control system 308 comprise one of a plurality of reference sites that are a part of a calibration network for characterizing the user sensor 316.

The control system 308 communicates with the user sensor 316 and/or the calibration management system 112 (see FIG. 1A) via an antenna 312 (e.g., via the network 118 of FIG. 1B) and controls the reflector array 306. In embodiments, the antenna 312 is omitted and the control system 308 communicates with the plurality of user sensors 102, the plurality of user systems 116, and the calibration management system 112 via the network 118 (see FIG. 1B). In embodiments, the calibration node 300 provides on demand calibration for the user sensor 316 in response to a calibration request (or look request). For example, in embodiments, the user sensor 316 transmits the calibration request to the calibration node 300 (e.g., via any known communication protocol). The calibration request may indicate a calibration time when the reflector array 306 is within a field of view of the user sensor 316. At the indicated time, the control system 308 may control the field spectral radiometer 310 to obtain measurements of one or more of solar radiance, atmospheric transmission, and reflectance from the reflector array 306. The control system 308 may also control the reflector array 306 to direct illumination light from the illumination source 302 to the user sensor 316 for calibration. The spectral radiance and/or irradiance of the illumination source 302 (e.g., of the sun and sky), atmospheric transmission, and the like may be measured by the field spectral radiometer 310. In embodiments, the orientation of the field spectral radiometer 310 is adjustable to acquire a complete survey of the environment of the reflector array 306 to facilitate proper adjustments to the samples generated by the user sensor 316. In embodiments, the calibration node 300 includes a camera (not depicted). The camera may be co-located with a remote sensing head of the field spectral radiometer 310 and be used for alignment, tracking, and targeting to ensure that the field spectral radiometer 310 is sampling a desired target. The structure of the field spectral radiometer 310 that may be used in the calibration node 300 is described in greater detail herein.

The user sensor 316 is depicted as a satellite imaging system, but it should be understood that the systems and methods described herein are applicable to any airborne imaging system (e.g., imaging systems disposed on unmanned aerial vehicles or other aircraft) or surface-based imaging system (e.g., on water craft or automobiles). The user sensor 316 may comprise a plurality of detector elements (e.g., pixels) configured to generate images based on radiation within a wavelength range of interest. The wavelength range of interest may vary depending on the implementation. For example, in embodiments, the user sensor 316 may generate images based on one or more of ultraviolet radiation, visible light, infrared radiation, and even the millimeter wavelength range or radio frequency, depending on the implementation.

The user sensor 316 may perform a number of different types of imaging of targets depending on the situation or implementation. For example, in embodiments, the user sensor 316 is a remote sensing system using broadband, multi-spectral, and/or hyperspectral imaging instruments. Such instrumentation requires proper calibration in order to achieve reliable characterizations of the targets being imaged because the acquired imaging signal by the user sensor 316 may vary depending on a number of different factors, such as angle of illumination (e.g., orientation of the illumination source 302), the spectral composition of illumination light from the illumination source 302, atmospheric conditions, and reflectance of surfaces disposed proximate to the reflector array 306 (e.g., the bidirectional reflectance distribution function ("BRDF") of the surface upon which the reflector array 306 is disposed). As described herein, to facilitate accurate calibration of a wide array of imaging systems (including the user sensor 316), the field spectral radiometer 310 includes two or more optical paths coupled to detector paths specifically designed for different optical channels (e.g., wavelength ranges of interest), providing for high dynamic range and low signal to noise environmental measurements across a large spectral range.

While the field spectral radiometer 310 is depicted to be a component of the calibration node 300, it should be appreciated that the field spectral radiometer 310 may find use in a wide variety of other contexts or as a standalone device (e.g., in one of the plurality of measurement nodes 106 depicted in FIG. 1A). The field spectral radiometer 310 may find use in any application where it is beneficial to gather information regarding solar illumination and/or surface reflectance. For example, information generated by the field spectral radiometer may provide inputs in atmospheric science (e.g., to collect information regarding sunlight, in studying climate, in developing weather models). In embodiments, the field spectral radiometer 310 may be used in photovoltaic installations. In embodiments, the field spectral radiometer 310 may be implemented in farming or agricultural sites for solar and/or surface monitoring. The present disclosure is not limited to any particular application.

Figure 3A:
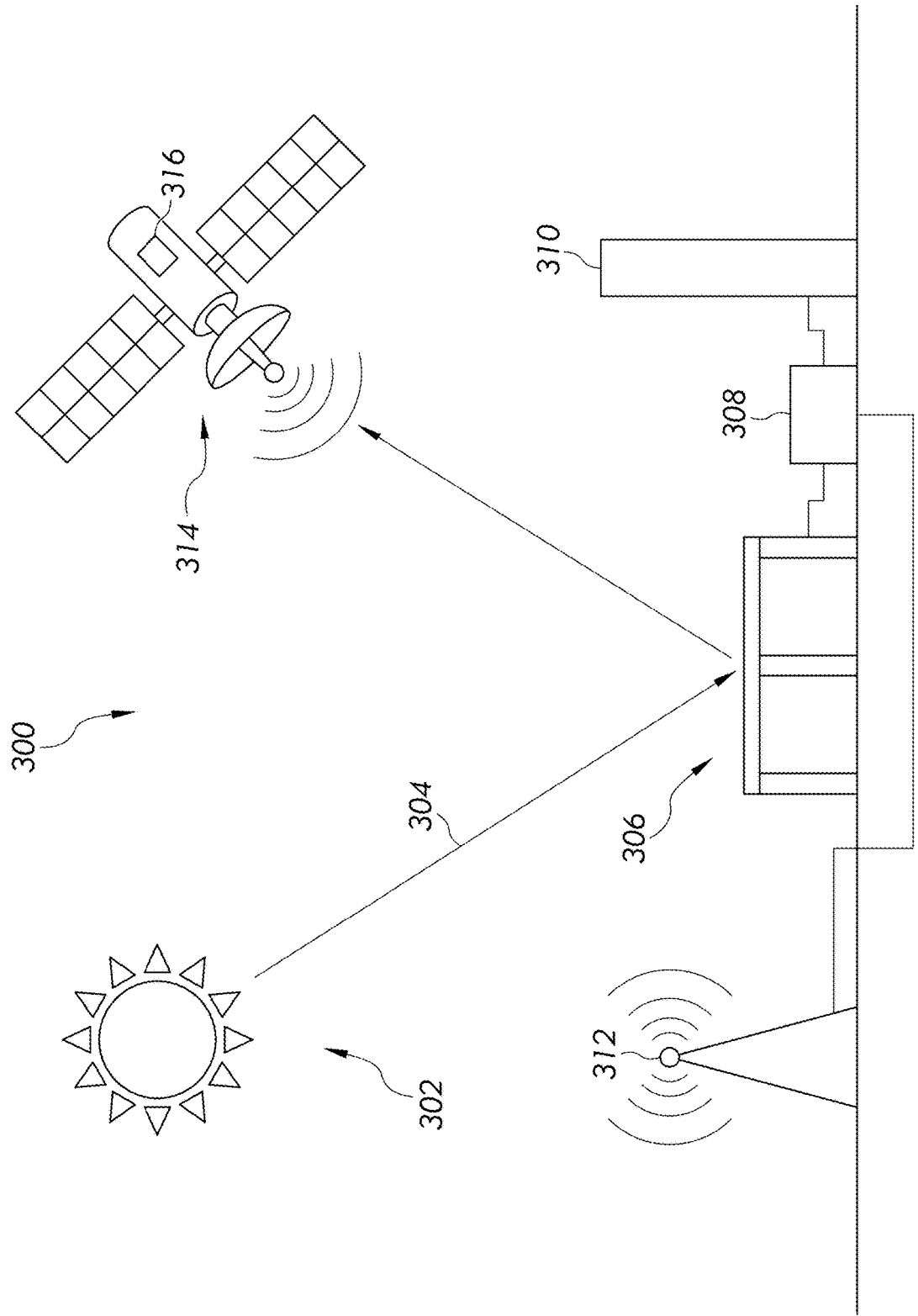
FIG. 3A schematically depicts a calibration node of the calibration management system of FIGS. 1A-1B, according to one or more embodiments described herein.
Figure 3B:
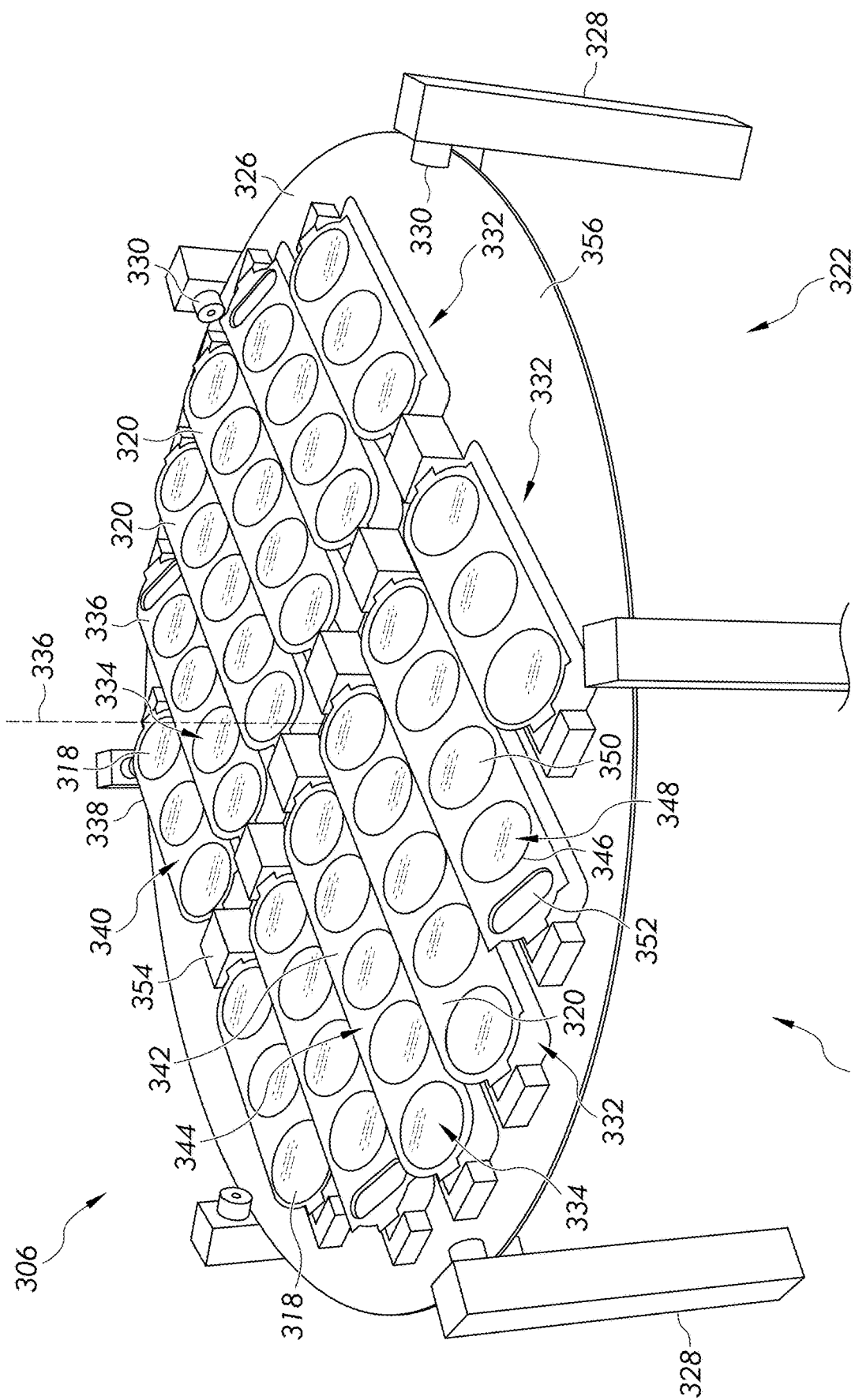
FIG. 3B schematically depicts a view of a reflector array of the calibration node of FIG. 3A with a plurality of reflectors in an imaging position, according to one or more embodiments described herein.
Figure 3C:
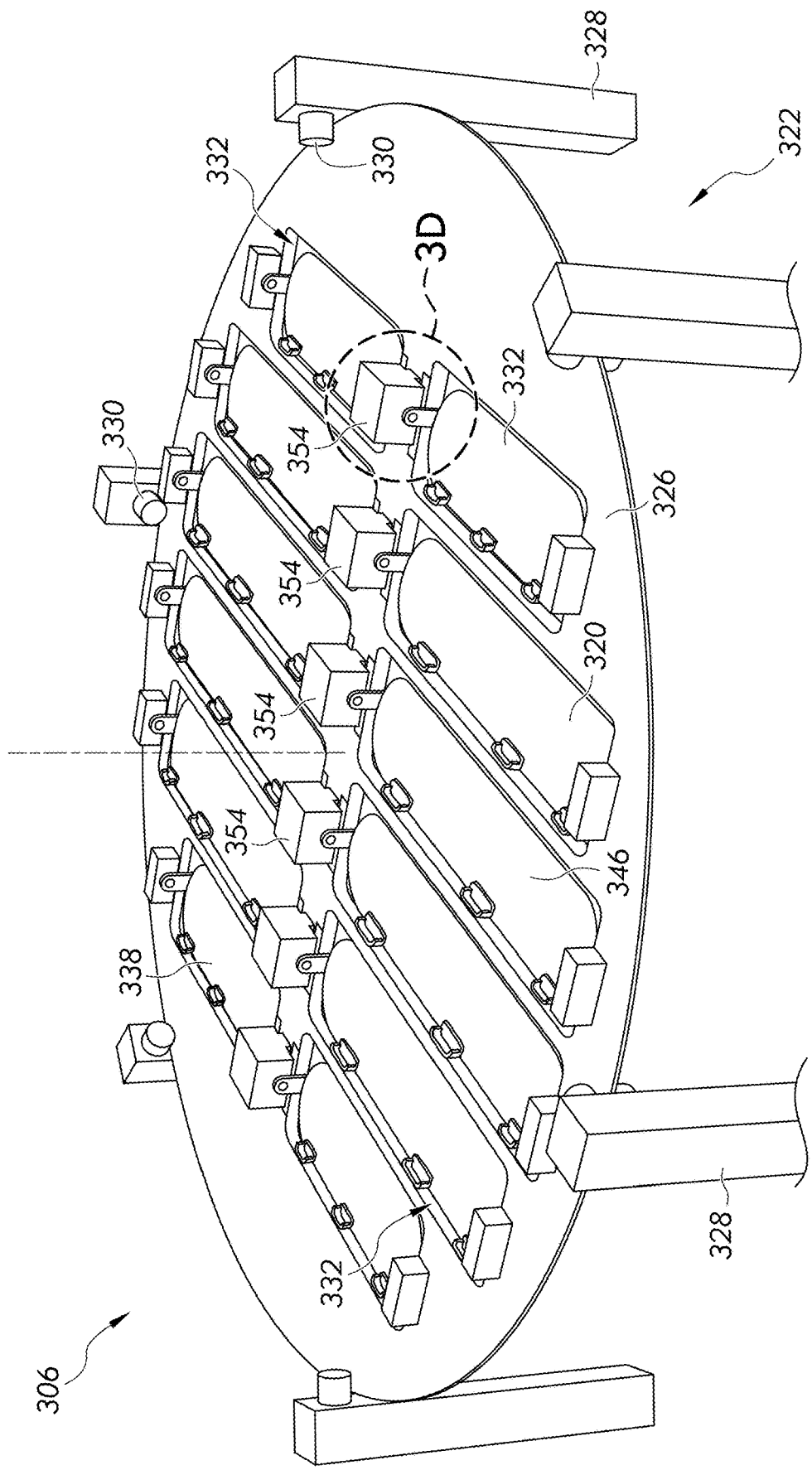
FIG. 3C schematically depicts a view of the reflector array of FIG. 3A with the plurality of reflectors in a stowed position, according to one or more embodiments described herein.
Figure 3D:
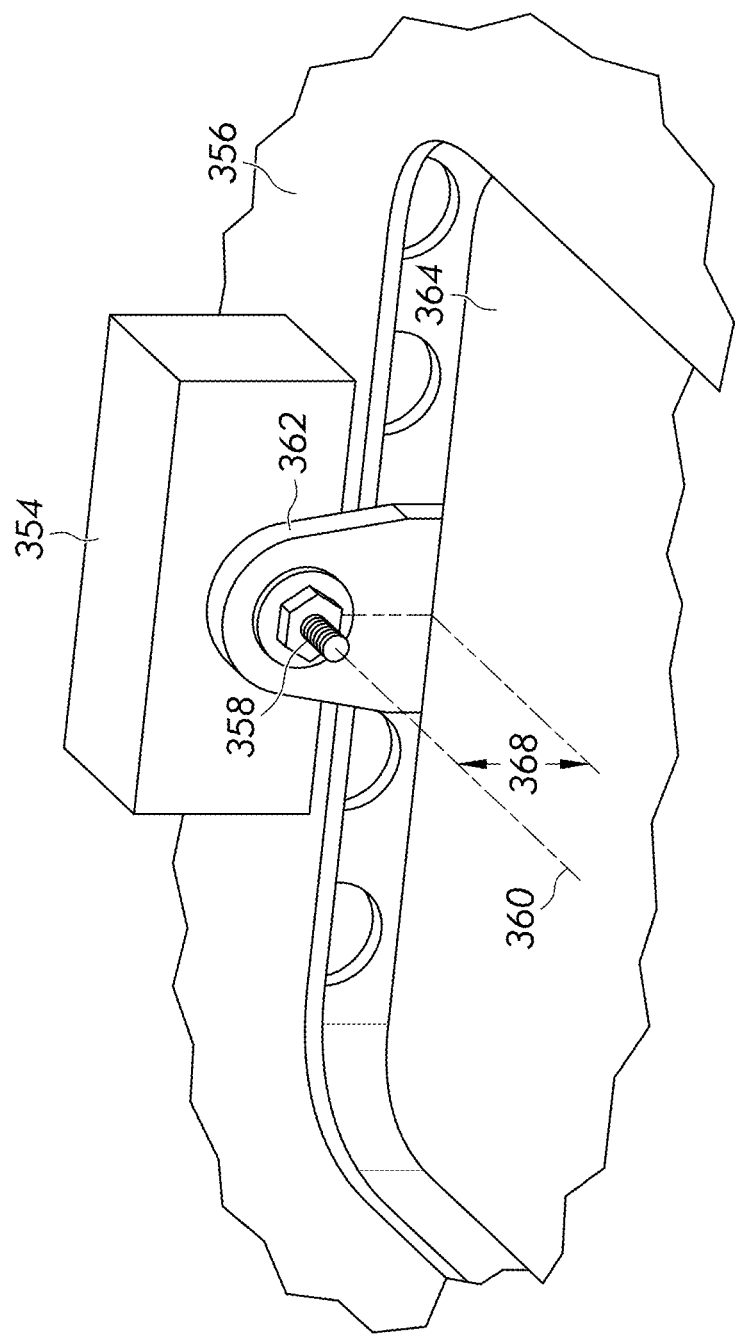
FIG. 3D schematically depicts an elevation adjustment actuator of the reflector array of FIGS. 3A-3C, according to one or more embodiments described herein.

FIGS. 3B, 3C, and 3D depict various aspects of the reflector array 306 in greater detail. FIG. 3B depicts the reflector array 306 in an imaging configuration to provide a calibration reference signal to the user sensor 316. FIG. 3C depicts the reflector array 306 in a stowed configuration when not being used for calibrations. FIG. 3D depicts an elevation adjustment actuator that may be used to adjust an orientation of individual reflectors of the reflector array 306.

With reference to FIG. 3B, the reflector array 306 is depicted to include a plurality of reflectors 318. FIG. 3A depicts the reflector array 306 with a plurality of reflectors 318 in a reflecting position where the reflector array 306 is positioned to direct light from the illumination source 302 into the field of view of the user sensor 316. In embodiments, the plurality of reflectors 318 includes more than 50 reflectors, though embodiments with smaller or larger numbers of reflectors are contemplated and within the scope of the present disclosure. While the reflector array 306 is described as having only the plurality of reflectors 318 attached thereto via a rotatable plurality of reflector support elements 320, it should be understood that certain embodiments may include elements other than reflectors. For example, certain embodiments may include a diffuse reflectance target attached to one of the plurality of reflector support elements 320 to provide a reflectance reference for measurements. Embodiments may also include an illumination source coupled to one of the plurality of reflector support elements 320. The illumination source may emit a well-defined calibration light directly to the user sensor 316 (or into the plurality of reflectors 318) for calibration. The calibration light may emit light within a predetermined spectral band of interest and be disposed on a movable support structure (e.g., a robotic arm, rotation stage, or other suitable support structure) to track the location of the user sensor 316.

In embodiments, each of the plurality of reflectors 318 may be concave, convex, or flat, depending on the implementation. In embodiments, each of the plurality of reflectors 318 is sized less than an instantaneous geometric field of view ("IGFOV") of an individual detector element (e.g., pixel) of the user sensor 316. That is, each of the plurality of reflectors 318 may have a surface area facing the illumination source 302 that is less than or equal to a geometric area captured by one of the detector elements. In embodiments, the IGOV of one of detector elements may be approximated as $$IGFOV = \frac{ah}{f} \qquad (1)$$

where a represents the dimension of one of the detector elements (e.g., in embodiments where each detector elements is an a x a square pixel), f is the effective focal length of an optical system (not depicted) of the user sensor 316, and h is the height of the user sensor 316 above of the reflector array 306 (e.g., the orbital height of the satellite 314). That is, light reflected from each of the plurality of reflectors 318 may represent a point illumination source that is imaged by the user sensor 316. In embodiments, the reflector array 306 includes a plurality of arrays of reflectors within a single IGFOV of the user sensor 316. In embodiments, only a portion of the plurality of reflectors 318 are smaller than the IGFOV of the user sensor 316.

As depicted in FIG. 3B, the reflector array 306 includes a support structure 322 supporting the plurality of reflectors 318 in a plane above the surface upon which the reflector array 306 is disposed. The support structure 322 includes a base 324 and a rotating support 326 coupled to the base 324. Each of the plurality of reflectors 318 is connected to the base 324 via the rotating support 326. In embodiments, the base 324 may be stationary in the reference frame of the surface upon which the reflector array 306 is disposed. The base 324 provides structural support for the plurality of reflectors 318 and maintains positioning of the plurality of reflectors 318 during use. The base 324 includes a plurality of legs 328. Each of the plurality of legs 328 includes an engagement assembly 330 that receives and secures the rotating support 326. It should be understood that, while the depicted embodiment includes a single rotating support 326 coupled to each of the plurality of legs 328, alternative embodiments may include a plurality of such rotating supports 326, with only a portion of the plurality of legs 328 engaging with each rotating support 326. While the base 324 is depicted as incorporating a plurality of legs 328, the base 324 may take a number of different forms depending on the size of the reflector array 306 supported thereby (e.g., number and size of reflectors) and the operational environment of the reflector array 306. For example, in embodiments, the base 324 may include a single support platform centrally disposed relative to the rotating support 326. In embodiments, the base 324 may define a single surface upon which the rotating support 326 is disposed.

In the depicted embodiment, each engagement assembly 330 is a roller assembly disposed on a surface of one of the legs 328. Each roller assembly includes a pair of rollers between which the rotating support 326 is disposed. Attachment of the rotating support 326 to the base 324 via rollers beneficially permits rotation of the rotating support 326 relative to the base 324 in the manner described herein and maintains planarity of the rotating support 326 by providing a plurality of points of support. Such maintenance of the shape of the rotating support 326 beneficially maintains the pointing accuracy of the plurality of reflectors 318 because, if the rotating support 326 is bent, actual pointing directions of the plurality of reflectors 318 may vary from intended directions if the bending is unaccounted for in the control of the reflector array 306. The rollers also beneficially suppress vibration modes associated with the structure of the rotating support 326. Embodiments are also envisioned where each engagement assembly 330 comprises a single roller (e.g., disposed beneath the rotating support 326).

In the depicted embodiment, rotating support 326 is a circular plate having a plurality of openings 332 disposed therein. In the reflector array 306, the plurality of reflectors 318 are arranged in a plurality of groupings of reflectors 334, with each reflector in each of the plurality of groupings of reflectors 334 being disposed proximate to one of the openings 332. Such an arrangement facilitates incorporation of a relatively large number of reflectors while allowing different groupings of the plurality of groupings of reflectors 334 to be independently rotated. Additionally, the plate-like nature of the rotating support 326 facilitates the reflector array 306 having a low profile design to reduce environmental effects such as wind loading.

Each grouping of reflectors of the plurality of groupings of reflectors 334 is disposed on one of the plurality of reflector support elements 320. The plurality of reflector support elements 320 each extend parallel one another, and each of the plurality of groupings of reflectors is a portion of a row of reflectors. That is, the reflector array 306 includes a plurality of parallel rows of reflectors. Such an arrangement facilitates efficient co-alignment of the plurality of reflectors by rotation of the rotating support 326 about an array axis of rotation 336. An array actuator (not depicted) may be centrally disposed beneath the rotating support 326 and, in response to control signals from the control system 308 may rotate the rotating support 326 about the array axis of rotation 336.

Each of the plurality of reflector support elements 320 is a plate disposed proximate to one of the openings 332 in the rotating support 326. In the depicted embodiment, the plurality of reflector support elements 320 are sized based on their position on the rotating support 326 as well as a number of reflectors disposed thereon. In embodiments, each grouping of reflectors comprises a plurality of reflectors having a constant spacing (e.g., outer peripheral edges of adjacent reflectors may be separated from one another by a common minimum separation distance). For example a first reflector support element 338 of the plurality of reflector support elements 320 includes a first grouping of reflectors 340. Each reflector in the first grouping of reflectors 340 has the same size and shape. Due to the proximity of the first reflector support element 338 to the peripheral edge of the rotating support 326, the first grouping of reflectors 340 includes only three reflectors.

A second reflector support element 342 of the plurality of reflector support elements 320 includes a second grouping of reflectors 344. Because the second reflector support element 342 is centrally located on the rotating support 326, the second reflector support element 342 is larger than the first reflector support element 338 and therefore includes a greater number of reflectors. Like the first grouping of reflectors 340, each reflector in the second grouping of reflectors 344 has the same size and shape. In embodiments, the reflectors of the second grouping of reflectors 344 are the same size as the reflectors in the first grouping of reflectors 318, and have the same spacing. Embodiments are envisioned where different reflector support elements include groupings of reflectors differing in at least one of size, shape, and spacing. For example, the depicted embodiment includes a third reflector support element 346 of the plurality of reflector support elements 320 that includes a third grouping of reflectors 348. The third grouping of reflectors 348 includes five reflectors, the five reflectors including a first reflector 350 and a second reflector 352. The first reflector 350 has a size and shape that is similar to the reflectors of the first and second groupings of reflectors 340 and 344. The second reflector 352 is shaped differently and generally smaller than the first reflector 350. As exemplified by the third grouping of reflectors 348, the reflector array 306 may include a plurality of different mirror geometries to facilitate targeting of a wide range of sensors (e.g., with smaller detector element size or IGFOV than those targeted through reflectors similar to the first reflector 350). Each grouping of the plurality of groupings of reflectors 334 may include any combination of reflector geometries (e.g., varying in reflector elements size, spacing, coating, geometry, and the like) to facilitate the targeting of a wide variety of sensors.

Referring still to FIG. 3B, the reflector array 306 further includes a plurality of elevation adjustment actuators 354. Each of the elevation adjustment actuators 354 is disposed between two of the openings 332 in the rotating support 326. In embodiments, each of the elevation adjustment actuators 354 is coupled to a pair of the plurality of reflector support elements 320 to facilitate simultaneous rotation of the pair of reflector support elements between reflecting positions and the stowed position depicted in FIG. 3C. Each pair of the reflector support elements forms a row of reflectors. As such, each elevation adjustment actuator 354 is configured to adjust an elevation angle of an entire row of reflectors simultaneously. Alternative embodiments where each reflector support element has its own elevation adjustment actuator are also envisioned. Embodiments are also envisioned where the reflector array 306 includes less elevation adjustment actuators 354 than rows of reflectors, and mechanical linkages between various combinations of the rows may be used to facilitate simultaneous rotation of any combination of rows via a single one of the elevation adjustment actuators 354.

As depicted in FIG. 3C, when the plurality of reflector support elements 320 are placed in the stowed position, none of the plurality of reflectors 318 are visible, as each of the plurality of reflectors points underneath the rotating support 326 towards the surface on which the reflector array 306 is disposed. Such a configuration facilitates protecting reflective surfaces of the plurality of reflectors 318 from external debris. While FIG. 3C depicts each of the plurality of reflector support elements 320 in the stowed position simultaneously, it should be understood that each of the plurality of reflector support elements 320 may be stowed individually or in any pattern with any sub-combination other ones the plurality of reflector support elements 320. This way, the amplitude of the illumination signal reflected by the reflector array 306 may be adjusted to facilitate characterizing imaging systems with a wide variety of signal amplitudes.

FIG. 3D depicts a close-up view of the area 3D of FIG. 3C. The elevation adjustment actuator 354 is disposed on the surface 305 of the rotating support 326. Each elevation adjustment actuator 354 includes a rotating element 358 that rotates about an elevation axis 360. A rotating arm 362 is attached to the rotating element 358 such that the rotating arm 362 rotates in conjunction with the rotating element 358. The rotating arm 362 extends substantially perpendicular to the elevation axis 360. A reflector support element 364 (i.e., one of the plurality of reflector support elements 320) is attached to the rotating arm 362 (e.g., at a peripheral edge thereof) such that the reflector support element 364 is offset by a distance 368 from the elevation axis 360. The reflector support element 364 thus rotates around the elevation axis 360 (e.g., with a rear surface of the reflector support element 364 facing the elevation axis 360). In embodiments, the distance 368 is equal to a distance between the elevation axis 360 and the upper surface 356 of the rotating support 326 such that, when the reflector support element 364 is rotated to the stowed position, the rear surface of the reflector support element 364 is co-planar with the upper surface 356. That is, when all of the plurality of reflectors 318 are placed in the stowed position, the rear surfaces of the plurality of reflector support elements 320 and the upper surface 356 are co-planar to form a substantially smooth surface. Such a smooth surface suppresses the effects of wind conditions when the reflector array 306 is exposed to a harsh environment.

It should be appreciated that a variety of reflector arrays are contemplated for use in the plurality of calibration nodes 104 of the calibration system 100 described herein. For example, in embodiments, each of the plurality of reflectors 318 is individually adjustable (e.g., the reflector array 306 may include one of the plurality of reflector support elements 320 for each reflector). In embodiments, each of the plurality of reflectors 318 are coupled to one of the plurality of reflector support elements 320 via an actuator that is configured to adjust the orientation of reflective surfaces of the plurality of reflectors 318 relative to the plurality of reflector support elements 320 by a predetermined amount (e.g., 5°) about an axis. Such actuators allow selected ones of the plurality of reflectors 318 (e.g., via the control system 308) to direct the illumination light 304 (see FIG. 3A) away from the user sensor 316 in a predetermined pattern. Such actuators may be used to provide dithered or pulsed signals to the user sensor 316. During "off" times, when the actuators are used to direct the illumination light 304 away from the user sensor 316, the user sensor 316 may capture a base calibration image that may be used for background subtraction to eliminate a background of a calibration image captured with the plurality of reflectors 318 directing light towards the user sensor 316.

Embodiments are also envisioned where the reflector array 306 includes a plurality of covers configured to selectively cover the plurality of reflectors 318. In embodiments, for example, the reflector array 306 includes a plurality of covers rotatably attached to each of the plurality of reflector support elements 320. Each cover may correspond in peripheral shape to one of the plurality of reflectors 318 (or a grouping of the plurality of reflectors 318). The reflector array 306 may also include a plurality of latching mechanisms (e.g., disposed on rear surfaces of the plurality of reflector support elements 320, opposite to the plurality of reflectors 318) that are configured to selectively engage with the plurality of covers to maintain the covers in a covering position (e.g., extending over the plurality of reflectors 318) or allow the covers to rotate relative to the plurality of reflector support elements 320 (e.g., responsive to activation of the elevation adjustment actuators 354) to uncover the reflectors. By selectively activating various combinations of the cover latching mechanisms and rotating the plurality of reflector support elements 320, various patterns of illumination light 304 may be reflected towards the user sensor 316.

The plurality of calibration nodes 104 of the calibration system 100 described herein may include any number of reflectors. For example, embodiments are envisioned where one of the plurality of signal nodes 108 (see FIG. 1A) includes only a single reflector. Such a reflector may be adjustable (e.g., to track the trajectory of the plurality of user sensors 102) or stationary. Moreover, embodiments are also envisioned where a single one of the plurality of calibration nodes 104 includes multiple reflector arrays. In an example, one of the plurality of calibration nodes 104 described herein may include two or more reflector arrays that are similar in structure to the reflector array 306 described herein with respect to FIGS. 3A-3B.

Figure 3E:
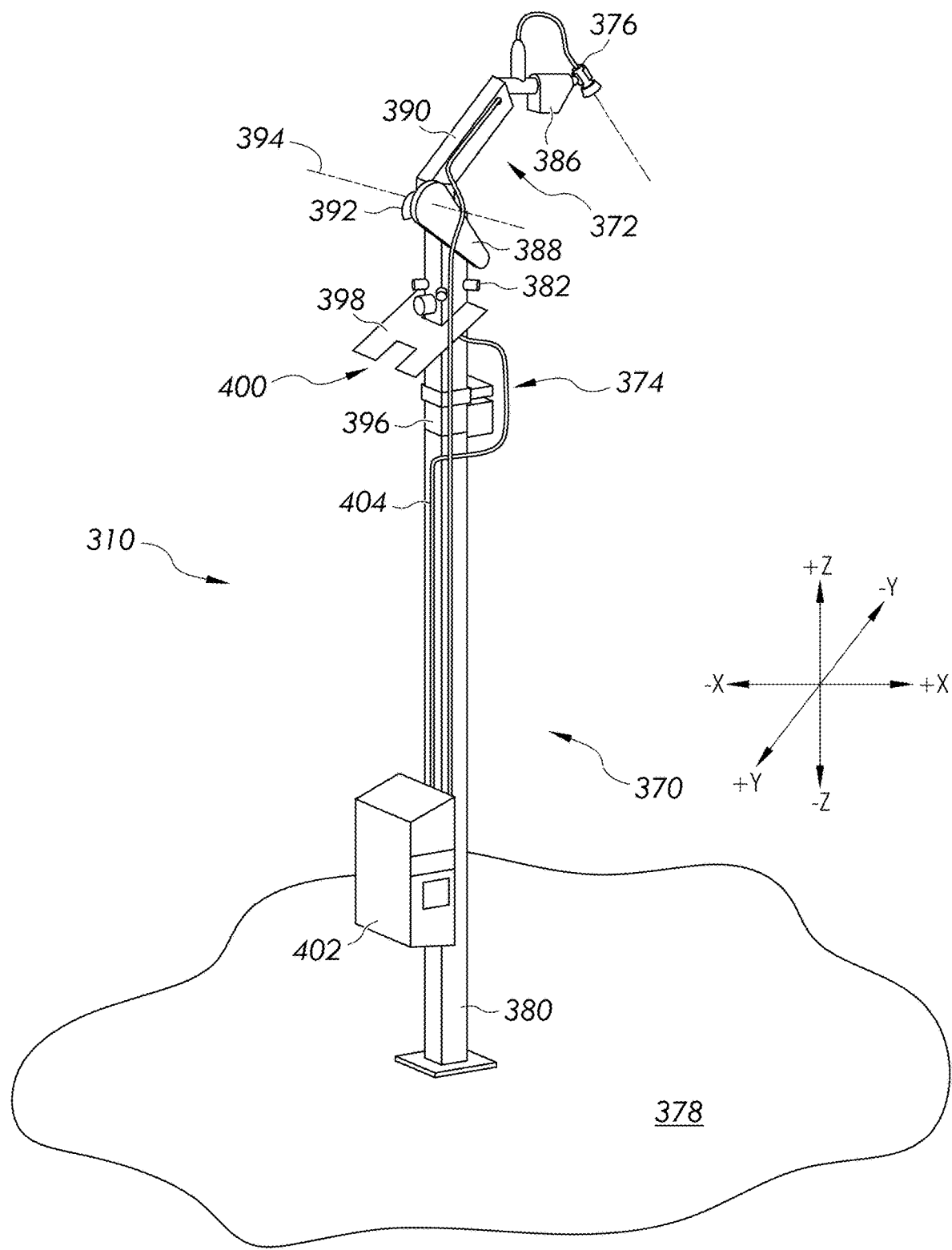
FIG. 3E schematically depicts a field spectral radiometer of the calibration node of FIG. 3A, according to one or more embodiments described herein.
Figure 3F:
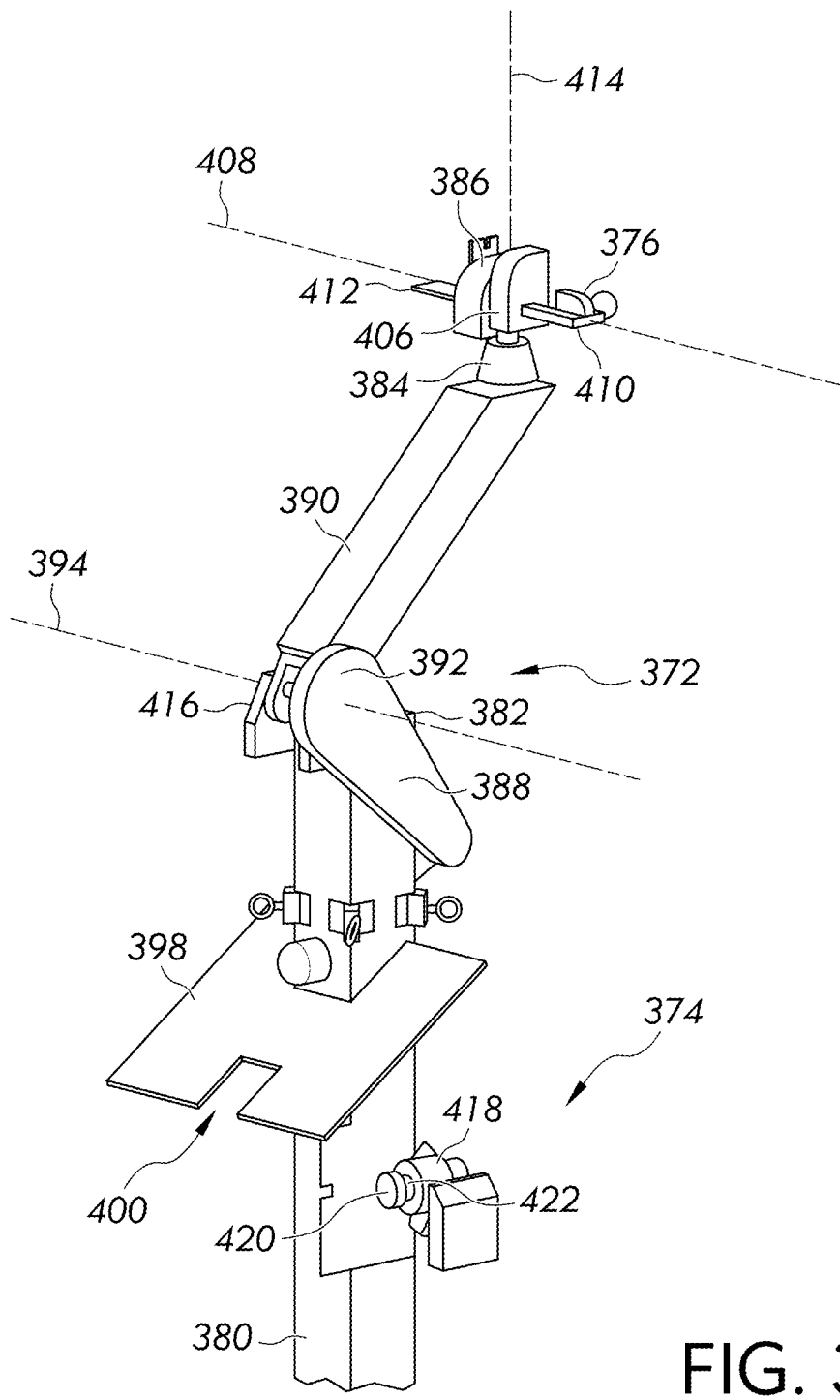
FIG. 3F schematically depicts a close-up view of a remote viewing head and deployment arm of the field spectral radiometer of FIG. 3E, according to one or more embodiments described herein.
Figure 3G:
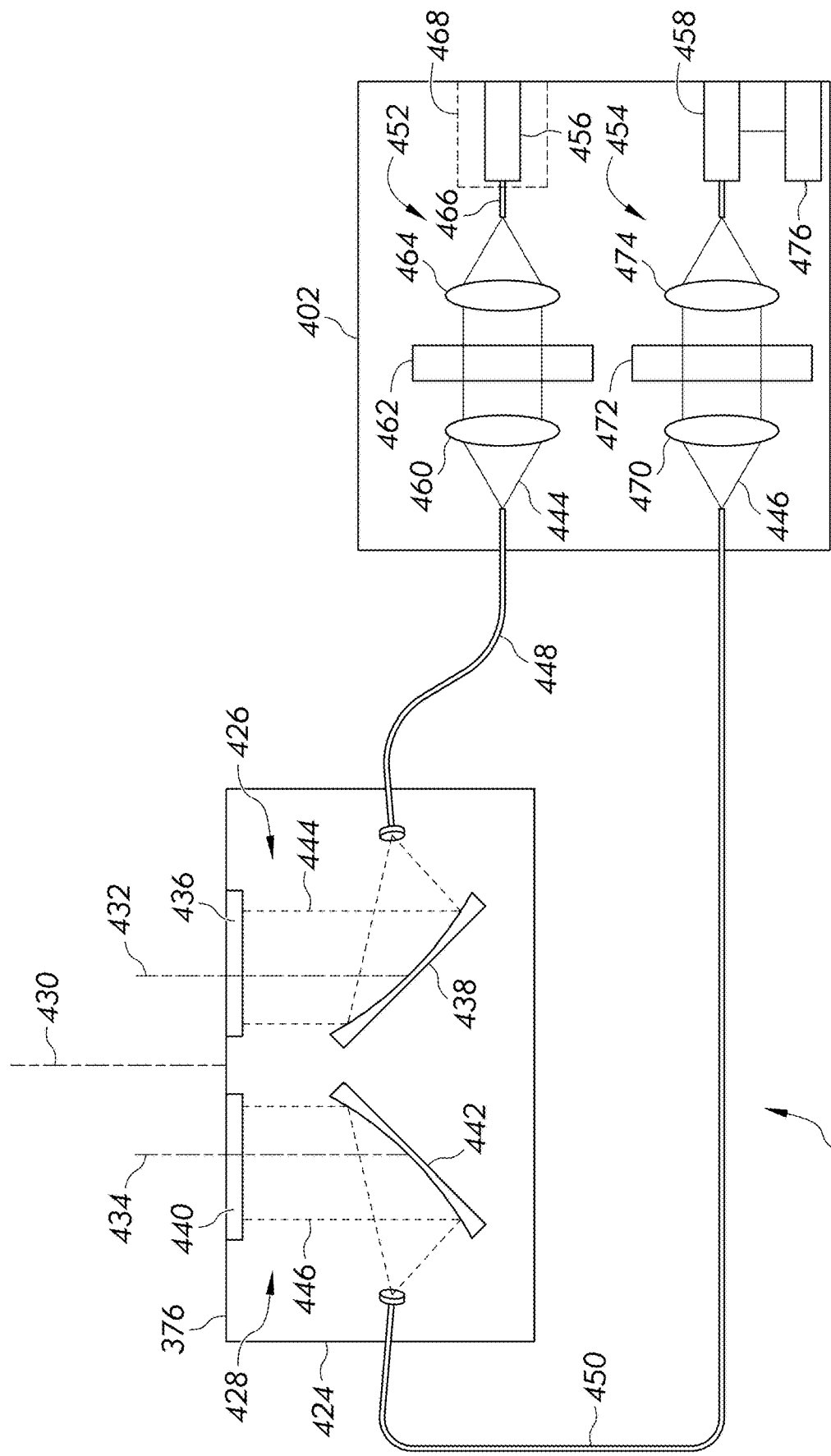
FIG. 3G schematically depicts optical paths associated with optical channels measured via the field spectral radiometer of FIG. 3E, according to one or more embodiments described herein.

Referring now to FIGS. 3E-3G, various aspects of the filed spectral radiometer 310 of the calibration node 300 are depicted in greater detail, according to an example embodiment. FIG. 3E depicts a perspective view of the field spectral radiometer 310 with a support structure 370 thereof being in a measurement position. FIG. 3F depicts a detailed view of a deployment arm 372 and a calibration assembly 374 of the field spectral radiometer 310. FIG. 3G schematically depicts components of optical channels measured via a remote sensing head 376 of the spectral radiometer, according to one or more embodiments described herein.

As depicted in FIG. 3E, the field spectral radiometer 310 includes a support structure 370 disposed on a surface 378. In embodiments, the surface 378 corresponds to a surface upon which a plurality of components (e.g., the reflector array 306, the control system 308, and the antenna 312) of the calibration node 300 depicted in FIG. 3A are disposed. In embodiments, the surface 378 may correspond to an environmental surface or the ground (e.g., pavement, grass, water etc.). In embodiments, the field spectral radiometer 310 (and other components of the calibration node 300) is disposed on a movable entity or vehicle, and the surface 378 may correspond to a surface of the vehicle. The surface 378 may largely vary in reflectance attributes and have various different dependencies on viewing/illumination angle depending on the situation in which the field spectral radiometer 310 is being used.

The field spectral radiometer 310 includes a remote sensing head 376 and a camera (not depicted) disposed at an end of the support structure 370. The support structure 370 includes a base 380 attached to the surface 378 and a deployment arm 372 extending from the end 382 of the base 380. The remote sensing head 376 and the camera are attached to an end 384 of the deployment arm 372 (see FIG. 3F) via a rotating support 386. In embodiments, the rotating support 386 comprises a first component that is rotatable relative to the deployment arm 372 about a first axis of rotation (e.g., such that the azimuthal orientations of the remote sensing head 376 and the camera are adjustable between 0 and 360 degrees so that the field spectral radiometer 310 is capable of conducting a complete survey of the environment). In embodiments, the remote sensing head 376 and the camera are pivotally coupled to the first component of the rotating support 386 such that the remote sensing head 376 and camera are rotatable about a second axis of rotation extending substantially perpendicular to the first axis of rotation. Such pivotal coupling facilitates adjustment of elevation angles of imaging axes (e.g., central axes) of the remote sensing head 376 and the camera relative to a direction of extension of the surface 378 (e.g., the X-direction of the coordinate axis depicted in FIG. 3A).

In embodiments, relative angles between the imaging axes of the remote sensing head 376 and the camera and the surface 378 are adjustable between −90 degrees (e.g., where the imaging axes point straight downward towards the surface 378 with the deployment arm 372 in the configuration depicted in FIG. 3A) and positive 90 degrees (e.g., where the imaging axes point straight upwards away from the surface 378) to facilitate the field spectral radiometer 310 capturing reflectance measurements from the surface 378 and radiance/irradiance measurements of the illumination source 302 (see FIG. 3A) at various different orientations. In embodiments, the rotating support 386 is a pan-tilt camera mount such as the PTU-5 from FLIR® Systems, Inc.

In embodiments, the deployment arm 372 comprises a first portion 388 coupled to the end 382 of the base 380 and a second portion 390 attached to the first portion 388 by a rotating connection 392 (e.g., a joint, a hinge, an axle, or the like). The rotating connection 392 includes an actuator (not depicted in FIG. 3E) coupled to the control system 308 that rotates an end of the second portion 390 about a deployment axis 394 so that the second portion 390 can be moved between a stowed (or calibration) position and a measurement position (or a plurality of measurement positions). FIG. 3E depicts the second portion 390 in a measurement position where the field spectral radiometer 310 captures measurements of the surrounding environment. In the depicted measurement position, the second portion 390 of the deployment arm 372 extends at an angle to the first portion 388. In embodiments, when the second portion 390 is in the measurement position depicted in FIG. 3E, the remote sensing head 376 and camera are disposed a height of greater than or equal to 1 meter (e.g., greater than or equal to 5 meters, greater than or equal to 10 meters) above the surface 378 to facilitate capturing measurements at a variety of viewing angles unobstructed by various objects disposed on the surface 378. The remote sensing head 376 may be disposed any distance from the surface 378, depending on the implementation.

Referring still to FIG. 3E, the field spectral radiometer 310 further includes a calibration assembly 374. In embodiments, the calibration assembly 374 includes a calibrated light source (e.g., a diffuse light source disposed in an integrating sphere). The calibration assembly 374 is disposed on the base 380 and positioned to receive the remote sensing head 376 when the second portion 390 of the deployment arm 372 is placed in a stowed position. In embodiments, the calibration assembly 374 includes a housing 396 including an opening (not depicted in FIG. 3E) that conforms in shape to the remote sensing head 376 such that the remote sensing head 376 and a portion of the rotating support 386 are inserted therein when in the stowed position. Such an arrangement beneficially seals the housing from external light to facilitate accurate calibration of the field spectral radiometer 310. In embodiments, a guard plate 398 is disposed on the base 380 and includes a slot 400 to receive the second portion 390 when placed in the stowed position. In embodiments, the guard plate 398 is omitted.

The field spectral radiometer 310 also includes an instrumentation assembly 402 disposed on the base 380. The instrumentation assembly 402 may house detectors that generate signals from light captured in the optical paths initiated at the remote sensing head 376 so that radiometric data may be captured. The detectors may be temperature controlled to facilitate accurate measurements. Such temperature control may require bulky electronics and temperature conditioning hardware. By placing the instrumentation assembly 402 away from the point at which light is captured (e.g., the remote sensing head 376 and the camera), the components of the instrumentation assembly 402 do not obfuscate the fields of view of the camera and remote sensing head 376. Moreover, since the light-capturing components of the camera and remote sensing head 376 are relatively compact as compared to the components of the instrumentation assembly 402, such positioning of the instrumentation assembly 402 away from the second portion 390 of the deployment arm 372 and the rotating support 386 facilitates flexible manipulation of the orientation thereof.

To provide light captured by the remote sensing head 376 to the instrumentation assembly 402, the field spectral radiometer 310 further includes a fiber assembly 404. The fiber assembly 404 includes a plurality of optical fibers extending between the remote sensing head 376 and the instrumentation assembly 402 to deliver light collected by the remote sensing head 376 to detection paths disposed in the instrumentation assembly 402. In embodiments, the plurality of optical fibers of the fiber assembly 404 includes one optical fiber for each optical channel measured by the field spectral radiometer 310. For example, in the depicted embodiment, the fiber assembly 404 includes a first optical fiber associated with a first optical channel (e.g., including light having a wavelength greater than or equal to 0.3 µm and less than or equal to 1.1µ) and a second optical fiber associated with a second optical channel (e.g., including light having a wavelength greater than or equal to 0.8 µm and less than or equal to 2.5 µm). As described in greater detail herein, the remote sensing head 376 may include optics that divides light from the illumination source 302 (or reflected from the surface 378) into spectral components and reflects the spectral components into the fibers of the fiber assembly 404. Each fiber of the fiber assembly 404 may include a core covered by a cladding layer. In embodiments, the sizing of the core is selected to achieve a desired field of view for each optical channel based on the effective aperture of optics associated with each channel. In embodiments, the fiber core diameter for the fibers in the fiber assembly is 200 µm, though other-sized fibers are contemplated and within the scope of the present disclosure. Moreover, fibers having different core size or materials for each of the optical channels may also be used.

In the depicted embodiments, the fiber assembly 404 is external to the support structure 370 and is held to the support structure 370 via a plurality of support mounts attached to an external surface of the support structure 370. The fibers are loosely tensioned proximate to the rotating connection 392 to prevent the fiber from becoming tangled upon rotation of the second portion 324 of the deployment arm 372. It should be understood that alternative routing schemes for the fiber assembly 404 are contemplated and within the scope of the present disclosure. For example, in embodiments, the fibers may be routed inside of the support structure 370 through a cavity (not depicted) defined therein. Such a structure beneficially protects the fibers from environmental conditions. Moreover, the fibers may be routed to avoid fiber twisting and bending signal loss. In embodiments, the fibers of the fiber assembly 404 are bent at a radius that is greater than or equal to a minimum bending radius specified for the fiber to avoid signal loss. While the fibers are shown to continuously extend between the remote sensing head 376 and the instrumentation assembly 402, embodiments are also envisioned where optical interconnects are disposed between the remote sensing head 376 and the instrumentation assembly 402 to facilitate a particular routing scheme of the fibers (e.g., around the rotating connection 392).

FIG. 3F depicts a close-up view of the deployment arm 372. As shown, the rotating support 386 includes a first component 406 rotatable relative to the deployment arm 372 about a first axis of rotation 408. The rotating support 386 further includes support platforms 410 and 412 attached to the first component 406 via an actuator (not depicted) defining a second axis of rotation 414. The second axis of rotation 414 extends through the support platforms 410 and 412. The remote sensing head 376 and camera are each mounted on one of the support platforms 410 and 412 such that fields of view of the remote sensing head 376 and camera are rotatable about two axes of rotation to allow the field spectral radiometer 310 to capture a complete survey of the environment. FIG. 3F also depicts an actuator 416 disposed at the rotating connection 392 to facilitate rotation of the second portion 390 of the deployment arm 372 relative to the first portion 388 about the deployment axis 394.

FIG. 3F also depicts the calibration assembly 374 with the housing 396 of FIG. 3A removed. The calibration assembly 374 includes an integrating sphere 418 with a calibrated light source (not depicted) disposed therein. In embodiments, the calibrated light source includes a broadband light source emitting light covering a combined spectral range of the optical channels measured via the remote sensing head 376. In embodiments, the calibrated light source includes a tungsten halogen light source, a plasma-based light source, a plurality of discrete light emitting diodes individually covering one or more wavelength ranges of interest, and one or more broadband light emitting diodes. In embodiments, the calibrated light source comprises a plurality of different types of light sources (e.g., both narrow band light emitting diodes and broadband light emitting diodes). In embodiments, the calibrated light source is calibrated from 300 nm to 2500 nm with a spectrometer prior to insertion into the calibrated sphere so that the calibrations performed thereby are traceable relative to a known calibration standard. In embodiments, the calibrated light source is calibrated prior to calibration assembly 374 being integrated into the field spectral radiometer 310 (e.g., while not disposed on the field spectral radiometer 310). For example, after the calibration assembly 374 is built, a traceable spectral radiometer (e.g., previously calibrated using a calibrated light source) may be positioned in an expected position of the remote sensing head 376 and observe an exit port of the integrating sphere 418. The light source may be calibrated based on the response of the traceable field spectral radiometer.

In embodiments, the integrating sphere 418 may include a diffuse reflective surface defining a cavity in which light emitted by the calibrated light source propagates. The light may reflect off of the diffuse reflective surface such that spectrally uniform calibration light is emitted from an exit port 420 of the integrating sphere 418. A receptacle 422 is attached to the integrating sphere 418 that includes an opening aligned with the exit port 420. In embodiments, the receptacle 422 is sized to engage with the remote sensing head 376 such that, when the remote sensing head 376 is placed in the stowed position, a sensing window of the remote sensing head 376 is aligned with the exit port 420 to receive the calibration light from the integrating sphere 418 with the optical paths associated with each optical channel are unchanged for calibration of the detectors associated therewith. The integrating sphere 418 is mounted on the base 380 a distance from the end 382 that may be at least a combined length of the second portion 390 of the deployment arm 372, the rotating connection 392, and a portion of the rotating support 386 so that, when the deployment arm 372 is rotated to the stowed position, the sensing window of the remote sensing head 376 and an opening in the receptacle 422 are aligned so that the remote sensing head 376 receives calibration light.

FIG. 3G schematically depicts various components of the remote sensing head 376 and the instrumentation assembly 402 of the field spectral radiometer 310 described herein with respect to FIGS. 3E and 3F. As shown, in embodiments, the remote sensing head 376 includes a body 424 that houses optical components defining a first optical path 426 and a second optical path 428. In embodiments, the body 424 includes a central axis 430 defining a viewing angle of the remote sensing head 376. That is, the direction in which the central axis 430 points may define the direction from which light is captured by the remote sensing head 376. For example, if the central axis 430 is pointing towards the surface 378 upon which the field spectral radiometer 310 is disposed (see FIG. 3E), the remote sensing head 376 may take a reflectance measurement of the surface 378. The first and second optical paths 426 and 428 include a first optical axis 432 and a second optical axis 434, respectively. In the depicted embodiment, the first and second optical axes 432 and 434 extend parallel to the central axis 430 and are disposed equidistant from the central axis 430 in a direction perpendicular to the central axis 430. It should be understood that various alternative embodiments are envisioned and contemplated. For example, the axis defining a viewing angle of the remote sensing head 376 may not be centered in the body 400, or the first and second optical axes 432 and 434 may not be disposed equidistant from the central axis 430. Moreover, in embodiments, the first and second optical axes 432 and 434 may not extend parallel to the central axis 430 (or any other axis defining a general viewing direction of the remote sensing head 376).

The first optical path 426 includes a first viewing window 436 and a first optical element 438, while the second optical path 428 includes a second viewing window 440 and a second optical element 442. In embodiments, the first and second optical elements 438 and 442 are each the same size and shape to define similar fields of view for different optical channels measured thereby. In embodiments, the components of the first and second optical paths 426 and 428 are selected based on the wavelength range of interest associated with the optical channel measured thereby. For example, light 444 associated with a first optical channel is shown to be propagating through the first optical path 426 and light 446 associated with a second optical channel is shown to be propagating through the second optical path 428. In embodiments, the optical components of the first and second optical paths 426 and 428 are selected to filter out light not within a wavelength range of interest associated with a particular optical channel. In embodiments, for example, the first channel is associated with UV/visible/NIR light (e.g., the light 444 has a wavelength that is greater than or equal to 0.3 μm and less than or equal to 1.1 μm), and the first optical element 438 is coated with a UV-enhanced aluminum coating to facilitate the reflection of light at such wavelengths. In embodiments, the first window 436 filters light outside of the wavelength range of interest of the first channel. In embodiments, the second channel is associated with NIR/SWIR light (e.g., the light 446 has a wavelength that is greater than or equal to 0.8 µm and less than or equal to 2.5 µm), and the second optical element 442 is gold coated to facilitate reflection of such wavelengths. In embodiments, the second window 440 filters light outside of the wavelength range of interest of the second channel. In embodiments, the first and second windows 436 and 440 are combined such that the remote sensing head 376 has a single viewing window with the central axis 430 extending through the viewing window. In embodiments, the first and second windows 436 and 440 are optical assemblies that condition light from a target prior to entry of the light into the body 424.

As depicted in FIG. 3G, the first optical element 438 is a parabolic mirror offset from the central axis 430 and focuses the light 444 of the first channel towards a first optical fiber 448. In embodiments, a tip of the first optical fiber 448 is positioned approximately at a focal point of the first optical element 438 to facilitate coupling. The effective focal length of the first optical element 438 and the diameter of the first optical fiber 448 may determine the effective field of view of the first optical path 426 for the light 444 in the first channel. In embodiments, the effective focal length of the first optical element 438 is approximately 50.8 mm and the first optical fiber 448 may have a core diameter of 200 µm, yielding a field of view in the first channel of 0.225 degrees. The second optical path 428 may be constructed similarly to the first optical path 426 such that the light 446 associated with the second channel is directed into a second optical fiber 450. The first and second optical fibers 448 and 450 may be components of the fiber assembly 404 described herein with respect to FIGS. 3E and 3F. As such, the depicted structure of the remote sensing head 376 facilitates separation of incoming light into separate optical fibers with minimal components, rendering the remote sensing head 376 compact. It should be understood that alternative configurations for coupling the different channels to separate optical fibers are contemplated and within the scope of the present disclosure. Any suitable number of optical components may be used consistent with the present disclosure.

In embodiments, the fields of view of the first and second optical paths 426 and 428 are less than or equal to 0.22 degrees (FWHM). Such relatively narrow fields of view allow the first and second optical paths to be overfilled by the illumination source 302 (e.g., the solar or lunar disc, see FIG. 3A) to allow a direct radiance measure of various targets. In embodiments, the effective focal lengths of the first and second optical elements 438 and 442 and/or the sizes of the first and second optical fibers 448 and 450 may be selected to enlarge the fields of view of the first and second optical paths 426 and 428 (e.g., to greater than or equal to 0.53 degrees, or about 1 degree). Such larger fields of view facilitates the illumination source 302 under-filling each of the first and second optical paths 426 and 428 to allow either the direct radiance or irradiance associated with a particular target to be measured.

Referring still to FIG. 3G, the instrumentation assembly 402 is shown to include a first detection path 452 and a second detection path 454. The first detection path 452 receives light from the first optical fiber 448 of the fiber assembly 404, and directs the light 444 associated with the first optical channel to a first detector 456 that receives the light 444 and generates a radiometric signal associated with the first optical channel. The second detection path 454 receives light from the second optical fiber 450 of the fiber assembly 404, and directs the light 446 towards a second detector 458 that receives the light 446 and generates a radiometric signal associated with the second optical channel. Separation of different optical channels into different detection paths facilitates the field spectral radiometer 310 having a high dynamic range for a wide variety of measurements. As described herein, the field spectral radiometer 310 is capable of performing direct radiometric measurements of the solar disc, as well as surface-level spectral reflection (such as from pavement or grass, which may only have a reflectance of a few percentage points). That is, the field spectral radiometer is capable of measuring radiances/irradiances from targets providing light having a wide array of amplitudes. Based on a ratio of typical measured solar disc irradiances and reflectance values from grass or pavement, the dynamic range requirements of the field spectral radiometer 310 may be expressed as $1.5 \times 10^{-6} * SNR_{min}$, with $SNR_{min}$ being a minimum desired signal-to-noise ratio of the radiometric data generated by the field spectral radiometer 310. For example, if a desired minimum signal-to-noise ratio is 10, the dynamic range of the field spectral radiometer 310 may be $1.5 \times 10^{-5}$.

Splitting the first and second optical channels into the first and second detection paths 452 and 454 facilitates achieving such a dynamic range by enabling the use of different detectors optimized for each channel. For example, the first detection path 452 is shown to include a first collimating lens 460, a first optical indexer 462, a first focusing lens 464, a detection fiber 466, and the first detector 456. The first collimating lens 460 collimates light after emittance from the first optical fiber 448. The first optical indexer 462 includes a plurality of intensity-reducing elements so as to render the portion of the light 444 that is transmitted therethrough adjustable to provide the required dynamic range. For example, the first optical indexer 462 may include an open slot with no filtering element, a first neutral density filter transmitting a first relatively low percentage of the light 444 (e.g., 1.0%), a second neutral density filter transmitting a second lower percentage of the light 444 (e.g., 0.1%), a third filter transmitting a third even lower percentage of the light 444 (e.g., 0.01%, as a combination of the first neutral density filter in a pinhole), and a fourth filter transmitting a fourth even lower percentage of the light 444 (e.g., 0.001%. as a combination of the second neutral density filter and the pinhole). Such varying transmittance allows attenuation of relatively high radiance sources (e.g., the solar disk) while still providing the capability of measuring low radiance sources (e.g., reflectance measurements from grass) by not filtering the incoming radiation.

In embodiments, the first detector 456 is a diffraction-based high resolution spectrometer (such as the Ocean Insight QE Pro). Such instrumentation are temperature-sensitive. Accordingly, to maintain the first detector 456 at preferred operating temperature range (e.g., approximately −10° C.) to stabilize the responsivity of the first detector 456, the first detector 456 is housed in a temperature-controlled chamber 468. In embodiments, a body of spectrometer incorporating the first detector 456 is maintained at approximately 20° C. in order to stabilize the response in terms of wavelength registration (e.g., holding the optics and body of the spectrometer at such a temperature may stabilize the optical performance of the spectrometer). Temperature within the temperature-controlled chamber 468 may be controlled via a bi-directional temperature controlling apparatus or the like to facilitate precise measurements by the first detector 456. Portions of the light 444 that are transmitted through the first optical indexer 462 are focused by the first focusing lens 464 into the detection fiber 466. The detection fiber 466 allows the first optical indexer 462 to be disposed outside of the temperature-controlled chamber 468 and permits flexibility for the overall design of the instrumentation assembly 402.

Referring still to FIG. 3G, the second detection path 454 is shown to include a second collimating lens 470, a second optical indexer 472, a second focusing lens 474, and a second detector 458. The second collimating lens 470 collimates light after emittance from the second optical fiber 450. The second optical indexer 472 includes a plurality of bandpass filters that transmit different spectral portions of the light 446 depending on the application. Each bandpass filter may transmit a different spectral band of light, which each spectral band of light having different center wavelengths. In embodiments, the second optical indexer 472 comprises eight bandpass filters emitting bands centered at 865 nm (for NIR measurement applications), 1240 nm (e.g., for measurement of cloud particulate sizes), 1375 nm (e.g., for cloud detection), 1605 nm (e.g., for detection of water in the atmosphere), 1660 nm (e.g., for mineral detection), 2130 nm (e.g., for detection of dust and aerosols), 2215 nm (e.g., detection of hydrocarbons), and 2250 nm (e.g., for cloud detection). Various other sets and combinations of bandpass filters are contemplated and within the scope of the present disclosure. In embodiments, the second optical indexer 472 includes a bandpass filter emitting spectral bands associated with the first optical path 426 to facilitate crossover measurements (e.g., where the optical signals typically measured via the first detection path 452 are measured via the second detection path 454). Such crossover measurements enable comparison of the detection signals generated via the first and second detection paths 452 and 454 and adjustment of the first and second detection paths 452 and 454 for alignment.

After filtration via the second optical indexer 472, the second focusing lens 474 focuses the filtered light 446 onto the second detector 458 for generation of radiometric data. In embodiments, the second detector 458 is semiconductor alloy-based detector (e.g., constructed of InGaAs). A pinhole may be provided in front of the second sensor 458 if needed to prevent saturation. In the depicted embodiment, the longer wavelength, second channel is measured using a filtered single-channel radiometer to provide sensitivity, a relatively high signal-to-noise ratio, and stability for measurements in the second channel. The second detector 458 may be temperature regulated with an integrated thermal-electric element 476 to precisely control the temperature of the semiconductor alloy-based detector (e.g., at approximately −60° C.) to ensure low uncertainty measurements. While the depicted embodiment includes a single channel radiometer/filter combination for the second channel, it should be understood that alternative embodiments where a multi-channel spectral radiometer is used for measurements of the second channel is contemplated and within the scope of the present disclosure. While, in the depicted embodiment, the first and second detection paths 452 and 454 include a single filter indexer, it should be understood that embodiments are envisioned where the first and second detection paths 452 and 454 include a plurality of filter indexers disposed in series to achieve different combinations of attenuation, bandpass, or both attenuation and bandpass.

With reference to FIG. 3A, it should be understood that the calibration node 300 (or any of the plurality of calibration nodes 104 of the calibration system 100 described herein with respect to FIGS. 1A and 1B) may vary in structure from the example described herein with respect to FIGS. 3B-3C. For example, different combinations of signal instrumentation may be used in place of the reflector array 306 (e.g., diffuse reflectors, polarization-selective reflectors, patterned detectors, frequency filtering reflectors, light sources). Sensing instrumentation other than the field spectral radiometer 310 may also be used in combination with the signal instrumentation. For example, embodiments are envisioned where at least some of the plurality of calibration nodes include a field spectral radiometer only measuring a single channel (e.g., covering a wider spectral range than the first and second optical channels measured by the remote sensing head 376 described with respect to FIGS. 3E-33G). Any sensing element (e.g., cameras, thermal sensors, humidity sensors, light detector) may be used in the plurality of calibration nodes 104. Moreover, it should be understood that embodiments are envisioned where some of the plurality of measurement nodes 106 (see FIG. 1A) only include the reflector array 306 (or any variation thereof, including a different number of reflectors disposed on a different support structure) and the plurality of signal nodes 108 (see FIG. 1A) only include the field spectral radiometer 310.

Having described the calibration node 300 in detail, and with the understanding that embodiments of the calibration system 100 described herein with respect to FIGS. 1A-2 are envisioned where the plurality of calibration nodes 104 include the calibration node 300 (or a plurality thereof), various processes that may be performed via the calibration system 100 will now be described in more detail.

Figure 4:
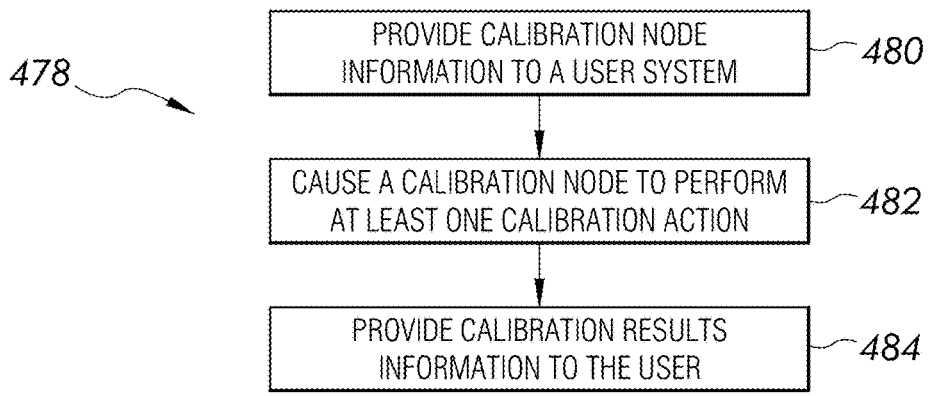
FIG. 4 depicts a flow diagram of a method of providing calibration information results to a user using a calibration system, according to one or more embodiments described herein.

FIG. 4 depicts a flow diagram of a method 478 of providing calibration results information generated via a plurality of calibration nodes to a user. The method 478 may be performed via the calibration system 100 described herein with respect to FIGS. 1A-2, wherein the plurality of calibration nodes 104 comprises the calibration node 300 described herein with respect to FIGS. 3A-3G. Accordingly, reference will be made to various components depicted in FIGS. 1A-3G to aid in the description of the method 478. The method 478 may be performed to calibrate one of the plurality of user sensors 102 (e.g., by calculating radiometric coefficients that may be used to correct images generated thereby) and/or provide the user measurement results obtained by one of the plurality of measurement nodes 106 (e.g., a radiance, irradiance, or reflectance measurement via the field spectral radiometer 310).

At block 480, calibration node information is provided to one of the plurality of user systems 116 (see FIG. 1B). In embodiments, a user may initiate an exchange of information with the calibration system 100. For example, via a network interface (e.g., similar to the network interface 204 described herein with respect to FIG. 2) of one of the plurality of user systems 116, a user may cause an information request to be received via the calibration management system 112. In response to the information request, the calibration management system 112 (e.g., via the node services module 210, the presentation module 212, and/or the data integration module 214) may provide information pertaining the location and measure/signal capabilities of the plurality of calibration nodes 104. The calibration node information may also describe the availability (e.g., in terms of time) of particular ones of the plurality of calibration nodes 104 for data collection. In embodiments, using such calibration node information (e.g., via the presentation module 212), a user may request measurement information (e.g., generated via the plurality of measurement nodes 106) or make a look request by providing information regarding one or more of the plurality of user sensors 102 (e.g., by providing location information to the calibration management system 112)

In embodiments, the calibration node information is provided to one of the plurality of user sensors 102 and/or one of the plurality of user systems 116 in an automated fashion. For example, some of the plurality of calibration nodes 104 may provide information (e.g., by way of transmitted signal or other information, such as a QR code, that may be accessed by the plurality of user sensors 102) directly to the plurality of user sensors 102. In such examples, the calibration node information may identify a particular one of the plurality of calibration nodes 104 and describe the information available or generated by that calibration node. In embodiments, the calibration node information is provided to one of the plurality of user sensors 102 and/or one of the plurality of user systems 116 in accordance with a predetermined schedule or continuously.

At block 482, the calibration management system 112 may cause one of the plurality of calibration nodes to perform at least one calibration action after the provision of the calibration node information. The calibration action may take a variety of forms and result in the collection of a wide variety of information. For example, in embodiments, the calibration management system 112 may cause the calibration node 300 (e.g. identified based on location information or other information provided by the user) to perform an environmental measurement. The calibration management system 112 (e.g. via the node services module 210) may cause the control system 308 to alter a configuration of the field spectral radiometer 310 (e.g., by rotating the deployment arm 372) to cause the remote sensing head 376 to capture one or more measurements (e.g., via the first detector 456 and/or the second detector 458) of the illumination source 302 or the surface 378. The measurement information collected via performance of the calibration action may include solar irradiance, solar radiance, or a surface reflectance of the surface 378 at the geographical location of the calibration node 300.

In embodiments, the calibration action performed via the calibration management system 112 may include providing calibration reference signal to one of the plurality of user sensors via signal instrumentation associated with one of the plurality of calibration nodes 104. For example, the calibration management system 112 may transmit a signal to the control system 308 to cause the reflector array 306 to orient itself based on a trajectory of one of the plurality of user sensors. In embodiments, the control system 308 may receive information regarding the illumination source 302 from the field spectral radiometer 310 or other information sources (e.g., the plurality of calibration nodes 104, $3^{rd}$ party information sources) regarding the positioning of the illumination source 302. Based on the generated and/or received information regarding the illumination source 302, the control system 308 may determine pointing directions (e.g., associated with particular azimuthal and elevation angles) for the plurality of reflectors 318.

After locations of one of the plurality of user sensors 102 and the illumination source 302 are determined, elevation and azimuthal angles associated with the plurality of reflectors 318 are adjusted. As described herein, the azimuthal pointing direction of the plurality of reflectors 318 may be adjusted by rotating the rotating support 326 (e.g., via an elevation adjustment actuator, not depicted, coupled thereto) about the array axis of rotation 336. The elevation angles of the plurality of reflectors 318 may be adjusted using the plurality of elevation adjustment actuators 354. The configuration of reflectors that are adjusted to direct light into the user sensor may be based on the user sensor being calibrated (e.g., in terms of size of the reflector and the number of reflectors). For example, in embodiments, each of the plurality of reflectors 318 in the reflector array 306 are sized to be smaller than field of view associated with a detecting element of the user sensor to facilitate the point response function analysis described herein.

In embodiments, it should be understood that some of the plurality of calibration nodes 104 may not perform discrete calibration actions like taking measurements or providing calibration signals. For example, in embodiments, at least some of the plurality of calibration nodes 104 may represent data points (e.g., with respect to a particular geographic location) that are augmented by data obtained via the calibration system 100 (e.g., via measurements and/or receipt of third party data). A user may query the calibration management system 112 for data associated with a location not corresponding to one of the plurality of calibration nodes 104, and the calibration management system 112 may estimate properties at that location.

Referring still to FIG. 4, at block 484, after performing the calibration action, the calibration management system 112 may cause calibration results information to be provided to the user. In embodiments, the calibration results information may be stored in the database 216 or transmitted to one of the plurality of user sensors 102 and/or plurality of user systems 116. The calibration results information may include radiometric coefficients (e.g., after receiving a calibration imaged generated by the user sensor). In such embodiments, the calibration results information may include information regarding the signal instrumentation of the calibration node 300 (e.g., the results of calibrating the field spectral radiometer 310 via the calibration assembly 374, a reflectance measurement of the reflector array 306 taken via the field spectral radiometer 310, a configuration of the plurality of reflectors 318). Such information may be used to further correct images generated via the plurality of user sensors.

In embodiments, the calibration results information comprises measurement results taken by one or more of the plurality of calibration nodes 104. In embodiments, the calibration management system 112 is configured to process the measurement results prior to provision to the user. For example, in embodiments, the calibration management system 112 (e.g., via the node services module 210) is configured to combine measurement data and information obtained via the data integration module 214 and provide an environmental conditions report to the user. Such information may be combined with a raw or processed calibration image captured via one of the plurality of user sensors 102, and enable a user to process the calibration image and calibrate a user sensor.

The method 478 may represent a calibration transaction between one of the plurality of user systems 116 and the calibration system 100 to obtain a desired set of information. It should be appreciated that users may interact with the calibration system 100 to obtain information regarding a plurality of user sensors 102 and/or obtain a plurality of measurements taken via the plurality of calibration nodes 104.

Figure 5A:
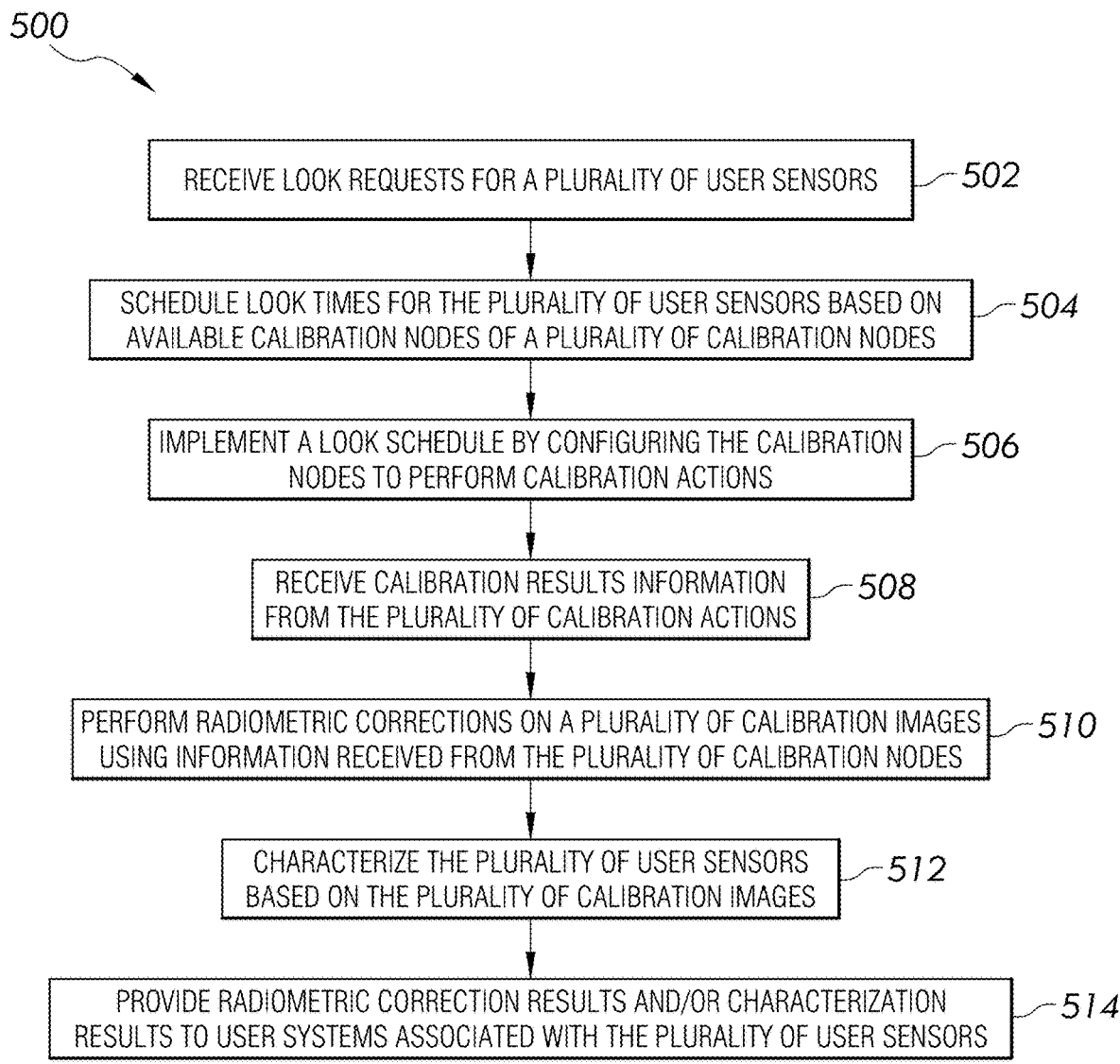
FIG. 5A depicts a flow diagram of a method of scheduling look requests for a plurality of user sensors and providing radiometric calibration or characterization results to a plurality of users, according to one or more embodiments described herein.

FIG. 5A depicts a flow diagram of a method 500 of scheduling look requests for a plurality of user sensors and providing radiometric calibration or characterization results to a plurality of users. The method 500 may be performed via the calibration system 100 described herein with respect to FIGS. 1A-2, wherein the plurality of calibration nodes 104 comprises the calibration node 300 described herein with respect to FIGS. 3A-3G. Accordingly, reference will be made to various components depicted in FIGS. 1A-3G to aid in the description of the method 500. The method 500 may be performed by the calibration management system 112 to arbitrate information requests from a plurality of different users (e.g., each associated with a different subset of the plurality of user sensors 102) and provide calibration results information results to the users in accordance with a schedule.

At block 502, the calibration management system 112 receives look requests for the plurality of user sensors 102. As described herein, the users may communicate with the calibration management system 112 via the plurality of user systems 116 to request various forms of information and calibration actions. The look requests may include requests for calibration reference signals to be delivered to particular ones of the plurality of user sensors 102 within a particular time frame. Alternatively or additionally, the look requests may include requests for environmental information accessible via the calibration management system 112 (e.g., via the plurality of measurement nodes 106 and/or the data integration module 214). In embodiments, the one or more of the plurality of user sensors 102 may not request calibrations, but instead may actively communicating with the calibration management system 112 or a specific one of the plurality of calibration nodes 104 in such a way that the sensor position is provided in real-time to the calibration management system 112 and/or node and the calibration management system 112 and/or node can determine and appropriately track and/or calibration light to that sensor in real time (i.e. without prior knowledge of sensor position/schedule).

At block 504, the calibration management system 112 schedules look times for the plurality of user sensors 102 based on available ones of the plurality of calibration nodes 104. For example, via the node services module 210, the calibration management system 112 may maintain an active calendar containing entries describing various requests for measurements and calibration reference signals. The calibration management system 112 may determine the availability of certain ones of the plurality of calibration nodes 104 meeting criteria contained in the look request (e.g., information regarding a particular user sensor, reflector size, desired environmental information, location, time etc.). Based on the availability of the plurality of calibration nodes 104, the calibration management system 112 may schedule a measurement or calibration and/or provide information to the plurality of user systems 116 to allow the users (e.g., via the presentation module 212) to select a particular one of the plurality of calibration nodes 104 and a calibration or measurement time.

At block 506, the look schedule made at block 504 is implemented by the calibration management system 112 by configuring the calibration nodes to perform calibration actions. At block 508, the calibration management system 112 may receive calibration results information from the plurality of calibration actions. In embodiments, the blocks 506 and 508 may correspond in to the blocks 482 and 484 of the method 478 described herein with respect to FIG. 4. For example, the calibration management system 112 may cause the plurality of measurement nodes 106 to perform specified environmental measurements (e.g., via configuring the field spectral radiometer 310) and to provide calibration reference signals (e.g., via the reflector array 306) to the plurality of user sensors 102. The calibration management system 112 may also receive measurement results and/or calibration images captured via the plurality of user sensors.

At block 510, the calibration management system 112 may perform radiometric corrections on a plurality of calibration images using information received from the plurality of calibration nodes. As described herein, radiative transfer codes (e.g., MODTRAN®) may be implemented via the node services module 210 (e.g., using local meteorological data received via the data integration module 214 and atmospheric transmission measurements taken via the plurality of measurement nodes 106 of FIG. 1A) to estimate the energy reaching the plurality of user sensors 102. Ratios of the estimated and actual energy received by the plurality of user sensors 102 (e.g., based on a calibration image of one of the plurality of signal nodes 108) may then be used to generate calibration correction coefficients for various spectral bands detected via the plurality of user sensors 102. The calibration correction coefficients may be provided to the plurality of user sensors 102 and/or plurality of user systems 116 to correct images of scenes of interest taken by the plurality of user sensors 102. In embodiments, the calibration management system 112 may provide environmental information or measurement information to one or more of the plurality of user sensors 102 and the generation of the calibration correction coefficients may be performed via the plurality of user sensors 102.

At block 512, the calibration management system 112 may characterize the plurality of user sensors based on the plurality of calibration images and, at block 514, the results of the characterization and the radiometric corrections may be provided to the plurality of user systems 116. For example, the calibration management system 112 may analyze the resolving power of the plurality of user sensors via performance of the method 700 described herein with respect to FIG. 7. In embodiments, via the calibration management system 112, user may schedule either a "look" or an "evaluation" via the plurality of calibration nodes 104. Looks may provide calibration reference signals (e.g., via the reflector array 306) to the plurality of user sensors 102. In an example, a "look S" may provide a calibration signal (e.g., from one of the plurality of reflectors 318) that resembles a point source, include sub-pixel geolocation and timestamp information, a verification of the health of the reflector array 306 (e.g., via a reflectance measurement by the field spectral radiometer 310), and a look quality assessment (e.g., based on environmental data or another measurements). A "look R" may include all the data in the "look S," and also include an at-sensor irradiance prediction (e.g., via the field spectral radiometer 310), an atmospheric transmission evaluation, and an uncertainty statement. An "eval S" may combine the data associated with the "look S" and include a verification of image quality (e.g., via receipt and analysis of the calibration image), a PRF evaluation (e.g., via performance of the method 700 described herein with respect to FIG. 7) and geolocation validation. An "eval R" may provide per-band radiometric calibration coefficients, including atmospheric correction and uncertainty estimates. As such, the calibration management system 112 may provide a plurality of different packages of information in response to a look request. In embodiments, the calibration management system 112 may take known inputs of calibration node execution as well as any measurement or modelled environmental understanding (e.g., via third party data) and combine such data with calibration images in an automated fashion. For example, in embodiments, the calibration management system may produce automated reports characterizing a particular user sensor as well as data quality reports (DQRs), In embodiments, such DQRs may contain estimates of uncertainty of the measurements or calculations, indicating variability in measurements, or the like). Another report that may be generated may utilize a general image quality equation (GIQE) to create a sensor performance model and generate National Imagery Interpretability Rating Scale (NIIRS) values for a particular one of the plurality of user sensors 102. Such a value may be used to establish trusted user sensors for correlating with other ones of the plurality of user sensors 102.

Figure 5B:
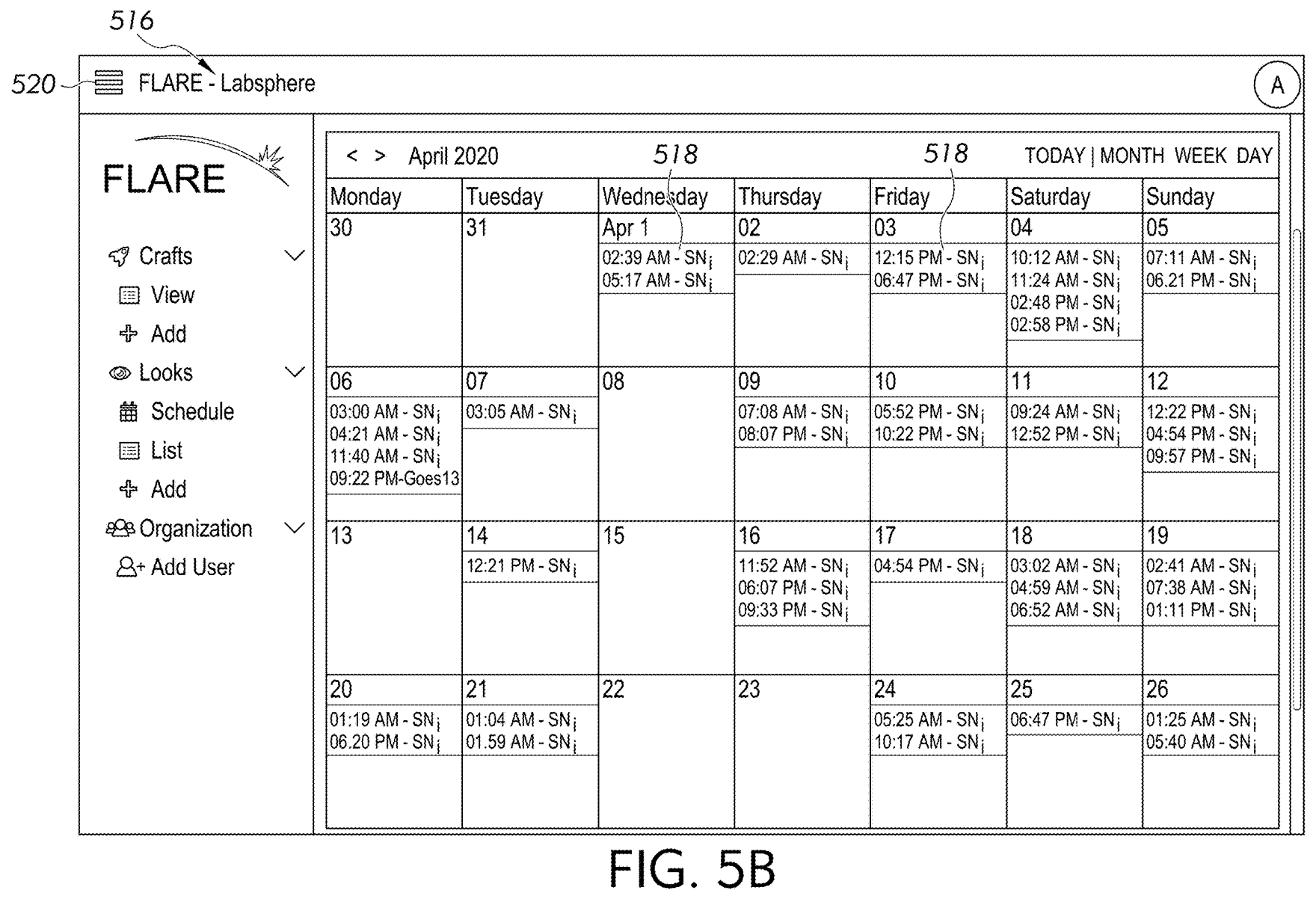

FIG. 5B depicts an example graphical user interface (GUI) 516 that may be presented to one of the users (e.g., via one of the plurality of user systems 116) during performance of the method 500 described herein with respect to FIG. 5A. The GUI 516 may be presented to the user via the presentation module 212 of the calibration management system 112. For example, the GUI 516 may be presented to a user after plurality of look times are scheduled at block 504 of the method 500. The GUI 516 comprises a calendar with a plurality of entries 518 describing sensor-node combinations $SN_i$ at particular times. The sensor-node combinations $SN_i$ may describe the particular sensor that is being calibrated via the plurality of calibration nodes 104 and/or the calibration node that is being used to form the calibration node. In embodiments, the GUI 516 includes a menu 520 allowing the user to access a plurality of different functions associated with the calibration management system 112 (e.g., either via a cloud-based application or native application running on one of the plurality of user systems 116). Such functions may allow users to develop customer contracts, develop workflows for particular ones of the plurality of calibration nodes 104, generate reports of previous calibration results, conduct transactions to pay for services, and perform data analysis processes.

Figures 6A, 6B:
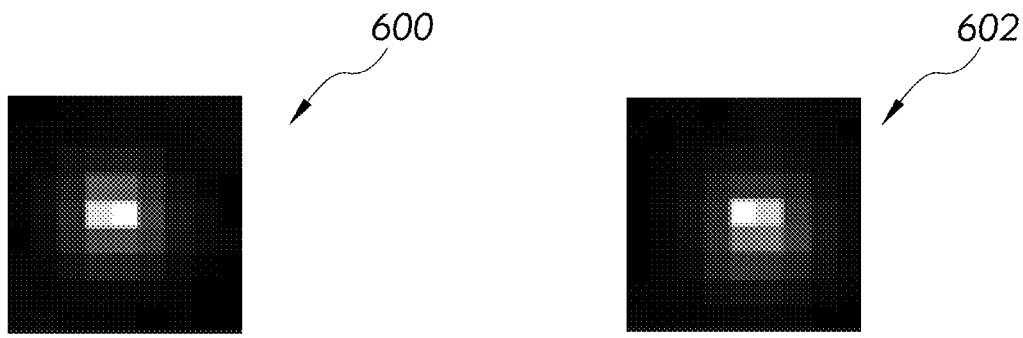
FIG. 6A depicts a first point response function ("PRF") sample incident on a detector, according to one or more embodiments described herein.
FIG. 6B depicts a second PRF sample incident on a detector, according to one or more embodiments described herein.

Referring back to FIGS. 3A-3B, even though each of the plurality of reflectors 318 of the reflector array 306 is smaller than the IGFOV of pixels of the user sensor 316 in some embodiments, illumination light 304 reflected by one of the reflectors 318 may be spread across a number of different pixels of the user sensor 316 due to distortions and the like that are present in user sensor 316. Moreover, movement of the user sensor 316 relative to the reflector array 306 during imaging may impact performance of the user sensor 316 in non-symmetric ways. For example, FIG. 6A depicts a first PRF sample 600 generated via the user sensor 316 from the illumination light 304 reflected by the reflector array 306. As shown, the PRF sample 600 includes a plurality of pixel values, with the highest intensity of light being captured at two pixels in a central row of a pixel array of the user sensor 316. Based on such information, it is difficult to ascertain where a peak illumination intensity was incident on the pixel array because each of the two pixels in the central row have the same recorded value.

FIG. 6B depicts a second PRF sample 602 generated by the user sensor 316 with light from reflected by the reflector array 306 when in the same configuration used to generate the first PRF sample 600 depicted in FIG. 6A. In the second PRF sample 602, the peak pixels are shifted upwards by a row on the pixel array, and a single pixel possesses a peak intensity value, as opposed to a pair of pixels possessing the peak intensity value in FIG. 6A. That is, the first and second PRF samples 600 and 602 contain different phasing. Due to the process of pixel resampling, the relative positioning between the peak intensity of the point illumination and pixel boundaries impacts the distribution of pixel values in each sample. Due to non-symmetrical effects of user sensor 316 motion and the impact of relative alignment between the illumination signal and pixel boundaries on PRF sampling, it is beneficial to obtain a plurality of PRF samples to generate an oversampled PRF population to gain a more accurate characterization of the PRF of the 316.

Figure 7:
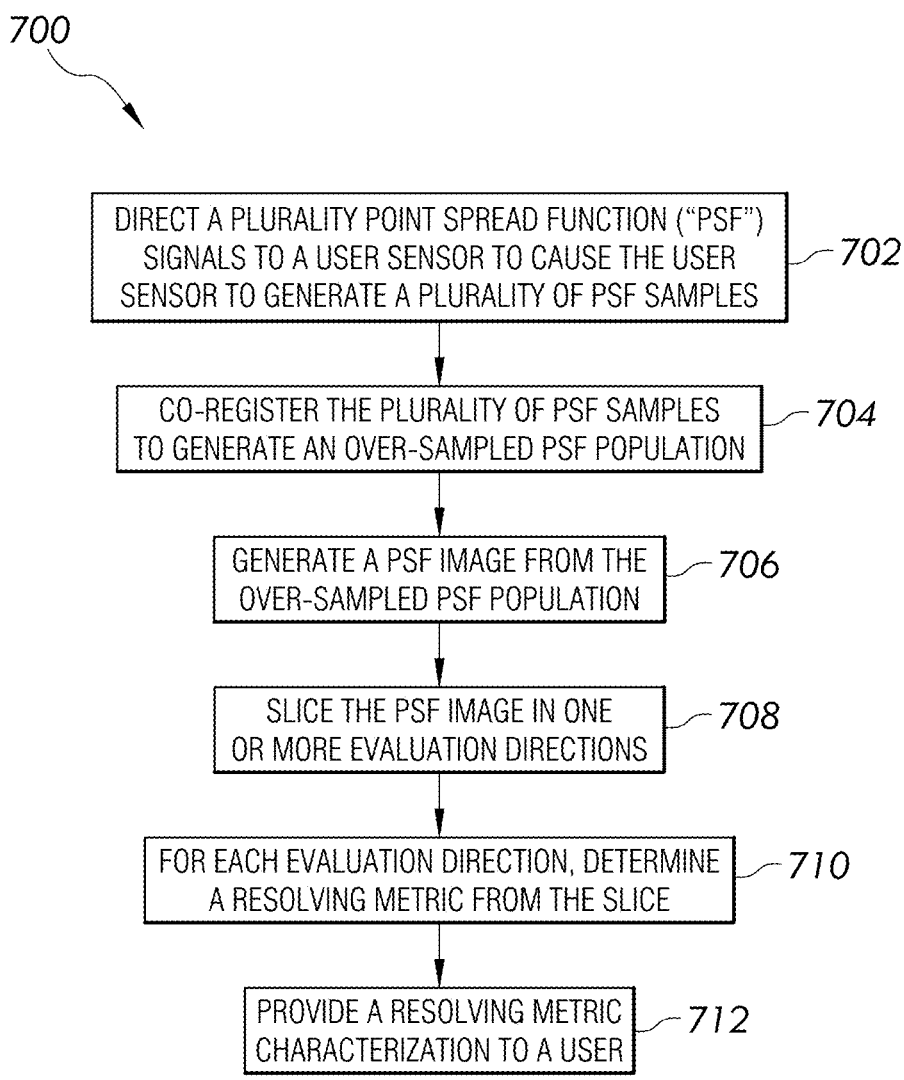
FIG. 7 depicts a flow diagram of a method of determining a resolving metric for a user sensor using a calibration system and providing a resolving metric characterization of a user sensor to a user, according to one or more embodiments described herein.

Referring now to FIG. 7, a flow diagram of a method 700 of providing a resolving metric characterization to a user is shown, according to an example embodiment. In embodiments, the method 700 may be performed via the calibration management system 112 (e.g., via the node services module 210 of FIG. 2) to optically characterize one or more of the plurality of user sensors 102 (see FIGS. 1A and 1B). In embodiments, the method 700 may be performed during the performance of the method 500 described herein with respect to FIG. 5A. The resolving metric characterizations obtained via performance of the method 700 may be a subset of the services rendered available by the calibration system 100 described herein with respect to FIGS. 1A and 1B. While the method 700 is depicted to include a number of steps or processes, it should be appreciated that greater or fewer numbers of steps may be performed to analyze resolving metrics of the plurality of user sensors 102 in accordance with various example embodiments. The method 700 may be performed via a combination of the calibration management system 112 and one or more of the plurality of calibration nodes 104 of the calibration system 100. For example, in embodiments, the method 700 may be performed via the calibration management system 112 and the calibration node 300 described herein with respect to FIGS. 3A-3G. Accordingly, reference will be made to various components of the calibration management system 112 (depicted in FIGS. 1A-2) and the calibration node 300 (depicted in FIGS. 3A-3G) to aid in describing the method 700.

At block 702, a plurality of PRF signals are directed to the user sensor 316 to cause the user sensor 316 to generate a plurality of PRF samples. In embodiments, for example, the calibration management system 112 may cause the control system 308 of the calibration node 300 to direct the illumination light 304 into the user sensor 316 using one or more of the plurality of reflectors 318. In embodiments, only a portion of the plurality of reflectors 318 are used to direct the illumination light 304 into the user sensor 316 so as to illuminate a plurality of separate portions of a pixel array of the user sensor 316. For example, the control system 308 may only rotate (or uncover) certain ones of the plurality of reflector support elements 320 to illuminate the separate portions of the pixel array. Such separate portions may comprise a plurality of PRF samples. In embodiments, one of the plurality of calibration nodes 104 may include a plurality of separate reflector arrays (e.g., similar in structure to the reflector array 306) that are used to separately illuminate user sensor 316. In embodiments, the user sensor 316 passes over a plurality of different ones of the plurality of calibration nodes 104 (with each of the calibration nodes having a reflector array) to generate a plurality of different PRF samples. In embodiments, the user sensor 316 may pass over or by the calibration node 300 (or any one of the plurality of calibration nodes 104) a number of times to generate the plurality of PRF samples. The generated PRF samples may resemble the first and second PRF samples 600 and 602 depicted in FIGS. 6A and 6B.

At block 704, the calibration management system 112 co-registers the plurality of PRF samples generated at block 702 to generated an over-sampled PRF population. In embodiments, each PRF sample includes a plurality of pixel values. Each pixel value of the PRF samples represents the integrated intensity of the illumination light 304 incident on a particular one of the pixels of the user sensor. The method 700 may differ from existing co-registration methods in that the method 700 does not assign each pixel value to a particular location within the pixel that recorded that pixel value. For example, existing methods may assign each pixel value to a point in the center of each of the pixels that collected illumination light 304 within the PRF sample. Such an approach may lead to information regarding peak of the illumination signal being lost, as the peak may not be incident at the center of a particular pixel, but rather at a boundary between a plurality of pixels. To avoid the loss of such location information, the method 700 may not assign each pixel value to a particular point within each pixel but rather assign the pixel value to the entire pixel area of each pixel and perform further processing to assign particular locations for the pixel values.

For example, to co-register the plurality of PRF sample, the control system 308 (or the calibration management system 112) may define an objective function for optimization. For example, surface functions may be determine the amplitude and location of a particular reference point (e.g., peak) of each PRF sample (e.g., to determine the relative position or offset of the reference point). Each surface function may include a plurality of parameters that are tailored to fit the plurality of pixel values associated with a PRF sample. The objective function may define a standard through which a particular set of parameters used to define the surface are evaluated. The objective function may take a number of forms depending on the implementation. In embodiments, the objective function may be a root mean square (RMS) fitting function (e.g., single or weight contribution RMS fit). For example, the objective function may be computed as $$\text{RMS} = \sqrt{\frac{\sum_{i=1}^{n}(F(x_i, y_i) - \text{Pixel Value}(x_i, y_i))^2}{n}} \quad (2)$$

where F represents a function fit to a particular PRF sample, $x_i$ and $y_i$ represent the location within a particular pixel, and i=1, . . . n, with n being the number of pixels on the pixel array. Various other objective functions may be used depending on the implementation. In embodiments, the objective function may define a threshold value for the RMS, indicating a maximum total RMS error between function F and the actual measured pixel values of each PRF sample. In embodiments, rather than being associated with the fit between a function and a particular PRF sample, the objective function may measure a total error between a plurality of functions and a plurality of PRF samples.

After defining the objective function (or using a predefined objective function) the calibration management system 112 (or control system 308) may define a plurality of surface parameters for a model surface for each of the plurality of PRF samples. As will be appreciated, the particular parameters that are defined for the model surface may depend on the implementation or the particular surface used. For example, in embodiments, a two-dimensional rotated Gaussian surface model may be used, in which case parameters defining an amplitude, a central position (e.g., both in the x-direction and the y-direction), directional spreads (e.g., in both the x-direction and the y-direction), rotations of the model's major axis with respect to a frame of the user sensor 316, and background parameters (e.g., defining an amplitude of background noise in a PRF sample and a slope of the background noise in both the x-direction and the y-direction) may be included in the model surface. It should be understood that completely different parameters may be defined depending on the particular model surface that is selected. Alternative model surfaces (such as a Lorentzian function, a Moffat function, or the like) may be used consistent with the present disclosure.

After the plurality of surface parameters are defined (or predefined surface parameters are selected) the calibration management system 112 (or the control system 308) runs an optimization algorithm allowing values for the plurality of surface parameters to float to the plurality of pixel values within each pixel area measured during the step 702. In embodiments, a differential evolution approach may be used wherein each surface parameter is used to generate a parameter vector including a random distribution of values for that surface parameter within a range of values for that surface parameter between an upper bound and a lower bound. For each PRF sample, initial values within each surface parameter value may be selected to generate an initial PRF surface for that PRF sample. The initial surface parameters may be updated by creating three sub-vectors for each surface parameter vector, and adding a scaled difference between two of the three sub-vectors to a third one of the three sub-vectors to create a donor vector. Random values in each one of the initial parameter vector and the donor vector are then selected to create a trial vector of surface parameters from which updated values for each surface parameter are selected to generate updated PRF surfaces for each of the PRF samples. The initial and updated PRF surfaces may each be evaluated using the objective function. The initial or updated PRF surface is then selected based on the evaluation in accordance with the objective function, and further updated by updating the parameter values selected in the trial vector. Such a method may repeat until predetermined divergence criteria (e.g., number of iterations, rate of convergence, and the like) are satisfied to generate PRF surfaces for each PRF sample. Alternative optimization techniques, such as convolutional neural networks may also be used.

After particular surfaces for the plurality of PRF samples have been generated, the calibration management system 112 (or the control system 308) co-registers the plurality of samples using the PRF surfaces for each PRF sample. For example, in embodiments where the plurality of surface parameters defined define a two-dimensional rotated Gaussian surface model, each PRF surface may define an amplitude for each PRF sample, a central position (e.g., both in the x-direction and the y-direction) of a PRF sample, directional spreads (e.g., in both the x-direction and the y-direction) of a PRF sample, and background parameters (e.g., defining an amplitude of background noise in a PRF sample and a slope of the background noise in both the x-direction and the y-direction). In embodiment, to co-register each of the PRF samples, the amplitudes thereof are normalized relative to a reference amplitude. For example, the reference amplitude may normalize a maximum amplitude of the plurality of PRF samples (as indicated by the maximum amplitude of the plurality of PRF surfaces) by scaling each pixel value in each of the PRF samples (e.g., with "1" representing the maximum amplitude). Additionally, a center position within the pixel array of the user sensor 316 may be defined and each of the plurality of pixel values may be moved to the center position based on their offset to center (as indicated by the PRF surface) and the background associated with each PRF sample (as indicated by the surface parameter values indicative of background noise) may be subtracted from the plurality of pixel values. As a result of the co-registration, each of the plurality of pixel values of each PRF sample has been co-located relative to a fixed reference point, normalized with respect to a reference amplitude, and background-subtracted to form an oversampled PRF population. It should be understood that the preceding description of the block 704 represents only one representative method for generating an oversampled PRF population and existing methods may be used consistent with the present disclosure.

Referring still to FIG. 7, at block 706, the calibration management system 112 may generate a PRF image from the over-sampled PRF population generated at block 704. In embodiments, the calibration management system 112 resamples the oversampled PRF population to generate the PRF image. In embodiments, the calibration management system 112 may generate a super-resolution PRF surface as the PRF image. In embodiments, the calibration management system 112 may compute an average of two-dimensional cubic spline across each of the co-registered PRF samples of the oversampled PRF population generated at block 704 to generate a high resolution surface that serves as a PRF image. In embodiments, the calibration management system 112 may use a direct 3D interpolation (e.g., using a linear interpolation scheme) of the over-sampled PRF population generated at block 704 to generate the PRF image. Any suitable interpolation technique may be used consistent with the present disclosure to generate a PRF image form the over-sampled PRF population.

One beneficial aspect of using the above-described techniques (e.g., resampling and interpolation) to generate the PRF image is that they maintain features of the actually acquired signals (e.g., asymmetry, shoulders, ringing). That is, the PRF images accurately reflect the actual intensity measurements generated by the user sensor 316. Given this, oversampled PRF population or super-resolution PRF surfaces generated via the methods described herein may be used to directly assess the performance of the user sensor 316 in the context of resolution and Rayleigh criteria. Such an approach is beneficial over existing techniques relying on measuring imaging system responses of multiple point sources to determine resolution and Rayleigh criteria.

Figure 8A:
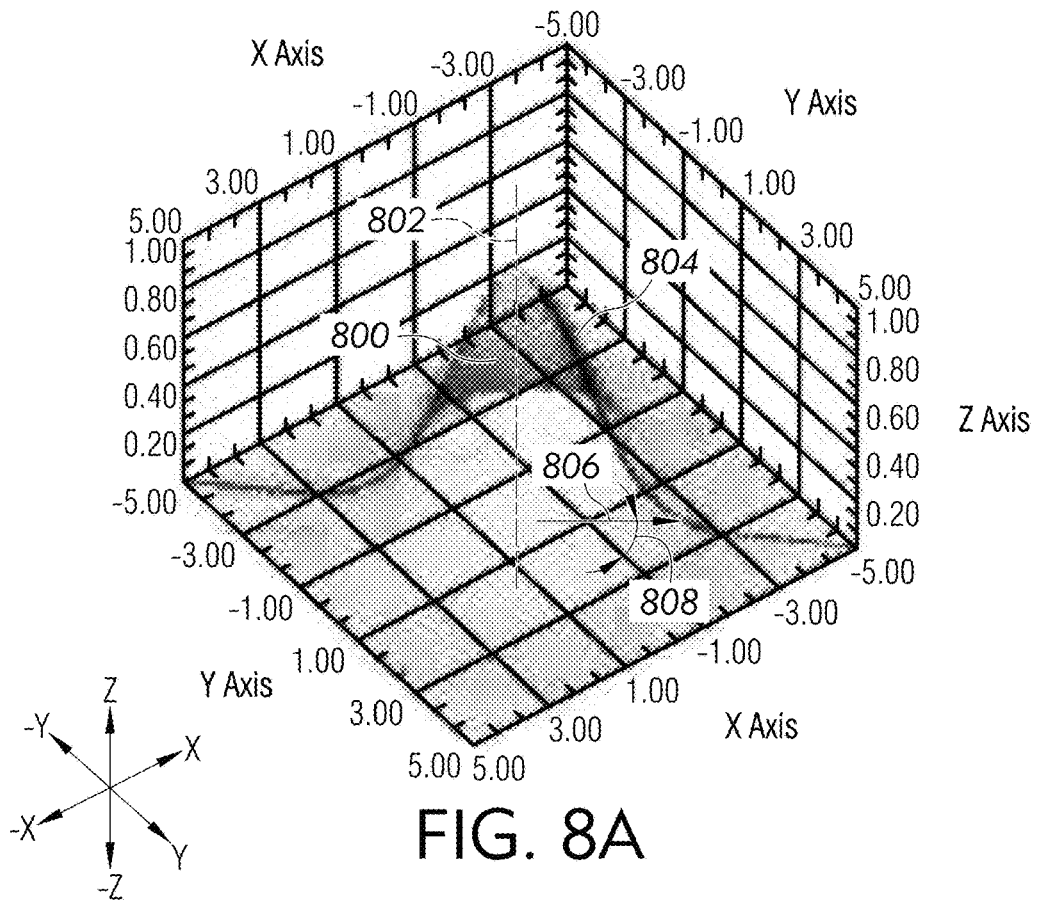
FIG. 8A depicts a PRF image that may be used to determine the resolving metric during the method of FIG. 7, according to one or more embodiments described herein.

At block 708, the PRF image (e.g., by the calibration management system 112) is sliced in one or more evaluation directions. In embodiments, the slice represents a cross-section of the image along a line extending in the evaluation direction. For example, FIG. 8A depicts a PRF surface 800 generated from an oversampled PRF population (e.g., generated via performance of blocks 702, 704, and 706). The PRF surface 800 has an axis 802 extending through a peak thereof in the magnitude direction (e.g., the Z-direction). An angular slice 804 is generated by taking a cross-section of the PRF surface 800 along through the peak along an evaluation direction 806. The evaluation direction 806 at an angle 808 (e.g., an azimuthal angle) relative to a direction perpendicular to the axis 802 (e.g., the Y-direction). That is, the angular slice 804 represents a cross-sectional shape of the PRF surface 800 along the evaluation direction 806.

Figure 8B:
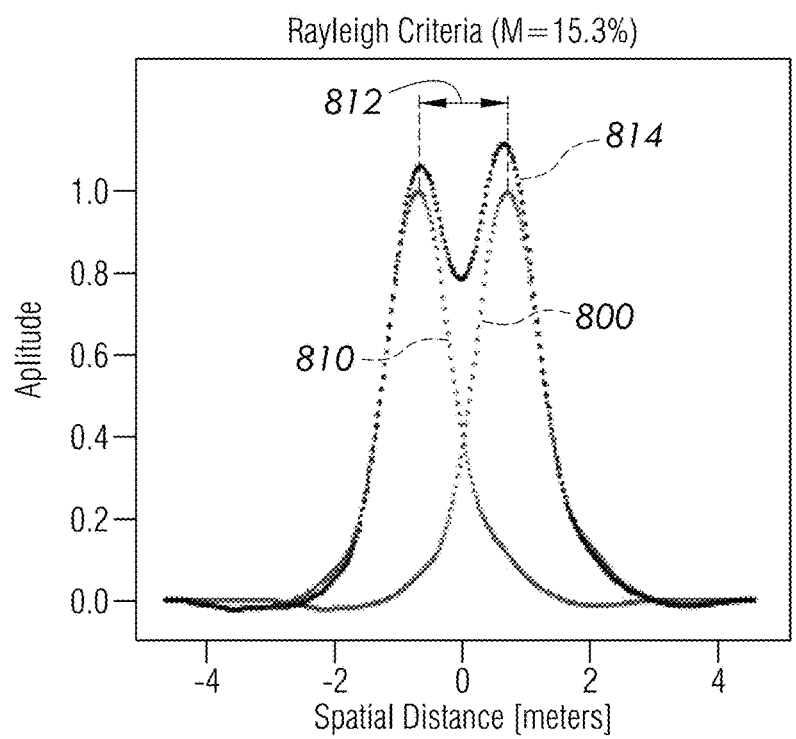
FIG. 8B depicts slices of the PRF image of FIG. 8A used to determine a resolving metric, according to one or more embodiments described herein.

At block 710, for each evaluation direction for which a slice of the PRF image is generated, the calibration management system 112 determines a resolving metric from each slice. In embodiments, the calibration management system 112 duplicates the slice generated at block 708 and translates the duplicate slice relative to the original along the evaluation direction. For example, FIG. 8B depicts the angular slice 804 described with respect to FIG. 8A and a duplicate 810. The entirety of the duplicate 810 is translated relative to the angular slice 804 along the evaluation direction along which the slice was generated from the PRF surface 800.

In this example, using the slice 804 and the duplicate 810, the calibration management system 112 evaluates the slice for resolving metrics. In embodiments, the calibration management system 112 evaluates for at least one resolving metric along the evaluation direction selected from a ground sample distance, a Rayleigh diffraction limit, a ground resolvable distance, Rayleigh resolution criteria, a Sparrow limit, and a FWHM of the PRF. Certain resolving metrics may not rely on the duplicate. In an example, the Rayleigh diffraction limit may be defined for an unrestricted circular aperture as:

$$RDL = 1.22 \frac{\lambda}{D} \tag{3}$$

where D is the diameter of the circular aperture and wavelength $\lambda$ represents an average wavelength of point sources incident on the calibration management system 112. The Rayleigh diffraction limit represents an angular separation between point sources necessary for the point sources to be resolved from another for a diffraction limited system.

When multiple sources are incident on the user sensor 316, the amplitude modulation of the user sensor 316 responses must be considered, as both point sources may emit energy that is incident on the same pixel. The amplitude modulation M may be calculated as:

$$M = \frac{J_{max} - J_{min}}{J_{max} + J_{min}} \tag{4}$$

where $J_{max}$ and $J_{min}$ are the maximum and minimums of the combined response of the user sensor 316 to both point sources, respectively. Equation 4 represents the contrast in the image signal between the two point illumination sources, and is accurate in a non-diffraction-limited case. For the case of an unobstructed circular aperture, the Rayleigh criterion are satisfied when M in accordance with equation 4 equals 15.3%. Such a number may be used in a non-diffraction-limited case to approximate the ground resolvable distance of the user sensor 316. FIG. 8B depicts an example where the angular slice 804 and duplicate 810 are translated relative to each other by a distance 812 along the evaluation direction 806 described with respect to FIG. 8A. The translated duplicates are summed together to generate a combined response 814, which is evaluated in accordance with equation 4. FIG. 8B depicts an example where the distance 812 is selected such that evaluation of equation 4 yields a value of 15.3%, indicating that the distance 812 is a minimal distance satisfying the Rayleigh diffraction limit. For the case relatively large sensor heights, the distance 812 may be multiplied by a height H of the user sensor 316 above the reflector array 306 to determine a ground resolution distance. As such, in this example, a directionally-dependent resolution characteristic of the user sensor 316 is generated by determining the distance 812 (e.g., a minimum value thereof) that a duplicate is translated relative to the angular slice 804 to yield a combined response 814 satisfying the Rayleigh criteria. Additional resolution criteria may be evaluated in accordance with a similar procedure.

At block 712, the calibration management system 112 provides a resolving metric characterization to a user. For example, values for one or more resolving metrics such as ground sample distance, a Rayleigh diffraction limit, a ground resolvable distance, Rayleigh resolution criteria, a Sparrow limit, and a FWHM of the PRF may be transmitted to one of the plurality of user systems 102 to provide a user a characterization of the optical performance of the one of the plurality of user sensors 102. In embodiments, the calibration management system 112 may transmit the PRF generated at block 706 to one of the plurality of user systems 116. Such a PRF image may be used for image processing and optimization by the user.

In embodiments, the PRF image generated at block 706 may be characterized over a range of evaluation directions (e.g., with the angle 808 described with respect to FIG. 8A taking a plurality of values). For example, in embodiments, the calibration management system 112 evaluates the resolving power with the angle 808 varying between 0 degrees to 360 degrees at a fixed angular increment (e.g., 0.01 degrees to 5 degrees) to generate an angular distribution of each resolving metric calculated for each evaluation direction. Using such an angular distribution, the calibration management system 112 may generate a directional characterization of the resolution thereof.

While the preceding example described the method 500 being performed to evaluate a PRF of a user sensor. It should be understood that mirror line arrays (e.g., with rows of reflectors positioned to direct light into one of the plurality of user sensors 102) may allow for valuation of a line response function ("LRF") of a sensor. For example, instead of a plurality of PRF samples being generated at block 704, a plurality of LRF samples (e.g., generated using linear arrays of mirrors) may be generated, co-registered, sliced, and evaluated for resolving metrics. A LRF of a user sensor may be used to predict the PRF, or vice versa.

Figure 8C:
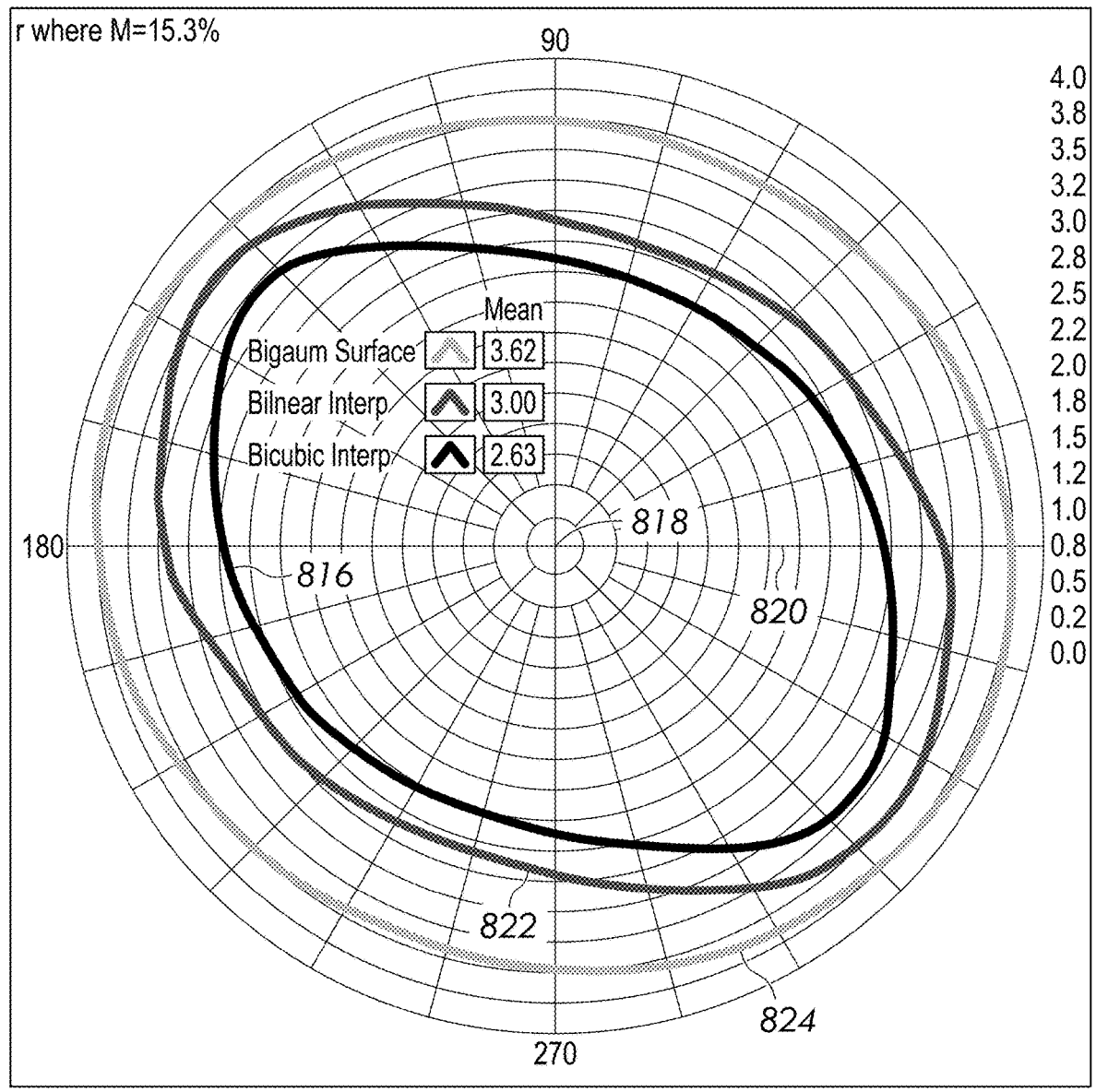
FIG. 8C depicts a resolving metric characterization that may be provided to a user as a result of the method of FIG. 7, according to one or more embodiments described herein.

FIG. 8C depicts an example directional characterization of the user sensor 316 that may result from performance of the method 700. FIG. 8C depicts a first imager fingerprint 900 generated by performing the method 700 where the image of the PRF imaging system was a super-resolution PRF surface generated from bi-cubic interpolation. The first imager fingerprint 816 was generated by slicing the PRF surface along a plurality of evaluation directions and evaluating each slice for the Rayleigh diffraction limit (e.g., using equation 4 above). The distance of the first imager fingerprint 816 from the center 818 of the plot represents the magnitude of the separation of PRF slice which satisfies the Rayleigh diffraction limit criterion (M=15.3%) as a function of angle from the first axis 820 (e.g., representing the angle 808 described with respect to FIG. 8A). FIG. 8C depicts a second imager fingerprint 822 generated using a similar procedure from a super-resolution PRF surface generated by bi-linear interpolation and a third imager fingerprint 824 generated from a super-resolution PRF surface generated by curve fitting an oversampled PRF population to a bi-Gaussian surface. The mean value of the first imager fingerprint 816 (e.g., the mean of all of the Rayleigh diffraction limit criterion separation values across all evaluation directions) is 2.63 meters. The mean value of the second imager fingerprint 822 was 3.0 meters. The mean value of the third imager fingerprint 824 was 3.62 meters. The mean value provides a single number that incorporates all of the characterizations of the imaging system. The mean values may be compared to a diffraction limited case) to determine a quality of the user sensor 316 (e.g., the closer a ratio of the values is to one, the higher quality factor of the user sensor 316). Thus, the method 700 facilitates characterizing the user sensor 316 in real time based on a unique shape of the PRF thereof. While the method 700 is described herein with respect to perform PRF analysis of a user sensor, it should be appreciated that similar methods may be employed to gain insight into other performance aspects of user sensors. For example, line spread function ("LSF") samples may be collected at block 702 and the remainder of the method 700 may be performed to perform an analysis of the LSF of a user sensor. Other patterns of reflectors may be used to perform a modulation transfer function ("MTF") analysis of user sensors.

Various example structures of the plurality of calibration nodes 104 of the calibration system 100 described herein will now be described in greater detail.

Figure 9:
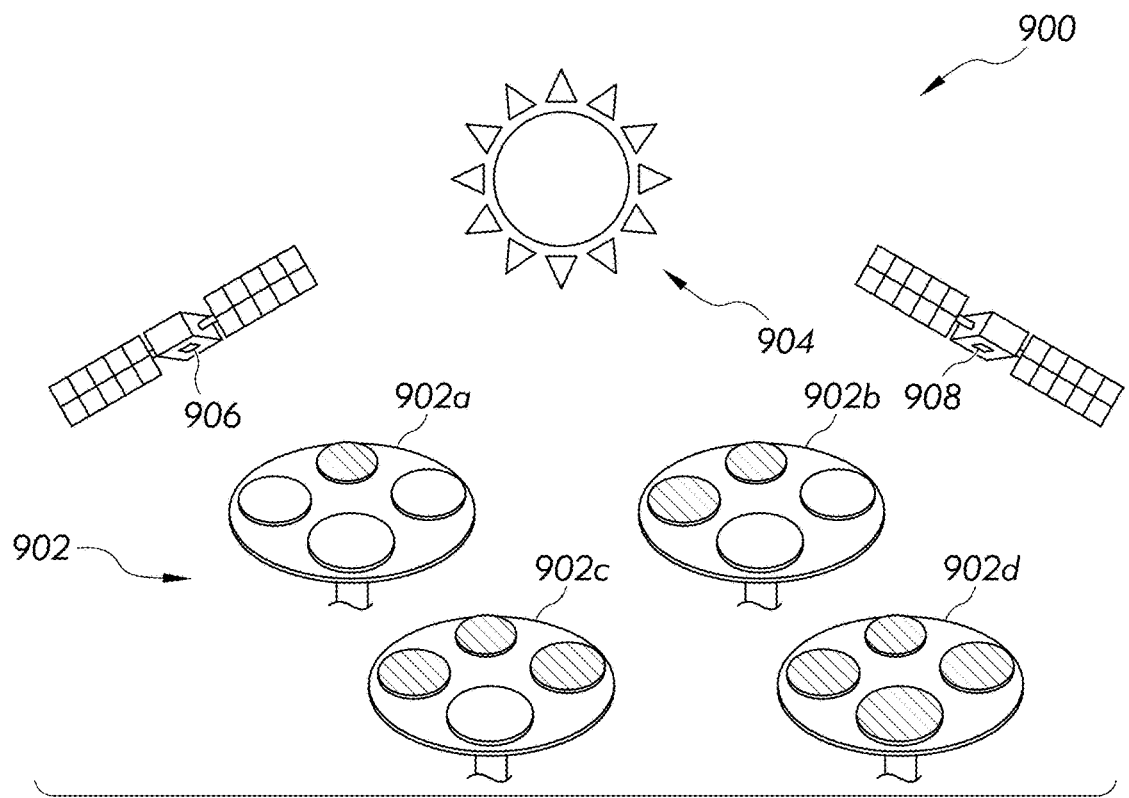
FIG. 9 schematically depicts a calibration node of a calibration system including a plurality of reflector array targets that may be used to simultaneously provide calibration reference signals to a plurality of user sensors, according to one or more embodiments described herein.

FIG. 9 schematically depicts a calibration node 900, according to one or more embodiments described herein. The calibration node 900 comprises a plurality of reflector arrays 902 configured to direct light from an illumination source 904 (depicted as the sun) into one or more of the plurality of user sensors (e.g., a first user sensor 906 and a second user sensor 908). In embodiments, each of the plurality of reflector arrays 902 is similar in structure to the reflector array 306 of the calibration node 300 described herein with respect to FIGS. 3A-3G, with the exception that the plurality of reflector arrays 902 may include a fewer number of reflectors. As depicted, each of the plurality of reflector arrays 902 is depicted to include four reflectors. Each reflector may be attached to a rotating support (e.g., similar to the rotating support 326 described with respect to FIG. 3B) that is rotatable about an array axis via a reflector support element. Each reflector support element may be independently rotatable via an elevation adjustment actuators (e.g., similar in structure to the elevation adjustment actuators 354 described herein with respect to FIG. 3B).

In embodiments, the calibration node 900 may be used to analyze the dynamic range of a particular user sensor. For example, the plurality of reflector arrays 902 is depicted to include a first reflector array 902a, a second reflector array 902b, a third reflector array 902c, and a fourth reflector array 902d. Each of the plurality of reflector arrays 902 may include a different number of reflectors oriented to reflect light from the illumination source 904 into the first user sensor 906. As depicted in FIG. 9, for example, the first reflector array 902a includes one reflector oriented to reflect a first calibration reference signal into the first user sensor 906. The second reflector array 902b includes two reflectors oriented to reflect a second calibration reference signal into the first user sensor 906. The third reflector array 902c includes three reflectors oriented to reflect a third calibration reference signal into the first user sensor 906. The fourth reflector array 902d includes four reflectors oriented to reflect a fourth calibration reference signal into the first user sensor 906. That is, the first, second, third, and fourth calibration reference signals directed to the first user sensor 906 may each have different amplitudes. The calibration images generated by the first user sensor 906 in response to each of the first, second, third, and fourth calibration reference signals may be used to assess the dynamic range and linearity of response of the first user sensor 906 (or any of the plurality of user sensors 102 described herein with respect to FIGS. 1A and 1B). In embodiments, the calibration management system 112 (see FIG. 1A) may analyze a plurality of calibration images generated by one of the plurality of user sensors 102 in response to a plurality of different calibration reference signals of different magnitudes to determine a dynamic range or linearity of response of the user sensor. Results of such analysis may be provided to a user to further characterize the user sensor. While the preceding example utilizes a plurality of reflector arrays 902 to provide such dynamic range information, it should be understood that such analysis may be performed via multiple passes over a calibration node including a single reflector array, with the reflector array having a different number of reflectors oriented to reflect light towards a user sensor in each pass. In embodiments, the dynamic range analysis may be performed using a single node and a single pass. For example, while one of the plurality of user sensors 112 is travelling (or stationary) over one of the plurality of reflector arrays 902, the reflector array may change the number of reflectors therein that are positioned to direct calibration light to the user sensor, thereby changing the amplitude.

Referring to FIGS. 1A, 1B, and 9, in embodiments, two of the plurality of user sensors 102 may observe a particular one of the plurality of calibration nodes 104 at the same time. For example, as depicted in FIG. 9, both the first user sensor 906 and the second user sensor 908 are observing the plurality of reflector arrays 902. Independent adjustability of the plurality of reflector arrays 902 (e.g., in terms of the number and/or size of reflectors that are oriented to reflect light towards one of the first and second user sensors 906 and 908) may facilitate such simultaneous viewing by different user sensors with different imaging capabilities (e.g., in terms of detector size and dynamic range).

Given that both the first user sensor 906 and the second user sensor 908 are both viewing light from the illumination source 904 at the same time, the calibration images generated thereby may be correlated with one another (and normalized for comparability) and used to correct and/or analyze the images from the multiple user sensors. For example, an estimated aspect of the environment (e.g., solar radiance) may be generated based on an average of the two calibration reference signals generated by the first and second user sensors 906 and 908 to provide a lower uncertainty measurement. While the preceding example describes a situation where the first and second user sensors 906 and 908 viewing the plurality of reflector arrays 902 of the same calibration node 900 simultaneously, it should be understood that a similar mode of analysis (e.g., correlating two separate calibration images captured by different sensors with one another) may be performed using calibration images that are not captured simultaneously or in instances where the correlated calibration images are of different calibration nodes. For example, in embodiments, the first user sensor 906 may capture a first calibration image of a first calibration node at a first point in time and the second user sensor 908 may capture a second calibration image of a second calibration node at a second point in time. In embodiments, if the first calibration node and the second calibration node are within a predetermined distance of one another (e.g., both within 5 miles, 2 miles, 1 mile, or 1000 feet of a calibration site, or close enough such that similar environmental conditions exist at each calibration site) and the first and second points in time are within a predetermined period (e.g., 1 hour, 30 minutes, 10 minutes, 5 minutes, 1 minute) of one another, the first and second calibration images may be correlated with one another to improve the accuracy of at least one of the first and second calibration images.

In embodiments, the simultaneous viewing of a calibration node (or of different calibration nodes that are close to one another) by different user sensors may be used to transfer a calibration of one user sensor for another user sensor. For example, referring still to FIG. 9, the first user sensor 906 may be a trusted user sensor (e.g., a Landsat or the like) including sophisticated imaging instrumentation receiving regular calibration. Given this, an image captured by the first user sensor 906 may be used to deduce accurate information regarding an image captured by the second user sensor 908, which may have less sophisticated imaging instrumentation (e.g. associated with a CubeSat). That is, aspects of an image generated by the first user sensor 906 may be transferred to an image generated by the second user sensor 908, thereby increasing the quality of the image captured by the second user sensor 908. The flexibility provided by the plurality of mirror arrays 902 is useful in circumstances where the first and second user sensor 906 and 908 possess different GSD characteristics. Different numbers of reflectors may be positioned to direct light into the first and second user sensors 906 and 908, thereby accounting for the different imaging capabilities. Even when the first and second user sensors 906 and 908 operate in different (non-overlapping) spectral ranges of interest, a transfer function between the sensors is simplified by the fact that the observed signals are largely the same. The preceding technique may also be used in the case of mobile calibration nodes (such as that described with respect to FIG. 14), as the captured calibration signals may be similar enough to allow a calibration image to captured by the first user sensor 906 to be transferred to the second user sensor 908.

Figure 10:
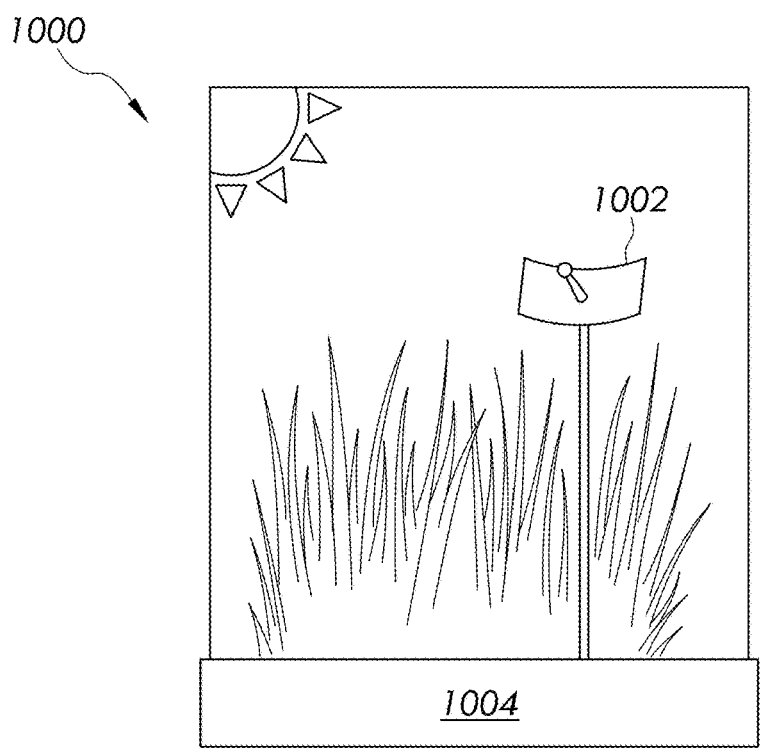
FIG. 10 schematically depicts a calibration node of a calibration system including only measurement instrumentation, according to one or more embodiments described herein.

FIG. 10 schematically depicts a calibration node 1000 that may serve as one of the plurality of measurement nodes 106 described herein with respect to FIG. 1A. For example, the calibration node 1000 is depicted to include a spectral sensor 1002 collecting solar and/or other illumination information (e.g., associated with a reflectance of a surface 1004 upon which the spectral sensor 1002) is disposed. In embodiments, the spectral sensor 1002 may include a combination of spectral sensors having a plurality of orientations to measure a plurality of aspects (e.g., radiances in different directions) at a geographical location simultaneously. In embodiments, the spectral sensor 1002 may be similar in structure to the field spectral radiometer 310 of the calibration node 300 described herein with respect to FIGS. 3A-3G (e.g., the remote sensing head 376 may be adjusted in real-time to take radiance, irradiance, and/or reflectance measurements). In embodiments, the spectral sensor 1002 continuously provides (e.g., via the network 118, see FIG. 1B) measurement data to the calibration management system 112 to help characterize natural targets or scenes observed by the plurality of user sensors 102.

Figure 11:
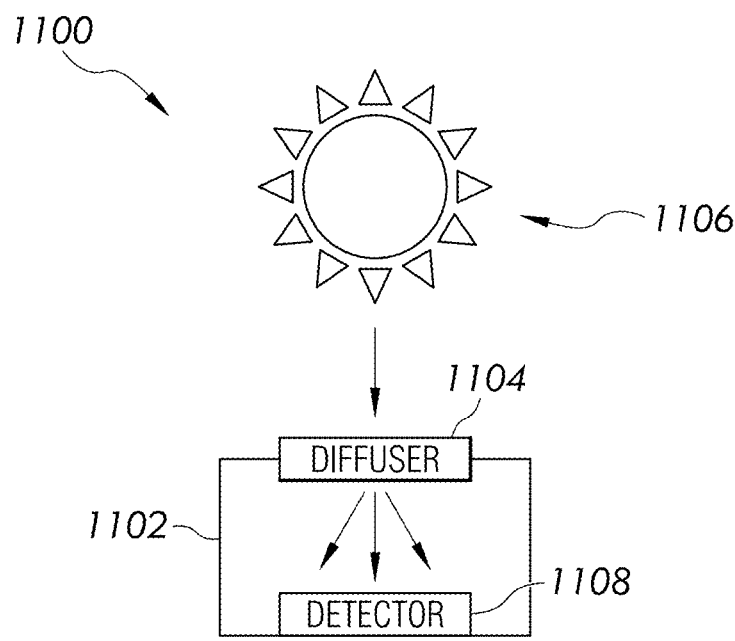
FIG. 11 schematically depicts a calibration node of a calibration system comprising a diffuser target and a detector, according to one or more embodiments described herein.

Referring now to FIGS. 1A, 1B, and 1I, in embodiments, a portion of the plurality of calibration nodes 104 may include diffusers or the like. Such diffusers may reduce the need to provide pointing capabilities to the instrumentation of the plurality of calibration nodes 104, but may still provide the calibration management system 112 with information relating to solar illumination at one or more geographic locations. FIG. 11 schematically depicts a calibration node 1100 that may be used as one of the plurality of measurement nodes 106 of the calibration system 100 described herein. The calibration node 1100 is depicted to include a housing 1102 and a diffuser 1104. In embodiments, the diffuser 1104 includes an optical transmitting element such as a cosign diffuser that allows light to be collected from large angles of incidence with the surface of the diffuser 1104. The diffuser 1104 may include any suitable scattering element such that light from an illumination source 1106 is provided by a detector 1108 over a wide range of relative orientations between the illumination source 1106 and the detector 1108. Due to the diffuser 1104, the detector may receive illumination light from the illumination source 1106 and detect signals indicative of the solar illumination at the scene. Such data may be provided to the calibration management system 112 (e.g., via the network 118, see FIG. 1B) continuously to facilitate correction of images collected via the plurality of user sensors 102 (e.g., in response to a request, automatically irrespective of a user request).

The plurality of measurement nodes 106 may include diffusive surfaces and have configurations other than that depicted in FIG. 11. For example, in embodiments, the housing 1102 and the diffuser 1104 are integrated into a single element, and the calibration node 1100 may include an integrating sphere that collects light from the illumination source 1106 and diffusely scatters the light into the detector 1108. For example, the detector 1108 may be disposed on an internal surface of the integrating sphere. In embodiments, the calibration node 1100 may not include the housing 1102 and the detector 1108 may receive light scattered from the diffuser 1104.

Diffuse area targets are well-suited for flat-fielding of user sensors, when appropriately sized to the field of view of a particular one of the plurality of user sensors 102. The plurality of calibration nodes 104 may include any suitable diffuse targets. Such targets may be near-Lambertian. Moreover, diffuse targets having various different reflectances and/or patterns of reflectances may be deployed within the plurality of calibration nodes 104. Moreover, calibration nodes with diffuse targets having pointing capabilities (e.g., similar to the capabilities of the plurality of reflectors 318 described herein with respect to FIGS. 3B and 3C) are also contemplated and within the scope of the present disclosure. In embodiments, Lambertian-patterned targets (e.g., having different patterns of reflectances) may be used to evaluate a sensor line response function.

Figure 12:
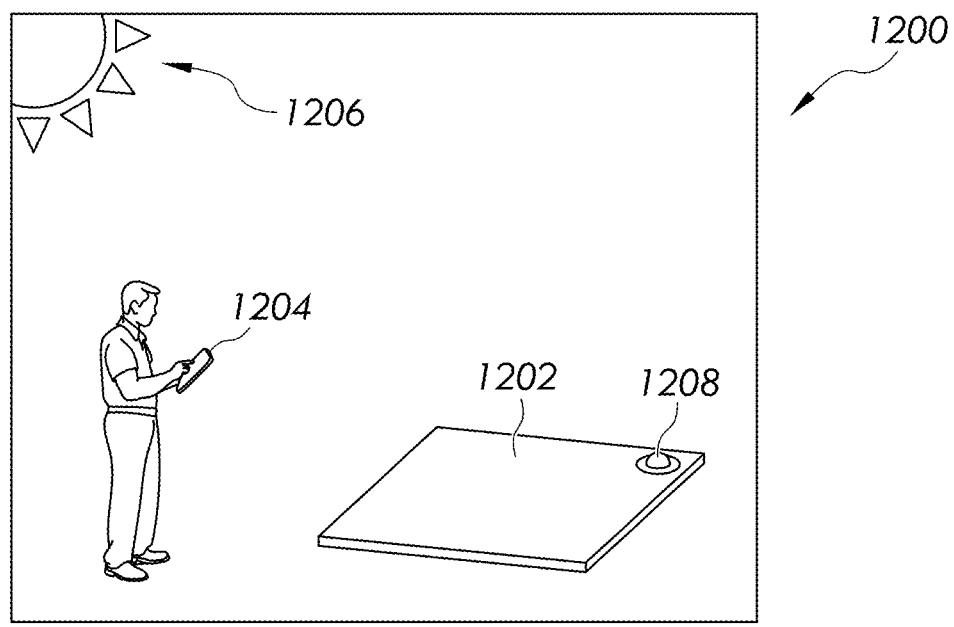
FIG. 12 schematically depicts a calibration node of a calibration system comprising a diffuser target and a detector that may be used to calibrate a mobile device of a user, according to one or more embodiments described herein.

FIG. 12 depicts another example calibration node 1200 that may be used in the calibration management system 112 described herein. The plurality of calibration nodes 104 described herein with respect to FIG. 1A may also include nodes that are viewable by users with the plurality of user systems 116 (see FIG. 1B). For example, the calibration node 1200 may be a citizen science kit or the like that users may image with mobile electronic devices. The calibration node 1200 is depicted to include a diffuser 1202 configured to direct light from an illumination source 1206 (shown as the sun) into a user sensor 1204 (e.g., a mobile handheld device such as a smartphone). The calibration node 1200 is further configured to include a detector 1208 (e.g., a photodiode, pixel array, or other suitable detection element). The detector 1208 may provide a baseline reference signal of the light from the illumination source 1206 interacting with the diffuser 1202 that may be used to calibrate and characterize the user sensor 1204. In embodiments, the detector 1208 is calibrated using a traceable standard. As a result, if the user captures an image of the diffuser 1202 using the user sensor 1204 and the image is provided to the calibration management system 112. That image in conjunction with data gathered via the detector 1208 be used to provide calibration coefficients to the user sensor 1204 (e.g., via a process similar to that described with respect to blocks 508, 510, 512, and 514 of the method 500 described with respect to FIG. 5A). As a result, more accurate measurements, that are traceable to known calibration standards, may be made via the user sensor 1204 than previously possible. The information provided by the calibration management system 112 described herein enables calibration and characterization of a wide variety of devices.

In embodiments, the detector 1208 is communicably coupled to the calibration management system 112 (e.g., via the network 118, see FIG. 1B) to provide data for calibrating the user sensor 1204. In embodiments, the calibration node 1200 may not be connected to the calibration management system 112. For example, in embodiments, rather than including the detector 1208, the calibration node 1200 may only include the diffuser 1202. In such embodiments, using location information, solar information (e.g., from third party sources, from nearby ones of the plurality of calibration nodes 104), weather data, the calibration management system 112 may predict a response of the user sensor 1204 to light scattered by the diffuser 1202. The actual image generated by the user sensor 1204 may be compared to the predicted response to calibrate the user sensor 1204. In embodiments, the diffuser 1202 may be equipped with a QR code to facilitate identifying the user sensor 1204 and connection with the calibration management system 112. In embodiments, the QR code may contain instructions that cause the user sensor 1204 to connect to the calibration management system 112 for data transfer (e.g., calibration image generated by the user sensor 104 and an identifier associated with the calibration node 1200 may be sent to the calibration management system 112, which may generate a calibration file/packet and transmit that information back to the user sensor 104). While the preceding example facilitated interaction with mobile devices or other computing devices via diffuser 1202, it should be appreciated that similar calibration nodes including reflector or reflector arrays (e.g., with pointing capabilities) are contemplated and within the scope of the present disclosure. For example, a small-scale version of the reflector array 306 described herein with respect to FIGS. 3A-3C may be provided as a calibration node that users may image using their personal devices.

The plurality of calibration nodes 104 of the calibration management system 112 described herein may be implemented in a wide variety of contexts and perform a variety of different functions. In embodiments, at least a portion of the plurality of calibration nodes 104 described herein may be implemented in a city and be incorporated at different locations of buildings (e.g., on roofs, at the base of buildings, along streets) to facilitate access and imaging by a variety of airborne and surface-based user sensors. Each of the plurality of user sensors 102 may have access and provide information to the calibration management system 112. Such a wide variety of data may facilitate the calibration management system 112 being able to generate more accurate calibration coefficients to more accurately calibrate the plurality of user sensors 102. That is, the data integration and accessibility provided by the calibration management system 112 renders the calibration system 100 (see FIG. 1A) greater than the sum of its parts.

Figure 13:
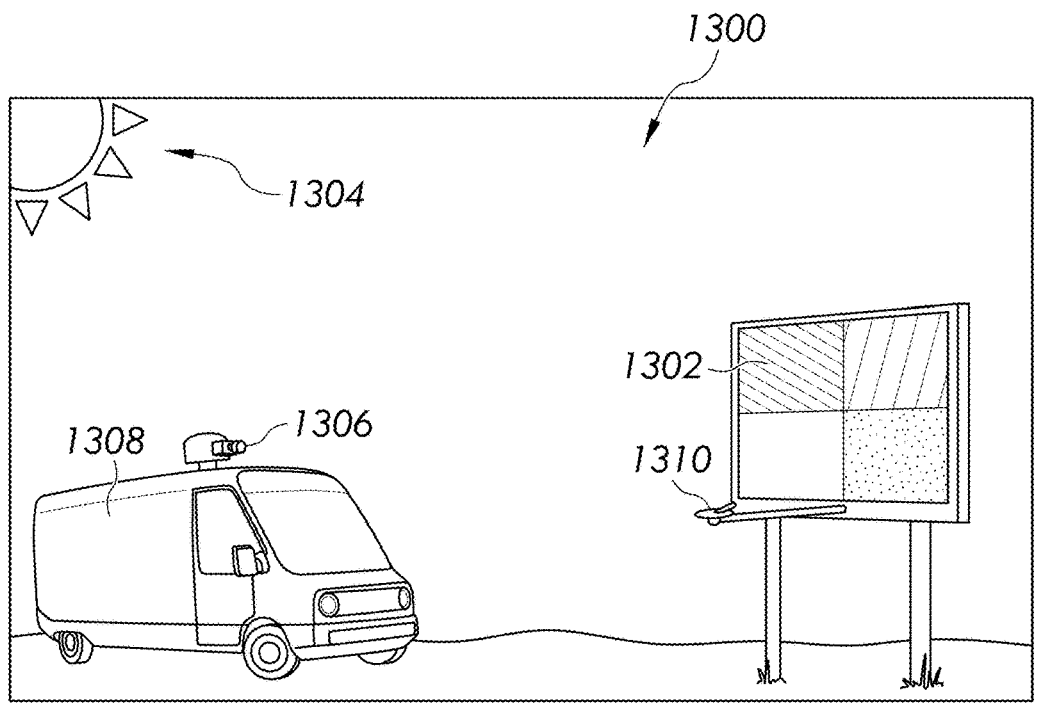
FIG. 13 schematically depicts a calibration node of a calibration system that may be used to calibrate ground-based electro-optic sensors, according to one or more embodiments described herein.

FIG. 13 depicts an example calibration node 1300 that may be implemented as one of the plurality of calibration nodes 104 of the calibration system 100 described herein with respect to FIG. 1A. The calibration node 1300 includes a diffuser 1302 configured direct light from an illumination source 1304 to a user sensor 1306 disposed on a ground-based vehicle 1308. In embodiments, the diffuser 1302 may be implemented on a road sign (e.g., an existing traffic sign) or proximate to a road to provide convenient access to the user sensor 1306. In embodiments, the diffuser 1302 comprises a plurality of Lambertian targets in a predetermined pattern to generate a predetermined calibration reference signal (e.g., having a characteristic shape) to the user sensor 1306. In embodiments, the diffuser 1302 comprises tracking capability (e.g., an adjustable orientation) so that the user sensor 1306 may be tracked with movement. Diffuse area targets are well-suited for flat-fielding of user sensors, when appropriately sized to the field of view of a particular one of the plurality of user sensors 102.

The calibration node 1300 also includes a detector 1310 positioned to receive light scattered via the diffuser 1302. In embodiments, the calibration node 1300 is connected to the calibration management system 112 via the network 118 (see FIG. 1B). When the user sensor 1306 captures an image of the diffuser 1302, the image may be communicated to the calibration management system 112 and data gathered by the detector 1310 may be combined with other sources to generate calibration coefficients or to characterize the user sensor 1306 in accordance with the methods described herein. In embodiments, the calibration node 1300 may not include the detector 1310 and instead a calibration model generated via the calibration management system 112 may be used to calibrate the user sensor 1306.

While the preceding example includes a diffuser 1302 to direct light from the illumination source 1304 to the user sensor 1306, it should be appreciated that roadside calibration nodes are also envisioned that including mirror targets (e.g., including a mirror array with a plurality of independently adjustable orientations). The mirror targets may be used to analyze the user system 1306 using any of the methods described herein (e.g., including the PRF analysis described herein with respect to the method 700 of FIG. 7). Any of the calibration nodes described herein may also adjustable between different orientations to facilitate calibrating different types of user sensors 102. For example, one of the plurality of calibration nodes 104 may be adjustable between a first orientation to calibrate ground-based user sensors (e.g., like the user sensor 1306 depicted in FIG. 13) and a second orientation to calibration airborne user sensors (e.g., disposed on satellites or other aircraft).

Figure 14:
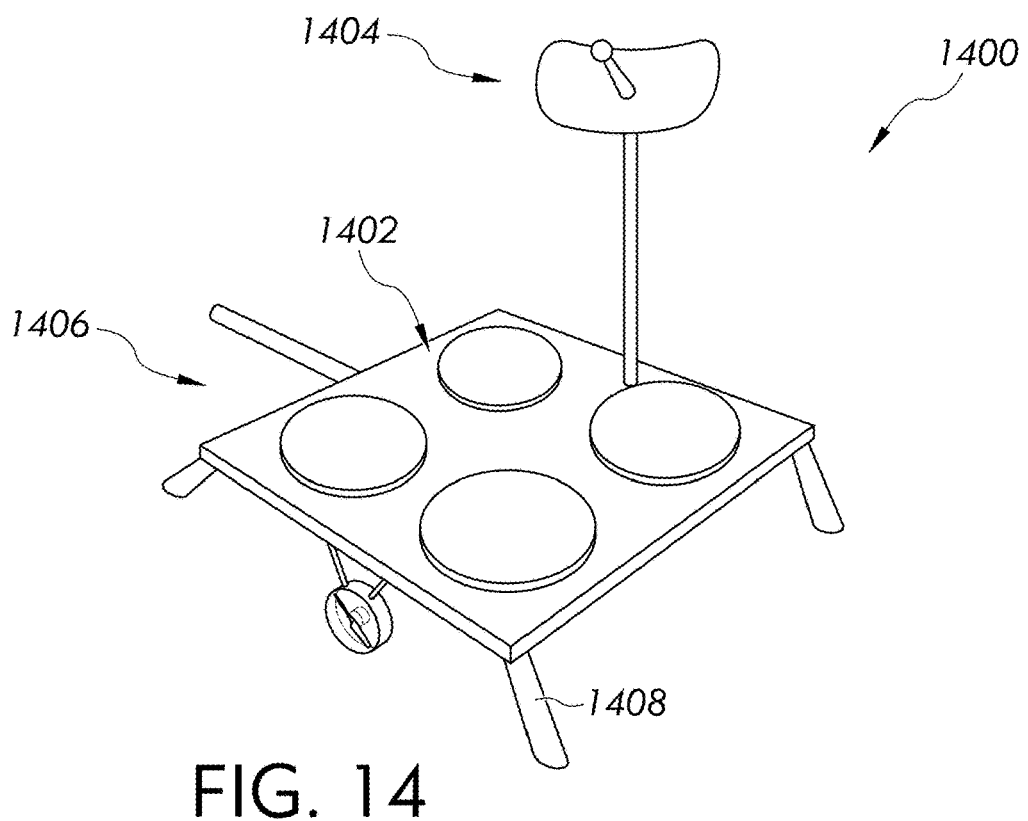
FIG. 14 schematically depicts a mobile calibration node of a calibration system, according to one or more embodiments described herein.

With reference to FIGS. 1A, 1B and 14, while the preceding examples of the plurality of calibration nodes 104 of the calibration management system 112 described herein have been stationary, any of the capabilities described herein may also be provided via mobile calibration nodes. In embodiments, such mobile calibration nodes may include remote controlled or self-driving vehicles that are controlled via the calibration management system 112 to provide additional flexibility in terms of satisfying look requests. For example, users may specify a particular geographic location and time for a particular calibration, and the calibration management system 112 may transport the needed instrumentation to that location to satisfy the user's look request. Mobile calibration nodes may also be used to fine-tune measurements collected via the plurality of calibration nodes 104 by rendering the geographical distribution thereof adjustable.

FIG. 14 depicts an example mobile calibration node 1400. In embodiments, the mobile calibration node 1400 has similar capabilities as the calibration node 300 described herein with respect to FIGS. 3A-3G. For example, the mobile calibration node 1400 may include a reflector array 1402 similar in structure to the reflector array 306 described herein and a field spectral radiometer 1404 similar in structure to the field spectral radiometer 310. In embodiments, the reflector array 1402 may include a smaller number of reflectors than the reflector array 306 to facilitate mobility thereof. The reflector array 1402 and the detector 1406 are disposed on a mobile platform 1406. In embodiments, the structure of the mobile platform 1406 may vary depending on a vehicle on which the mobile platform is disposed. For example, the mobile platform 1406 may be disposed on a suitable surface-based (e.g., watercraft, automobile) or air-based (e.g., un-manned aerial vehicle, other suitable aircraft) vehicle, and the mobile platform 1406 may be supported by the vehicle. In the depicted embodiment, the mobile platform 1406 is disposed on a ground-based vehicle and includes a deployable support structure 1408. The deployable support structure 1408 may be used to increase the stability of the mobile platform 1406 to reduce noise during calibrations.

The mobility of the mobile calibration node 1400 may render measurement of the surroundings thereof important for providing accurate calibration results. Accordingly, the field spectral radiometer 1404 may include an adjustable configuration to facilitate performance of surface reflectance measurements as a function of location. In embodiments, the mobile calibration node 1400 may continuously survey the surface over which the mobile calibration node 1400 travels and provide the results to the calibration management system 112 to aid the calibration management system 112 in performing radiometric studies. Any of the instrumentation associated with any of the calibration nodes described herein may be implemented on a separate mobile calibration node to provide the calibration system 100 with additional flexibility in taking additional measurements or providing calibration reference signals to any desired location.

Figure 15:
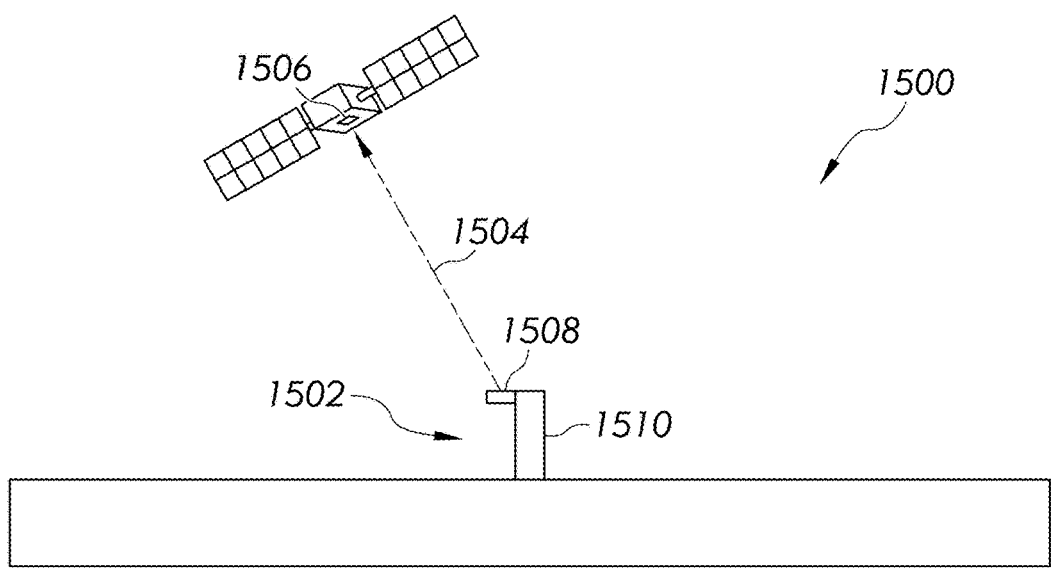
FIG. 15 schematically depicts a calibration node of a calibration system comprising a tunable illumination source, according to one or more embodiments described herein.

With reference to FIGS. 1A, 1B, and 15, some of the plurality of calibration nodes may be light source calibration nodes and include one or more turnable light sources configured to direct tuned light to the plurality of user sensors 102. For example, FIG. 15 schematically depicts a light source calibration node 1500 that may be one of the plurality of signal nodes 108 described herein with respect to FIG. 1A. The light source calibration node 1500 includes a tunable light source 1502 configured to generate tunable illumination light 1504 that is provided to a user sensor 1506 to calibrate the user sensor 1506. The tunable light source 1502 includes an emitter 1508 and a support structure 1510. In embodiments, the emitter 1508 is adjustable in orientation (e.g., via the support structure 1510) to facilitate tracking the trajectory of the user sensor 1506 to provide the tunable illumination light 1504 to the user sensor 1506. In embodiments, the emitter is a tunable light source configured to provide the illumination light 1504 within a desired spectral band of interest. For example, in embodiments, the emitter 1508 comprises an integrating sphere with a tunable light source (e.g., light emitting diodes or the like) for providing spectrally uniform illumination light 1504 throughout a field of regard. In embodiments, the emitter 1508 comprises a tunable laser source. In embodiments, the emitter 1508 includes a laser designator or a time of flight emitter. In embodiments, the emitter 1508 includes a LiDAR emitter. In embodiments, the emitter 1508 may emit light outside of the optical spectrum (e.g., include a radar emitter) for calibrating user sensors working in a variety of spectral ranges of interest. In embodiments, the emitter 1508 comprises a structured illumination source such as the ultra-high resolution Spectra-UT from Labsphere®.

In embodiments, the light source calibration node 1500 includes a detector that is operable to receive the illumination light 1504 to determine an operational state of the emitter 1508 and/or calibrate the emitter 1508. This way, the illumination light 1504 may be traceable to a calibration standard when it is provided to the user sensor 1506. By providing well characterized illumination light 1504 to the user sensor 1506, the light source calibration node 1500 may increase calibration capabilities of the calibration system 100. The light source calibration node 1500 may render calibrations more available by reducing reliance on solar illumination. The light source calibration node 1500 may also enable performance of spectral-band specific calibrations and/or calibrations with precisely defined illumination shapes.

In applications requiring high-precision color measurements and differentiation, it may be desirable to tune the illumination light 1504 both spectrally and spatially. Such structured light sources are increasingly used in sensors such as face-scanning sensors in mobile devices. As such, the light source calibration nodes 1500 may be designed to both measure (and evaluate) structured light generated via user sensors as well as generate specific light patterns that are transferred back to the user sensors. For example, in embodiments, one of the plurality of calibration nodes 104 includes a detector and a structured illumination source that both have adjustable configurations to track the trajectories of the plurality of user sensors 102. Such a calibration node may receive a structured light signal from one of the plurality of user sensors 102 and generate specific patterns that are transmitted back to that user sensor. In embodiments, a reflector may re-direct structured light patterns generated via the user sensors 102 back thereto. Accordingly, the plurality of calibration nodes 104 described herein may also be used to calibrate multiple aspects 3D scanning devices (e.g., a scanning system may be calibrated via measurement of a light pattern, while a detector may be measured via provision of calibration light thereto).

Figure 16:
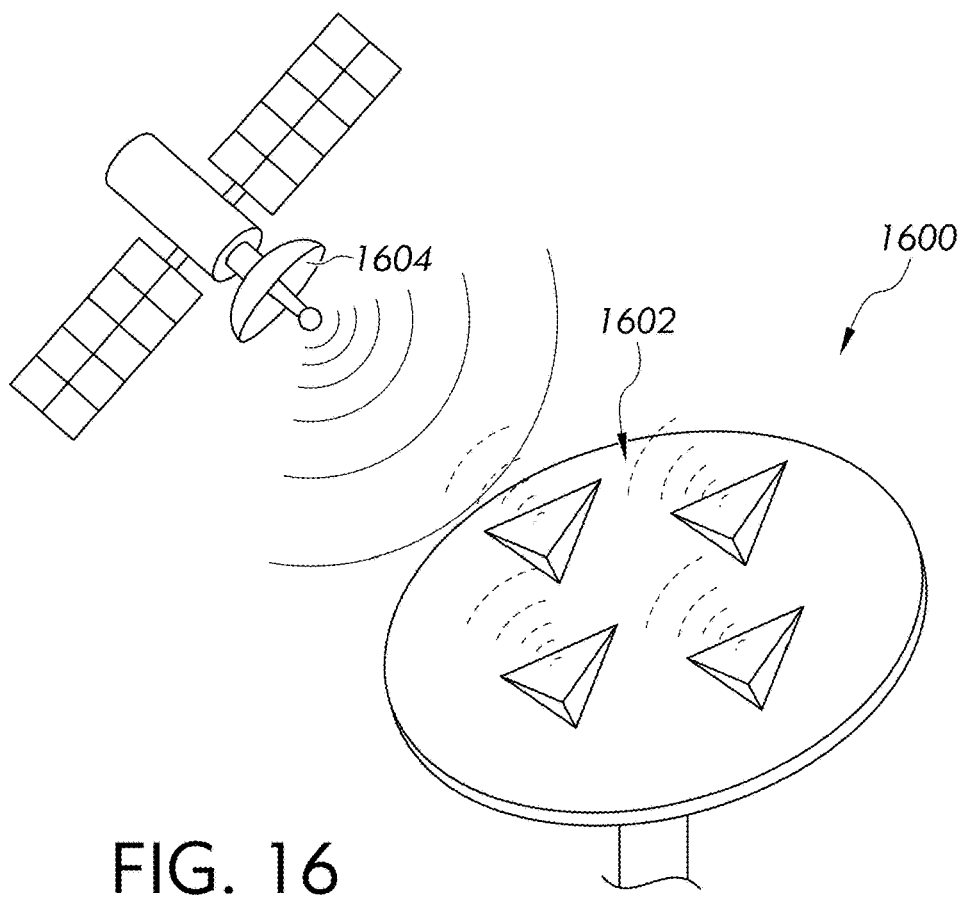
FIG. 16 schematically depicts a calibration node of a calibration system that may be used to calibrate radar-based user sensors, according to one or more embodiments described herein.

With reference to FIGS. 1A, 1B, and 16, specific ones of the plurality of calibration nodes 104 may be designed to produce defined signals for user sensors operating outside of the electro-optical domain. For example, certain calibration nodes may be designed for synthetic aperture radar imagers. Such calibration nodes may employ passive reflectors such as corner reflectors or Luneburg lenses.

FIG. 16 depicts an example radar calibration node 1600 that may be deployed as one of the plurality of signal nodes 108. In the depicted embodiment, the radar calibration node 1600 includes a plurality of corner reflectors 1602 configured to reflect waves emanating back towards a radar-based sensor 1604 for measurement and calibration. In embodiments, the plurality of corner reflectors 1602 are individually adjustable in orientation to facilitate manipulating the amplitude of the reflected signals. In embodiments, the plurality of corner reflectors 1602 are passive and deployed in a fixed orientation. In embodiments, one or more of the plurality of corner reflectors 1602 may be replaced with a Luneburg lens. Such calibration nodes may provide calibration reference points for various radar-based detectors.

The plurality of calibration nodes 104 may provide a wide variety of functionalities to tune aspects of the radiation directed to the plurality of user sensors 102 for various calibrations. In embodiments, for example, certain ones of the plurality of calibration nodes 104 may include polarity-inducing mirrors for characterizing the polarization sensitivity of the plurality of user sensors (e.g., a plurality of polarity-inducing mirrors or calibration nodes may be used to evaluate the polarization response or immunity of the plurality of user sensors 102). In embodiments, certain ones of the plurality of calibration nodes 104 may be configured to produce defined signals for imagers or receivers that operate for time of flight or atmospheric absorption modes, such as LiDAR imagers. In embodiments, such nodes may deploy passive reflector such as retro-reflectors. These signals can be used to determine total absorbed/dispersed energy (e.g., via the atmosphere) or be used to determine total path length or round-trip time of the returned signal.

Certain ones of the plurality of calibration nodes 104 may be designed or equipped in such a way to reduce uncertainty of the measurements obtained thereby. For example one or more of the plurality of calibration nodes 104 may be disposed at a high-altitude site to reduce the uncertainty associated with transmission through the atmosphere. Such a location would reduce the uncertainty in the calibrations provided by the calibration management systems.

Figure 17:
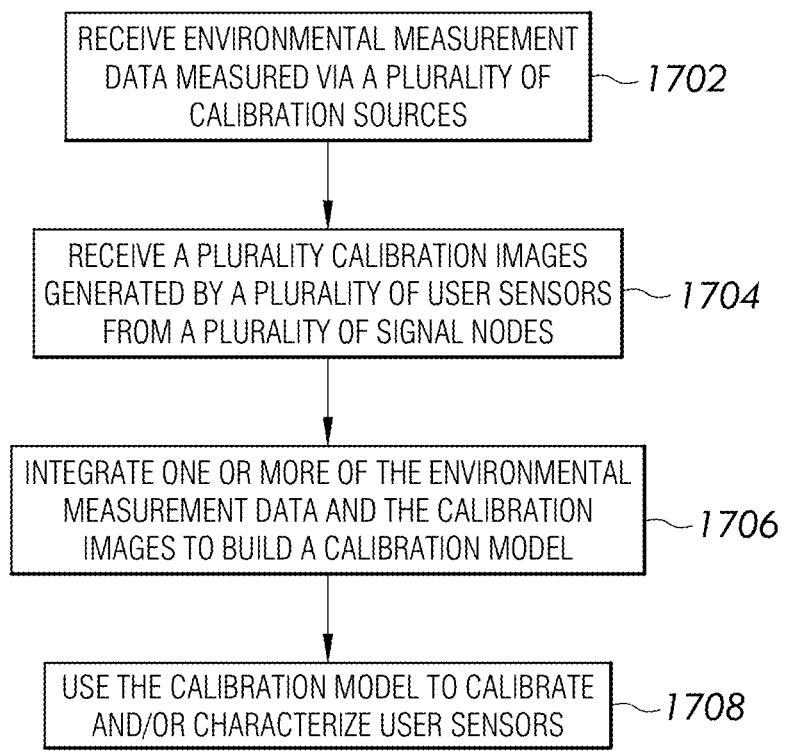
FIG. 17 depicts a flow diagram of a method of integrating data collected via a calibration system into a calibration model that may be used to calibrate user sensors, according to one or more embodiments described herein.

FIG. 17 depicts a flow diagram of a method 1700 of integrating data collected via the calibration system 100 described herein with respect to FIGS. 1A-16 into a calibration model that may be used to calibrate the plurality of user sensors 102. Alternatively or additionally, the calibration model generated via the method 1700 described herein may be used to establish radiometric or climate studies over time or to perform other systemic analysis using all of the data generated by the calibration system 100. Reference to various components of the calibration system 100 described herein with respect to FIGS. 1A, 1B, and 2, are incorporated into the description of the method 1700.

At block 1702, environmental measurement data measured via the plurality of calibration nodes 104 is received by the calibration management system 112. For example, the plurality of measurement nodes 106 may measure solar radiance, irradiance, reflectances, and any other environmental aspects via any of the methods described herein. Such measurements may be continuously provided to the calibration management system 112 such that the calibration management system 112 maintains a real-time feed of the plurality of measurements collected via the calibration management system 112.

At block 1704, the calibration management system 112 receives a plurality of calibration images generated by the plurality user sensors from the plurality of signal nodes 108. For example, in implementing the method 500 described herein with respect to FIG. 5A, the calibration management system 112 may continuously receive images of the plurality of calibration nodes 104 generated via the plurality of user sensors 102. The calibration images may be pre-scheduled or associated with pre-defined user sensors, such that the calibration management system 112 may maintain a database of calibration images that are accessible by time, location, and sensor. In embodiments, the calibration management system 112 may correlate images of similar geographical locations or obtained by the same sensor with one another and harmonize the calibration images.

At block 1706, the environmental data received at block 1702 and the plurality of calibration images received at block 1704 are integrated into a calibration model. For example, based on the environmental measurement data, various mappings of environmental characteristics (e.g., radiance, absorbance, and the like) may be generated and used to estimate environmental properties at unmeasured locations to construct a time-dependent calibration model. Predictions of the model may be updated based on the calibration images received at block 1704. That is, predictions generated via the calibration model may be compared to actual calibration images to refine the calibration model using suitable statistical techniques. The calibration model may thus be used to estimate calibration images that may be generated by a particular one of the plurality of user sensors without any measurement instrumentation, and still provide high fidelity calibration results.

At block 1708, the calibration model is used to calibrate and/or characterize user sensors. For example, radiometric gain coefficients may be computed based on estimates of the calibration model. Additionally, optical performance of the plurality of user sensors 102 may be assessed by comparing calibration images to those generated by other sensors. The calibration model may also be used to estimate performance of the plurality of calibration nodes 104 (e.g., the reflectance associated with a particular reflector or diffuser) and be used to correct calibration images without direct measurement. Additional environmental considerations may also be used to further apply corrections to calibration images by correlating previous environmental events with stored calibration images. For example, particular relationships between environmental events and calibration image characteristics may be identified and quantified using any suitable technique. A particular weather event (e.g., weather pattern) at a first point in time may be identified to affect surface reflectance (e.g. of a reflector or a ground surface) at a second point in time, for example, based on an analysis of stored calibration images and weather data. Upon determining that a particular calibration image satisfies a condition associated with such a predetermined relationship (e.g., corresponding to the occurrence of a weather event within a particular period of time), corrections to the calibration image may be made irrespective of the measurement data being available, rendering the calibration more accurate based on the data made available via the calibration management system 112.

As will be understood from the foregoing description, a calibration system including a plurality of calibration nodes have been shown and described. By including a plurality of calibration nodes configured to take a plurality of different calibration actions, including measuring environmental conditions and providing calibration reference signals to user sensors, the calibration system is able to provide in-situ calibration and characterization of a plurality of different types of sensors having a plurality of different sensing capabilities. The interconnectivity of the plurality of calibration nodes allows the integration of data from a plurality of sources to provide accurate and complete calibrations.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the specific value or end-point referred to is included. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A calibration management system configured for calibrating a user sensor, comprising:
   a non-transitory, processor readable memory; and
   a processor coupled to the non-transitory, processor readable memory, the processor being configured to cause the calibration management system to:
      provide calibration node information to a user system communicably coupled to the calibration management system and associated with at least the user sensor, the calibration node information identifying a calibration node of a plurality of calibration nodes communicably coupled to the calibration management system and disposed at a plurality of geographical locations;
      receive, from the user system, a request to access information generated via the calibration node;
      cause the calibration node to perform at least one calibration action based on the request, wherein the calibration action comprises at least one of:
         providing a calibration reference signal to the user sensor;
      receive calibration results information containing results of the calibration action, wherein the calibration results information comprises a calibration image captured via the user sensor in response to the calibration reference signal;
      characterize the user sensor based on the calibration image by causing the calibration management system to:
         perform point response function analysis of the user sensor;
         determine a ground resolution distance of the user sensor; and
         perform a line spread function analysis of the user sensor; and
      provide information associated with the calibration results information to the user system, wherein the information comprises information regarding signal instrumentation of the calibration node configured to provide the calibration reference signal to the user sensor and a radiometric response characterization.

2. The calibration management system of claim 1, wherein:
   the calibration action performed via the calibration node further comprises performing an environmental measurement to measure at least one aspect of an environment at the geographical location of the calibration node,
   the calibration results information further comprises results of the environmental measurement, the calibration node comprises a detector configured to receive radiation propagating from a source in the environment, and the results of the environmental measurement comprise one or more of:

solar irradiance or radiance at the geographical location of the calibration node; and a reflectance of a ground surface at the geographical location of the calibration node.

3. The calibration management system of claim 2, wherein:

the calibration node further comprises a reflector configured to reflect the calibration reference signal towards the user sensor, the detector comprises an adjustable field of view, and the calibration results information further comprises:

a reflector reference signal reflected from the reflector to the detector; and the reflectance of a ground surface.

4. The calibration management system of claim 1, wherein:

the processor is further configured to cause the calibration management system to generate coefficients, based on the calibration results information, that may be used to adjust an image captured by the user sensor, and the information associated with the calibration results information further comprises the coefficients.

5. The calibration management system of claim 1, wherein the processor is further configured to cause the calibration management system to:

determine a first property of an environment at the geographical location of the calibration node based on the calibration image, and estimate a second property of the environment based on the first property and information stored in a database containing information measured by the plurality of calibration nodes.

6. The calibration management system of claim 1, wherein the processor is further configured to cause the calibration management system to:

receive other calibration images captured at a particular time via other user sensors in response to other calibration reference signals from the plurality of calibration nodes, and combine the calibration image and the other calibration images to:

estimate a property of an environment at the geographical location of the calibration node, or correct at least one calibration image among the calibration image and the other calibration images.

7. The calibration management system of claim 1, wherein one or more of the plurality of calibration nodes comprise a reflector array node comprising signal instrumentation comprising one or more reflectors having adjustable orientations to selectively reflect light from an illumination source to the user sensor.

8. The calibration management system of claim 7, wherein the processor is further configured to cause the calibration management system to cause a reflector of the one or more reflectors to periodically reflect the light from the illumination source into and out of a field of view of one of the user sensor.

9. The calibration management system of claim 1, wherein one or more of the plurality of calibration nodes comprise a characteristic reflector node comprising one or more of a diffuser target, a patterned surface, and a polarity-inducing reflector.

10. The calibration management system of claim 9, wherein:

the user sensor comprises a ground vehicle-based sensor, and the characteristic reflector node is disposed on a road sign to facilitate calibrating ground vehicle-based sensor.

11. The calibration management system of claim 1, wherein one or more of the plurality of calibration nodes comprise a light source calibration node comprising a tunable light source configured to direct tuned light to the user sensor.

12. A calibration management system configured for calibrating a user sensor, comprising:

a non-transitory, processor readable memory; and a processor coupled to the non-transitory, processor readable memory, the processor being configured to cause the calibration management system to:

receive, from a measurement node communicably coupled to the calibration management system, a characteristic of an environment at a geographical location associated with the measurement node;

receive a first calibration image generated by the user sensor based on light directed from an illumination source by a reflector of a signal node communicably coupled to the calibration management system, the signal node comprising a reflector array comprising a plurality of reflectors comprising individually-adjustable orientations;

perform one or more radiometric corrections on the first calibration image based on the characteristic of the environment;

store the first calibration image and parameters associated with the one or more radiometric corrections in a database;

receive a plurality of calibration images of the reflector array captured by the user sensor;

co-register the plurality of calibration images to generate an over-sampled point response function (PRF) population;

resample the over-sampled PRF population to form a PRF image; and evaluate the PRF image to determine a value of a resolution metric of the user sensor.

13. The calibration management system of claim 12, wherein the processor is further configured to cause the calibration management system to:

receive a calibration request for the user sensor from a user system associated with the user sensor, the calibration request including a calibration time and information regarding a trajectory of the user sensor; and at the calibration time, provide control signals to the signal node to orient the reflector to direct light from the illumination source to the user sensor to cause the user sensor to generate the first calibration image.

14. The calibration management system of claim 12, wherein the signal node and the measurement node are disposed at a same geographical location.

15. A method of calibrating a user sensor by a calibration management system, the method comprising:

providing calibration node information to a user system communicably coupled to the calibration management system and associated with at least the user sensor, the calibration node information identifying a calibration node of a plurality of calibration nodes that are communicably coupled to the calibration management system and disposed at a plurality of geographical locations;

based on providing the calibration node information, receiving, from the user system, a request to access information generated via the calibration node;

causing the calibration node to perform at least one calibration action based on the request, wherein the calibration action comprises at least one of:
provinding a calibration reference signal to the user sensor;

receiving calibration results information containing results of the calibration action, wherein the calibration results information comprises a calibration image captured via the user sensor in response to the calibration reference signal;

characterizing the user sensor based on the calibration image, wherein characterizing the user sensor comprises:
performing point response function analysis of the user sensor;
determining a ground resolution distance of the user sensor; and
performing a line spread function analysis of the user sensor; and providing information associated with the calibration results information to the user system, wherein the information comprises information regarding signal instrumentation of the calibration node configured to provide the calibration reference signal to the user sensor and a radiometric response characterization.

16. The method of claim 15, further comprising:
performing one or more radiometric corrections on the calibration image using data collected via the plurality of calibration nodes, and
the information associated with the calibration results information further comprises the one or more radiometric corrections.

17. The method of claim 15, wherein:
the calibration action performed via the calibration node further comprises performing an environmental measurement to measure at least one aspect of an environment at the geographical location of the calibration node, the calibration results information further comprises results of the environmental measurement, the calibration node comprises a detector configured to receive radiation propagating from a source in the environment, and the results of the environmental measurement comprise one or more of:
solar irradiance or radiance at the geographical location of the calibration node; and
a reflectance of a ground surface at the geographical location of the calibration node.

18. The method of claim 17, wherein:
the calibration node further comprises a reflector configured to reflect the calibration reference signal towards the user sensor, the detector comprises an adjustable field of view, and the calibration results information further comprises:
a reflector reference signal reflected from the reflector to the detector; and
the reflectance of a ground surface.

19. The method of claim 15, further comprising:
generating coefficients, based on the calibration results information, that may be used to adjust an image captured by the user sensor,
wherein the information associated with the calibration results information further comprises the coefficients.

20. The method of claim 15, further comprising:
receiving other calibration images captured at a particular time via other user sensors in response to other calibration reference signals from the plurality of calibration nodes, and
combining the calibration image and the other calibration images to:
estimate a property of an environment at a geographical location of the calibration node, or
correct at least one calibration image among the calibration image and the other calibration images.

* * * * *